US010156831B2

United States Patent
Raji et al.

(10) Patent No.: US 10,156,831 B2
(45) Date of Patent: Dec. 18, 2018

(54) AUTOMATION SYSTEM WITH MOBILE INTERFACE

(71) Applicant: iControl Networks, Inc., Philadelphia, PA (US)

(72) Inventors: Reza Raji, Redwood City, CA (US); Gerald Gutt, Redwood City, CA (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

(21) Appl. No.: 13/718,851

(22) Filed: Dec. 18, 2012

(65) Prior Publication Data

US 2013/0318231 A1     Nov. 28, 2013

Related U.S. Application Data

(63) Continuation of application No. 11/084,232, filed on Mar. 16, 2005, now Pat. No. 8,335,842.

(51) Int. Cl.
*H04L 12/26*     (2006.01)
*G05B 11/01*     (2006.01)
(Continued)

(52) U.S. Cl.
CPC .......... *G05B 11/012* (2013.01); *G06Q 30/02* (2013.01); *G06Q 30/0601* (2013.01);
(Continued)

(58) Field of Classification Search
CPC ............. H04L 12/2809; H04L 12/2818; H04L 12/2803; H04L 12/2825; H04L 12/2834;
(Continued)

(56) References Cited

U.S. PATENT DOCUMENTS 686,838 A    11/1901   Richard
1,738,540 A   12/1929   Replogle et al.
(Continued)

FOREIGN PATENT DOCUMENTS

AU     2010297957     9/2010
AU     2005223267 B2   12/2010
(Continued)

OTHER PUBLICATIONS

Alarm.com—Interactive Security Systems, Elders [retrieved on Nov. 4, 2003], 1 page.
(Continued)

*Primary Examiner* — Alina A Boutah
(74) *Attorney, Agent, or Firm* — Baker & Hostetler LLP

(57) ABSTRACT

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

23 Claims, 17 Drawing Sheets

System Architecture

(51) Int. Cl.
*G06Q 30/02* (2012.01)
*G06Q 30/06* (2012.01)
*G06Q 50/06* (2012.01)
*G06Q 50/08* (2012.01)
*G06Q 50/12* (2012.01)
*G06Q 50/16* (2012.01)
*H04L 12/28* (2006.01)
*H04L 29/08* (2006.01)
*H04L 12/24* (2006.01)
*H04M 1/725* (2006.01)
*H04W 80/12* (2009.01)
*H04W 88/02* (2009.01)

(52) U.S. Cl.
CPC ............ *G06Q 50/06* (2013.01); *G06Q 50/08* (2013.01); *G06Q 50/12* (2013.01); *G06Q 50/16* (2013.01); *G06Q 50/163* (2013.01); *H04L 12/2803* (2013.01); *H04L 12/2809* (2013.01); *H04L 12/2818* (2013.01); *H04L 12/2825* (2013.01); *H04L 12/2834* (2013.01); *H04L 41/0853* (2013.01); *H04L 43/04* (2013.01); *H04L 67/025* (2013.01); *H04L 67/125* (2013.01); *H04L 67/26* (2013.01); *H04L 67/2823* (2013.01); *H04L 67/36* (2013.01); *H04M 1/72522* (2013.01); *G05B 2219/15052* (2013.01); *H04L 2012/285* (2013.01); *H04L 2012/2841* (2013.01); *H04L 2012/2843* (2013.01); *H04W 80/12* (2013.01); *H04W 88/02* (2013.01)

(58) Field of Classification Search
CPC ... H04L 12/283; H04L 67/025; H04L 67/125; H04L 41/0806; H04L 41/0813; H04L 67/36; H04L 67/26; H04L 43/04; H04L 41/0853; H04L 67/2823; H04L 2012/2841; H04L 2012/2843; H04L 2012/285; G05B 11/012; G05B 2219/15052; G06Q 30/02; G06Q 30/0601; G06Q 30/06; G06Q 30/08; G06Q 30/12; G06Q 30/16; G06Q 30/163; H04M 1/72522; H04W 80/12; H04W 80/02
USPC .......................................................... 709/224
See application file for complete search history.

(56) References Cited

U.S. PATENT DOCUMENTS

| | | | |
|---|---|---|---|
| 3,803,576 A | 4/1974 | Dobrzanski et al. |
| 3,852,541 A | 12/1974 | Altenberger |
| 4,006,460 A | 2/1977 | Hewitt et al. |
| 4,141,006 A | 2/1979 | Braxton |
| 4,257,038 A | 3/1981 | Rounds et al. |
| 4,286,331 A | 8/1981 | Anderson et al. |
| 4,304,970 A | 12/1981 | Fahey et al. |
| 4,363,031 A | 12/1982 | Reinowitz |
| 4,520,503 A | 5/1985 | Kirst et al. |
| 4,559,526 A | 12/1985 | Tani et al. |
| 4,559,527 A | 12/1985 | Kirby |
| 4,574,305 A | 3/1986 | Campbell et al. |
| 4,581,606 A | 4/1986 | Mallory |
| 4,591,834 A | 5/1986 | Kyle |
| D284,084 S | 6/1986 | Ferrara, Jr. |
| 4,641,127 A | 2/1987 | Hogan et al. |
| 4,652,859 A | 3/1987 | Van Wienen |
| 4,670,739 A | 6/1987 | Kelly, Jr. |
| 4,683,460 A | 7/1987 | Nakatsugawa |
| 4,694,282 A | 9/1987 | Tamura et al. |
| 4,716,973 A | 1/1988 | Cobern |
| 4,730,184 A | 3/1988 | Bach |
| 4,754,261 A | 6/1988 | Marino |
| 4,779,007 A | 10/1988 | Schlanger et al. |
| 4,801,924 A | 1/1989 | Burgmann et al. |
| 4,812,820 A | 3/1989 | Chatwin |
| 4,818,970 A | 4/1989 | Natale et al. |
| 4,833,339 A | 5/1989 | Luchaco et al. |
| 4,833,449 A | 5/1989 | Gaffigan |
| 4,855,713 A | 8/1989 | Brunius |
| 4,860,185 A | 8/1989 | Brewer et al. |
| 4,887,064 A | 12/1989 | Drori et al. |
| 4,897,630 A | 1/1990 | Nykerk |
| 4,918,623 A | 4/1990 | Lockitt et al. |
| 4,918,717 A | 4/1990 | Bissonnette et al. |
| 4,951,029 A | 8/1990 | Severson |
| 4,959,713 A | 9/1990 | Morotomi et al. |
| 4,962,473 A | 10/1990 | Crain |
| 4,980,666 A | 12/1990 | Hwang |
| 4,993,059 A | 2/1991 | Smith et al. |
| 4,994,787 A | 2/1991 | Kratt et al. |
| 5,023,901 A | 6/1991 | Sloan et al. |
| 5,083,106 A | 1/1992 | Kostusiak et al. |
| 5,086,385 A | 2/1992 | Launey et al. |
| 5,091,780 A | 2/1992 | Pomerleau |
| 5,109,278 A | 4/1992 | Erickson et al. |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| 5,164,703 A | 11/1992 | Rickman |
| 5,164,979 A * | 11/1992 | Choi ............... G08B 13/19634 340/533 |
| D337,569 S | 7/1993 | Kando |
| 5,227,776 A | 7/1993 | Starefoss |
| 5,237,305 A | 8/1993 | Ishikuro et al. |
| 5,245,694 A | 9/1993 | Zwern |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Simms et al. |
| 5,400,011 A | 3/1995 | Sutton |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda, Jr. et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A * | 11/1996 | Mun ............... G05B 19/042 340/12.54 |

(56) References Cited

U.S. PATENT DOCUMENTS

| | | | |
|---|---|---|---|
| D377,034 S | 12/1996 | Matsushita | |
| 5,587,705 A | 12/1996 | Morris | |
| 5,598,086 A | 1/1997 | Somerville | |
| 5,602,918 A | 2/1997 | Chen et al. | |
| 5,604,493 A | 2/1997 | Behlke | |
| 5,606,615 A | 2/1997 | Lapointe et al. | |
| 5,621,662 A | 4/1997 | Humphries et al. | |
| 5,623,601 A | 4/1997 | Vu | |
| 5,625,338 A | 4/1997 | Pildner et al. | |
| 5,625,410 A | 4/1997 | Washino et al. | |
| 5,629,687 A | 5/1997 | Sutton et al. | |
| 5,630,216 A | 5/1997 | McEwan | |
| 5,631,630 A | 5/1997 | McSweeney | |
| 5,638,046 A | 6/1997 | Malinowski | |
| 5,651,070 A | 7/1997 | Blunt | |
| 5,652,567 A | 7/1997 | Traxler | |
| 5,675,321 A | 10/1997 | McBride | |
| 5,680,131 A | 10/1997 | Utz | |
| 5,682,133 A | 10/1997 | Johnson et al. | |
| 5,686,885 A | 11/1997 | Bergman | |
| 5,686,896 A | 11/1997 | Bergman | |
| 5,689,235 A | 11/1997 | Sugimoto et al. | |
| 5,689,708 A | 11/1997 | Regnier et al. | |
| 5,691,697 A | 11/1997 | Carvalho et al. | |
| 5,694,335 A | 12/1997 | Hollenberg | |
| 5,694,595 A | 12/1997 | Jacobs et al. | |
| 5,696,486 A * | 12/1997 | Poliquin | H04L 41/042 340/506 |
| 5,696,898 A | 12/1997 | Baker et al. | |
| D389,501 S | 1/1998 | Mascarenas, Sr. et al. | |
| 5,706,191 A | 1/1998 | Bassett et al. | |
| 5,712,679 A | 1/1998 | Coles | |
| 5,714,933 A | 2/1998 | Le Van Suu | |
| 5,715,394 A | 2/1998 | Jabs | |
| 5,717,378 A | 2/1998 | Malvaso et al. | |
| 5,717,379 A | 2/1998 | Peters | |
| 5,717,578 A | 2/1998 | Afzal | |
| 5,719,551 A | 2/1998 | Flick | |
| 5,726,912 A | 3/1998 | Krall et al. | |
| 5,731,756 A | 3/1998 | Roddy | |
| 5,736,927 A | 4/1998 | Stebbins et al. | |
| 5,737,391 A | 4/1998 | Dame et al. | |
| 5,748,084 A | 5/1998 | Isikoff | |
| 5,748,089 A | 5/1998 | Sizemore | |
| 5,757,616 A | 5/1998 | May et al. | |
| 5,761,206 A | 6/1998 | Kackman | |
| 5,774,051 A | 6/1998 | Kostusiak | |
| 5,777,551 A | 7/1998 | Hess | |
| 5,777,837 A | 7/1998 | Eckel et al. | |
| 5,784,461 A | 7/1998 | Shaffer et al. | |
| 5,784,463 A | 7/1998 | Chen et al. | |
| 5,793,028 A | 8/1998 | Wagener et al. | |
| 5,793,763 A | 8/1998 | Mayes et al. | |
| 5,794,128 A | 8/1998 | Brockel et al. | |
| 5,796,401 A | 8/1998 | Winer | |
| 5,798,701 A | 8/1998 | Bernal et al. | |
| 5,801,618 A | 9/1998 | Jenkins | |
| 5,805,056 A | 9/1998 | Mueller et al. | |
| 5,805,064 A | 9/1998 | Yorkey | |
| 5,809,013 A | 9/1998 | Kackman | |
| 5,812,054 A | 9/1998 | Cohen | |
| 5,819,124 A | 10/1998 | Somner et al. | |
| 5,844,599 A | 12/1998 | Hildin | |
| 5,845,070 A | 12/1998 | Ikudome | |
| 5,854,588 A | 12/1998 | Dockery | |
| 5,859,966 A | 1/1999 | Hayman et al. | |
| 5,861,804 A | 1/1999 | Fansa et al. | |
| 5,867,484 A | 2/1999 | Shaunfield | |
| 5,874,952 A | 2/1999 | Morgan | |
| 5,877,696 A | 3/1999 | Powell | |
| 5,880,775 A | 3/1999 | Ross | |
| 5,881,226 A | 3/1999 | Veneklase | |
| 5,886,894 A | 3/1999 | Rakoff | |
| 5,892,442 A | 4/1999 | Ozery | |
| 5,898,831 A | 4/1999 | Hall et al. | |
| 5,905,438 A | 5/1999 | Weiss et al. | |
| 5,907,279 A | 5/1999 | Bruins et al. | |
| 5,909,183 A | 6/1999 | Borgstahl et al. | |
| 5,914,655 A | 6/1999 | Clifton et al. | |
| 5,924,069 A | 7/1999 | Kowalkowski et al. | |
| 5,926,209 A | 7/1999 | Glatt | |
| 5,933,098 A | 8/1999 | Haxton | |
| 5,940,387 A | 8/1999 | Humpleman | |
| 5,943,394 A | 8/1999 | Ader et al. | |
| 5,952,815 A | 9/1999 | Rouillard et al. | |
| 5,955,946 A | 9/1999 | Beheshti et al. | |
| 5,958,053 A | 9/1999 | Denker | |
| 5,959,528 A | 9/1999 | Right et al. | |
| 5,963,916 A | 10/1999 | Kaplan | |
| 5,967,975 A | 10/1999 | Ridgeway | |
| D416,910 S | 11/1999 | Vasquez | |
| 5,982,418 A | 11/1999 | Ely | |
| 5,991,795 A | 11/1999 | Howard et al. | |
| 6,002,430 A | 12/1999 | McCall et al. | |
| 6,009,320 A | 12/1999 | Dudley | |
| 6,011,921 A | 1/2000 | Takahashi et al. | |
| 6,032,036 A | 2/2000 | Maystre et al. | |
| 6,037,991 A | 3/2000 | Thro et al. | |
| 6,038,289 A | 3/2000 | Sands | |
| 6,040,770 A | 3/2000 | Britton | |
| 6,049,272 A | 4/2000 | Lee et al. | |
| 6,049,273 A | 4/2000 | Hess | |
| 6,049,598 A | 4/2000 | Peters et al. | |
| 6,052,052 A | 4/2000 | Delmonaco | |
| 6,060,994 A | 5/2000 | Chen | |
| 6,067,346 A | 5/2000 | Akhteruzzaman et al. | |
| 6,067,440 A | 5/2000 | Diefes | |
| 6,069,655 A * | 5/2000 | Seeley | H04N 7/181 348/154 |
| 6,078,253 A | 6/2000 | Fowler | |
| 6,078,257 A | 6/2000 | Ferraro | |
| 6,078,649 A | 6/2000 | Small et al. | |
| 6,085,030 A | 7/2000 | Whitehead et al. | |
| 6,091,771 A | 7/2000 | Seeley et al. | |
| 6,094,134 A | 7/2000 | Cohen | |
| 6,097,429 A | 8/2000 | Seeley et al. | |
| 6,104,785 A | 8/2000 | Chen | |
| 6,107,918 A | 8/2000 | Klein et al. | |
| 6,107,930 A | 8/2000 | Behlke et al. | |
| 6,108,034 A | 8/2000 | Kim | |
| 6,117,182 A | 9/2000 | Alpert et al. | |
| 6,124,882 A | 9/2000 | Voois et al. | |
| 6,134,303 A | 10/2000 | Chen | |
| 6,134,591 A | 10/2000 | Nickles | |
| 6,138,249 A | 10/2000 | Nolet | |
| 6,139,177 A | 10/2000 | Venkatraman et al. | |
| 6,140,987 A | 10/2000 | Stein et al. | |
| 6,154,133 A | 11/2000 | Ross et al. | |
| 6,161,182 A | 12/2000 | Nadooshan | |
| 6,167,186 A | 12/2000 | Kawasaki et al. | |
| 6,181,341 B1 | 1/2001 | Shinagawa | |
| 6,192,418 B1 | 2/2001 | Hale et al. | |
| 6,198,475 B1 | 3/2001 | Kunimatsu et al. | |
| 6,198,479 B1 | 3/2001 | Humpleman et al. | |
| 6,208,247 B1 | 3/2001 | Agre et al. | |
| 6,209,011 B1 | 3/2001 | Vong et al. | |
| 6,211,783 B1 | 4/2001 | Wang | |
| 6,215,404 B1 | 4/2001 | Morales | |
| 6,218,938 B1 | 4/2001 | Lin | |
| 6,219,677 B1 | 4/2001 | Howard | |
| 6,226,031 B1 | 5/2001 | Barraclough et al. | |
| 6,229,429 B1 | 5/2001 | Horon | |
| 6,239,892 B1 | 5/2001 | Davidson | |
| 6,243,683 B1 | 6/2001 | Peters | |
| 6,246,320 B1 | 6/2001 | Monroe | |
| 6,271,752 B1 | 8/2001 | Vaios | |
| 6,275,227 B1 | 8/2001 | DeStefano | |
| 6,281,790 B1 | 8/2001 | Kimmel et al. | |
| 6,282,569 B1 | 8/2001 | Wallis et al. | |
| 6,286,038 B1 | 9/2001 | Reichmeyer et al. | |
| 6,288,716 B1 | 9/2001 | Humpleman et al. | |
| 6,289,382 B1 | 9/2001 | Bowman-Amuah | |
| 6,292,766 B1 | 9/2001 | Mattos et al. | |
| 6,292,827 B1 | 9/2001 | Raz | |

(56) References Cited

U.S. PATENT DOCUMENTS

| | | |
|---|---|---|
| 6,295,346 B1 | 9/2001 | Markowitz et al. |
| 6,314,425 B1 | 11/2001 | Serbinis et al. |
| 6,320,506 B1 | 11/2001 | Ferraro |
| 6,323,897 B1 | 11/2001 | Kogane et al. |
| D451,529 S | 12/2001 | Vasquez |
| 6,331,122 B1 | 12/2001 | Wu |
| 6,332,193 B1 | 12/2001 | Glass et al. |
| 6,347,393 B1 | 2/2002 | Alpert et al. |
| 6,351,213 B1 | 2/2002 | Hirsch et al. |
| 6,351,595 B1 | 2/2002 | Kim |
| 6,351,829 B1 | 2/2002 | Dupont et al. |
| 6,353,853 B1 | 3/2002 | Gravlin |
| 6,353,891 B1 | 3/2002 | Borella et al. |
| 6,359,560 B1 | 3/2002 | Budge et al. |
| 6,363,417 B1 | 3/2002 | Howard et al. |
| 6,363,422 B1 | 3/2002 | Hunter et al. |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,378,109 B1 | 4/2002 | Young et al. |
| 6,385,772 B1 | 5/2002 | Courtney |
| 6,392,538 B1 | 5/2002 | Shere |
| 6,400,265 B1 | 6/2002 | Saylor et al. |
| 6,405,348 B1 | 6/2002 | Fallah-Tehrani et al. |
| D460,472 S | 7/2002 | Wang |
| 6,418,037 B1 | 7/2002 | Zhang |
| 6,421,080 B1 | 7/2002 | Lambert |
| 6,430,629 B1 | 8/2002 | Smyers |
| 6,433,683 B1 | 8/2002 | Robinson |
| 6,434,700 B1 | 8/2002 | Alonso et al. |
| 6,437,692 B1 | 8/2002 | Petite et al. |
| 6,442,241 B1 | 8/2002 | Tsumpes |
| 6,446,192 B1 | 9/2002 | Narasimhan et al. |
| 6,452,490 B1 | 9/2002 | Garland et al. |
| 6,452,923 B1 | 9/2002 | Gerszberg et al. |
| 6,453,687 B2 | 9/2002 | Sharood et al. |
| D464,328 S | 10/2002 | Vasquez et al. |
| D464,948 S | 10/2002 | Vasquez et al. |
| 6,462,507 B2 | 10/2002 | Fisher et al. |
| 6,462,663 B1 | 10/2002 | Wilson et al. |
| 6,467,084 B1 | 10/2002 | Howard et al. |
| 6,476,858 B1 | 11/2002 | Ramirez et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,499,131 B1 | 12/2002 | Savithri et al. |
| 6,504,479 B1 | 1/2003 | Lemons et al. |
| 6,526,581 B1 | 2/2003 | Edson |
| 6,529,230 B1 | 3/2003 | Chong |
| 6,529,723 B1 | 3/2003 | Bentley |
| 6,542,075 B2 | 4/2003 | Barker et al. |
| 6,542,992 B1 | 4/2003 | Peirce et al. |
| 6,553,336 B1 | 4/2003 | Johnson et al. |
| 6,559,769 B2 | 5/2003 | Anthony et al. |
| 6,563,800 B1 | 5/2003 | Salo et al. |
| 6,563,910 B2 | 5/2003 | Menard et al. |
| 6,567,122 B1 | 5/2003 | Anderson et al. |
| 6,567,502 B2 | 5/2003 | Zellner et al. |
| 6,574,234 B1 | 6/2003 | Myer et al. |
| 6,580,950 B1 | 6/2003 | Johnson et al. |
| 6,587,046 B2 | 7/2003 | Joao |
| 6,587,455 B1 | 7/2003 | Ray et al. |
| 6,587,736 B2 | 7/2003 | Howard et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,611,206 B2 | 8/2003 | Eshelman et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 * | 12/2003 | Naidoo et al. .................. 379/37 |
| 6,661,340 B1 | 12/2003 | Saylor et al. |
| 6,662,340 B2 | 12/2003 | Rawat et al. |
| 6,667,688 B1 | 12/2003 | Menard et al. |
| 6,675,365 B2 | 1/2004 | Elzinga |
| 6,680,730 B1 | 1/2004 | Shields et al. |
| 6,686,838 B1 | 2/2004 | Rezvani et al. |
| 6,690,411 B2 | 2/2004 | Naidoo et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,720,990 B1 | 4/2004 | Walker et al. |
| 6,721,689 B2 | 4/2004 | Markle et al. |
| 6,721,740 B1 | 4/2004 | Skinner et al. |
| 6,721,747 B2 | 4/2004 | Lipkin |
| 6,727,811 B1 | 4/2004 | Fendis |
| 6,728,688 B1 | 4/2004 | Hirsch et al. |
| 6,738,824 B1 | 5/2004 | Blair |
| 6,741,171 B2 | 5/2004 | Palka et al. |
| 6,754,717 B1 | 6/2004 | Day, III et al. |
| 6,756,896 B2 | 6/2004 | Ford |
| 6,756,998 B1 | 6/2004 | Bilger |
| 6,759,956 B2 | 7/2004 | Menard et al. |
| 6,762,686 B1 | 7/2004 | Tabe |
| 6,778,085 B2 | 8/2004 | Faulkner et al. |
| 6,779,019 B1 | 8/2004 | Mousseau et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,795,863 B1 | 9/2004 | Doty, Jr. |
| 6,798,344 B2 | 9/2004 | Faulkner et al. |
| 6,804,638 B2 | 10/2004 | Fiedler |
| 6,810,409 B1 | 10/2004 | Fry et al. |
| 6,826,173 B1 | 11/2004 | Kung et al. |
| 6,826,233 B1 | 11/2004 | Oosawa |
| 6,829,478 B1 | 12/2004 | Layton et al. |
| 6,834,208 B2 | 12/2004 | Gonzales et al. |
| 6,850,252 B1 | 2/2005 | Hoffberg |
| 6,856,236 B2 | 2/2005 | Christensen et al. |
| 6,857,026 B1 | 2/2005 | Cain |
| 6,865,690 B2 | 3/2005 | Kocin |
| 6,871,193 B1 | 3/2005 | Campbell et al. |
| 6,873,256 B2 | 3/2005 | Lemelson et al. |
| 6,885,362 B2 | 4/2005 | Suomela |
| D504,889 S | 5/2005 | Andre et al. |
| 6,891,838 B1 | 5/2005 | Petite et al. |
| 6,912,429 B1 | 6/2005 | Bilger |
| 6,914,533 B2 | 7/2005 | Petite |
| 6,918,112 B2 | 7/2005 | Bourke-Dunphy et al. |
| 6,920,502 B2 | 7/2005 | Araujo et al. |
| 6,920,615 B1 | 7/2005 | Campbell et al. |
| 6,928,148 B2 | 8/2005 | Simon et al. |
| 6,930,599 B2 | 8/2005 | Naidoo et al. |
| 6,930,730 B2 | 8/2005 | Maxson et al. |
| 6,931,445 B2 | 8/2005 | Davis |
| 6,941,258 B2 | 9/2005 | Van Heijningen et al. |
| 6,943,681 B2 | 9/2005 | Rezvani et al. |
| 6,956,477 B2 | 10/2005 | Chun |
| 6,957,186 B1 | 10/2005 | Guheen et al. |
| 6,957,275 B1 | 10/2005 | Sekiguchi |
| 6,959,341 B1 | 10/2005 | Leung |
| 6,959,393 B2 | 10/2005 | Hollis et al. |
| 6,963,908 B1 | 11/2005 | Lynch et al. |
| 6,963,981 B1 | 11/2005 | Bailey et al. |
| 6,965,294 B1 | 11/2005 | Elliott et al. |
| 6,965,313 B1 | 11/2005 | Saylor et al. |
| 6,970,183 B1 | 11/2005 | Monroe |
| 6,971,076 B2 | 11/2005 | Chen |
| 6,972,676 B1 | 12/2005 | Kimmel et al. |
| 6,975,220 B1 | 12/2005 | Foodman et al. |
| 6,977,485 B1 | 12/2005 | Wei |
| 6,983,432 B2 | 1/2006 | Hayes |
| 6,990,591 B1 | 1/2006 | Pearson |

(56) References Cited

U.S. PATENT DOCUMENTS

| | | | |
|---|---|---|---|
| 6,993,658 B1 | 1/2006 | Engberg et al. |
| 6,999,992 B1 | 2/2006 | Deen et al. |
| 7,015,806 B2 | 3/2006 | Naidoo et al. |
| 7,016,970 B2 | 3/2006 | Harumoto et al. |
| 7,019,639 B2 | 3/2006 | Stilp |
| 7,020,697 B1 | 3/2006 | Goodman et al. |
| 7,020,701 B1 | 3/2006 | Gelvin et al. |
| 7,023,913 B1 | 4/2006 | Monroe |
| 7,023,914 B2 | 4/2006 | Furukawa et al. |
| 7,023,975 B2 * | 4/2006 | Mansfield | H04L 12/2856 379/167.01 |
| 7,024,676 B1 | 4/2006 | Klopfenstein |
| 7,028,328 B2 | 4/2006 | Kogane et al. |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,050,388 B2 | 5/2006 | Kim et al. |
| 7,053,764 B2 | 5/2006 | Stilp |
| 7,053,765 B1 | 5/2006 | Clark |
| 7,068,164 B1 | 6/2006 | Duncan et al. |
| 7,072,934 B2 | 7/2006 | Helgeson et al. |
| 7,073,140 B1 | 7/2006 | Li et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,085,814 B1 | 8/2006 | Gandhi et al. |
| 7,085,937 B1 | 8/2006 | Rezvani et al. |
| 7,086,018 B2 | 8/2006 | Ito |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,609 B2 | 10/2006 | Naidoo et al. |
| 7,119,674 B2 | 10/2006 | Sefton |
| 7,120,232 B2 | 10/2006 | Naidoo et al. |
| 7,120,233 B2 | 10/2006 | Naidoo et al. |
| 7,126,473 B1 | 10/2006 | Powell |
| 7,130,383 B2 | 10/2006 | Naidoo et al. |
| 7,130,585 B1 | 10/2006 | Ollis et al. |
| 7,134,138 B2 | 11/2006 | Scherr |
| 7,136,711 B1 | 11/2006 | Duncan et al. |
| 7,142,503 B1 * | 11/2006 | Grant | H04L 12/2852 370/217 |
| 7,148,810 B2 * | 12/2006 | Bhat | 340/692 |
| 7,149,798 B2 | 12/2006 | Rezvani et al. |
| 7,149,814 B2 | 12/2006 | Neufeld et al. |
| 7,158,026 B2 | 1/2007 | Feldkamp et al. |
| 7,158,776 B1 | 1/2007 | Estes et al. |
| 7,158,920 B2 | 1/2007 | Ishikawa |
| 7,164,907 B2 | 1/2007 | Cochran et al. |
| 7,166,987 B2 | 1/2007 | Lee et al. |
| 7,171,466 B2 | 1/2007 | Van Der Meulen |
| 7,171,686 B1 | 1/2007 | Jansen et al. |
| 7,174,564 B1 | 2/2007 | Weatherspoon et al. |
| 7,180,889 B1 | 2/2007 | Kung et al. |
| 7,181,207 B1 | 2/2007 | Chow et al. |
| 7,181,716 B2 | 2/2007 | Dahroug |
| 7,183,907 B2 | 2/2007 | Simon et al. |
| 7,184,848 B2 | 2/2007 | Krzyzanowski et al. |
| 7,187,986 B2 | 3/2007 | Johnson et al. |
| 7,203,486 B2 | 4/2007 | Patel |
| 7,209,945 B2 * | 4/2007 | Hicks et al. | 709/203 |
| 7,212,570 B2 | 5/2007 | Akiyama et al. |
| 7,213,061 B1 | 5/2007 | Hite et al. |
| 7,218,217 B2 | 5/2007 | Adonailo et al. |
| 7,222,359 B2 | 5/2007 | Freund et al. |
| 7,237,267 B2 | 6/2007 | Rayes et al. |
| 7,240,327 B2 | 7/2007 | Singh et al. |
| 7,248,150 B2 | 7/2007 | Mackjust et al. |
| 7,248,161 B2 | 7/2007 | Spoltore et al. |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,262,690 B2 | 8/2007 | Heaton et al. |
| 7,277,010 B2 | 10/2007 | Joao |
| 7,292,142 B2 | 11/2007 | Simon et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,340,314 B1 | 3/2008 | Duncan et al. |
| 7,343,619 B2 | 3/2008 | Ofek et al. |
| 7,346,338 B1 | 3/2008 | Calhoun et al. |
| 7,349,682 B1 | 3/2008 | Bennett, III et al. |
| 7,349,761 B1 | 3/2008 | Cruse |
| 7,349,967 B2 | 3/2008 | Wang |
| 7,356,372 B1 | 4/2008 | Duncan et al. |
| 7,359,843 B1 | 4/2008 | Keller et al. |
| 7,362,221 B2 | 4/2008 | Katz |
| 7,367,045 B2 | 4/2008 | Ofek et al. |
| 7,370,115 B2 | 5/2008 | Bae et al. |
| 7,383,339 B1 | 6/2008 | Meenan et al. |
| 7,383,522 B2 | 6/2008 | Murgai et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens, II et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,454,731 B2 | 11/2008 | Oh et al. |
| 7,457,869 B2 | 11/2008 | Kernan |
| 7,466,223 B2 | 12/2008 | Sefton |
| 7,469,139 B2 | 12/2008 | Van De Groenendaal |
| 7,469,294 B1 | 12/2008 | Luo et al. |
| 7,469,381 B2 | 12/2008 | Ording |
| 7,469,391 B2 | 12/2008 | Carrere et al. |
| D584,738 S | 1/2009 | Kim et al. |
| D585,399 S | 1/2009 | Hwang |
| 7,477,629 B2 | 1/2009 | Tsirtsis et al. |
| 7,479,949 B2 | 1/2009 | Jobs et al. |
| 7,480,713 B2 | 1/2009 | Ullman |
| 7,480,724 B2 | 1/2009 | Zimler et al. |
| 7,493,651 B2 | 2/2009 | Vaenskae et al. |
| 7,498,695 B2 | 3/2009 | Gaudreau et al. |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,549,134 B1 | 6/2009 | Li et al. |
| 7,551,071 B2 | 6/2009 | Bennett, III |
| 7,554,934 B2 | 6/2009 | Abraham et al. |
| 7,558,379 B2 | 7/2009 | Winick |
| 7,558,903 B2 | 7/2009 | Kinstler |
| 7,562,323 B1 | 7/2009 | Bai et al. |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,587,464 B2 | 9/2009 | Moorer et al. |
| 7,590,953 B2 | 9/2009 | Chang |
| 7,596,622 B2 | 9/2009 | Owen et al. |
| D602,014 S | 10/2009 | Andre et al. |

(56) References Cited

U.S. PATENT DOCUMENTS

| | | |
|---|---|---|
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,606,767 B1 | 10/2009 | Couper et al. |
| 7,610,555 B2 | 10/2009 | Klein et al. |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,651,530 B2 | 1/2010 | Winick |
| 7,653,911 B2 | 1/2010 | Doshi et al. |
| 7,671,729 B2 | 3/2010 | Hershkovitz et al. |
| 7,679,503 B2 | 3/2010 | Mason et al. |
| 7,681,201 B2 | 3/2010 | Dale et al. |
| 7,697,028 B1 | 4/2010 | Johnson |
| 7,701,970 B2 | 4/2010 | Krits et al. |
| D615,083 S | 5/2010 | Andre et al. |
| 7,711,796 B2 | 5/2010 | Gutt et al. |
| 7,720,654 B2 | 5/2010 | Hollis |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,747,975 B2 | 6/2010 | Dinter et al. |
| 7,751,409 B1 | 7/2010 | Carolan |
| 7,755,506 B1 | 7/2010 | Clegg et al. |
| 7,761,275 B2 | 7/2010 | Chopra et al. |
| 7,787,863 B2 | 8/2010 | Groenendaal et al. |
| 7,804,760 B2 | 9/2010 | Schmukler et al. |
| D624,896 S | 10/2010 | Park et al. |
| D626,437 S | 11/2010 | Lee et al. |
| 7,827,252 B2 | 11/2010 | Hopmann et al. |
| 7,847,675 B1 | 12/2010 | Thyen et al. |
| 7,855,635 B2 | 12/2010 | Cohn et al. |
| 7,859,404 B2 | 12/2010 | Chul et al. |
| 7,882,466 B2 | 2/2011 | Ishikawa |
| 7,882,537 B2 | 2/2011 | Okajo et al. |
| 7,884,855 B2 | 2/2011 | Ortiz |
| 7,890,612 B2 | 2/2011 | Todd et al. |
| 7,890,915 B2 | 2/2011 | Celik et al. |
| 7,899,732 B2 | 3/2011 | Van Beaumont et al. |
| 7,904,074 B2 | 3/2011 | Karaoguz et al. |
| 7,904,187 B2 | 3/2011 | Hoffberg et al. |
| 7,911,341 B2 | 3/2011 | Raji et al. |
| D636,769 S | 4/2011 | Wood et al. |
| 7,921,686 B2 | 4/2011 | Bagepalli et al. |
| D637,596 S | 5/2011 | Akana et al. |
| 7,949,960 B2 | 5/2011 | Roessler et al. |
| D639,805 S | 6/2011 | Song et al. |
| D640,663 S | 6/2011 | Arnholt et al. |
| 7,956,736 B2 | 6/2011 | Cohn et al. |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,032,881 B2 | 10/2011 | Holmberg et al. |
| 8,042,049 B2 | 10/2011 | Killian et al. |
| 8,046,411 B2 | 10/2011 | Hayashi et al. |
| 8,069,194 B1 | 11/2011 | Manber et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,144,836 B2 | 3/2012 | Naidoo et al. |
| 8,159,519 B2 | 4/2012 | Kurtz et al. |
| 8,159,945 B2 | 4/2012 | Muro et al. |
| 8,196,064 B2 | 6/2012 | Krzyzanowski et al. |
| 8,200,827 B1 | 6/2012 | Hunyady et al. |
| 8,205,181 B1 | 6/2012 | Singla et al. |
| 8,209,400 B2 | 6/2012 | Baum et al. |
| D663,298 S | 7/2012 | Song et al. |
| D664,540 S | 7/2012 | Kim et al. |
| 8,214,494 B1 | 7/2012 | Slavin |
| 8,214,496 B2 | 7/2012 | Gutt et al. |
| D664,954 S | 8/2012 | Kim et al. |
| D666,198 S | 8/2012 | Van Den Nieuwenhuizen et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 | 9/2012 | Elberbaum |
| 8,269,623 B2 | 9/2012 | Addy et al. |
| 8,271,881 B2 | 9/2012 | Moorer et al. |
| 8,272,053 B2 | 9/2012 | Markham et al. |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| 8,336,010 B1 | 12/2012 | Chang et al. |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| 8,350,694 B1 | 1/2013 | Slavin et al. |
| D675,588 S | 2/2013 | Park |
| D675,612 S | 2/2013 | Andre et al. |
| D676,443 S | 2/2013 | Canizares et al. |
| D676,819 S | 2/2013 | Choi |
| 8,373,313 B2 | 2/2013 | Maurer et al. |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| 8,400,767 B2 | 3/2013 | Yeom et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| 8,413,204 B2 | 4/2013 | White et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,456,293 B1 | 6/2013 | Trundle et al. |
| 8,473,619 B2 | 6/2013 | Baum et al. |
| D685,778 S | 7/2013 | Fahrendorff et al. |
| D685,783 S | 7/2013 | Bryan et al. |
| 8,478,450 B2 | 7/2013 | Lu et al. |
| 8,478,844 B2 | 7/2013 | Baum et al. |
| 8,478,871 B2 | 7/2013 | Gutt et al. |
| 8,483,853 B1 | 7/2013 | Lambourne |

(56) References Cited

U.S. PATENT DOCUMENTS

| | | |
|---|---|---|
| 8,493,202 B1 | 7/2013 | Trundle et al. |
| 8,499,038 B1 | 7/2013 | Vucurevich |
| 8,520,068 B2 | 8/2013 | Naidoo et al. |
| 8,520,072 B1 | 8/2013 | Slavin et al. |
| 8,525,664 B2 | 9/2013 | Hadizad et al. |
| 8,543,665 B2 | 9/2013 | Ansari et al. |
| D692,042 S | 10/2013 | Dawes et al. |
| 8,554,478 B2 | 10/2013 | Hartman |
| 8,570,993 B2 | 10/2013 | Austin et al. |
| 8,584,199 B1 | 11/2013 | Chen et al. |
| D695,735 S | 12/2013 | Kitchen et al. |
| 8,599,018 B2 | 12/2013 | Kellen et al. |
| 8,612,591 B2 | 12/2013 | Dawes et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,666,560 B2 | 3/2014 | Lu et al. |
| 8,675,071 B1 | 3/2014 | Slavin et al. |
| 8,713,132 B2 | 4/2014 | Baum et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,819,178 B2 | 8/2014 | Baum et al. |
| 8,825,871 B2 | 9/2014 | Baum et al. |
| 8,836,467 B1 | 9/2014 | Cohn et al. |
| 8,885,552 B2 | 11/2014 | Bedingfield, Sr. et al. |
| 8,902,740 B2 | 12/2014 | Hicks, III |
| 8,914,526 B1 * | 12/2014 | Lindquist et al. ............ 709/229 |
| 8,935,236 B2 | 1/2015 | Morita et al. |
| 8,937,658 B2 | 1/2015 | Hicks et al. |
| 8,953,479 B2 | 2/2015 | Hall et al. |
| 8,953,749 B2 | 2/2015 | Naidoo et al. |
| 8,963,713 B2 | 2/2015 | Dawes et al. |
| 8,976,763 B2 | 3/2015 | Shrestha et al. |
| 8,988,217 B2 | 3/2015 | Piccolo, III |
| 8,988,221 B2 | 3/2015 | Raji et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,147,337 B2 | 9/2015 | Cohn et al. |
| 9,160,784 B2 | 10/2015 | Jeong et al. |
| 9,170,707 B1 | 10/2015 | Laska et al. |
| 9,172,532 B1 | 10/2015 | Fuller et al. |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,729,342 B2 | 8/2017 | Cohn et al. |
| 9,779,595 B2 | 10/2017 | Thibault |
| 9,843,458 B2 | 12/2017 | Cronin |
| 9,876,651 B2 | 1/2018 | Cho et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 2001/0016501 A1 | 8/2001 | King |
| 2001/0029585 A1 | 10/2001 | Simon et al. |
| 2001/0030597 A1 | 10/2001 | Inoue et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0046366 A1 | 11/2001 | Susskind |
| 2001/0053207 A1 * | 12/2001 | Jeon ................... H04B 3/542 |
| | | 379/90.01 |
| 2001/0054115 A1 | 12/2001 | Ferguson et al. |
| 2002/0004828 A1 | 1/2002 | Davis et al. |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0029276 A1 | 3/2002 | Bendinelli et al. |
| 2002/0031120 A1 | 3/2002 | Rakib |
| 2002/0037004 A1 | 3/2002 | Bossemeyer et al. |
| 2002/0038380 A1 | 3/2002 | Brawn et al. |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 * | 5/2002 | Rakib ................... 725/119 |
| 2002/0068984 A1 | 6/2002 | Alexander et al. |
| 2002/0077077 A1 | 6/2002 | Rezvani et al. |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0118796 A1 | 8/2002 | Menard et al. |
| 2002/0120696 A1 | 8/2002 | Mousseau et al. |
| 2002/0120790 A1 | 8/2002 | Schwalb |
| 2002/0128728 A1 | 9/2002 | Murakami et al. |
| 2002/0131404 A1 | 9/2002 | Mehta et al. |
| 2002/0133539 A1 | 9/2002 | Monday |
| 2002/0133578 A1 | 9/2002 | Wu |
| 2002/0143805 A1 * | 10/2002 | Hayes ................... G06F 1/1626 |
| | | 345/169 |
| 2002/0143923 A1 | 10/2002 | Alexander |
| 2002/0147982 A1 | 10/2002 | Naidoo et al. |
| 2002/0152298 A1 | 10/2002 | Kikta et al. |
| 2002/0156564 A1 | 10/2002 | Preston et al. |
| 2002/0163534 A1 | 11/2002 | Choi et al. |
| 2002/0163997 A1 | 11/2002 | Bergman et al. |
| 2002/0165006 A1 | 11/2002 | Haller et al. |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178211 A1 | 11/2002 | Singhal et al. |
| 2002/0180579 A1 | 12/2002 | Nagaoka et al. |
| 2002/0184301 A1 * | 12/2002 | Parent ................... 709/203 |
| 2002/0184527 A1 | 12/2002 | Chun et al. |
| 2002/0191636 A1 * | 12/2002 | Hallenbeck .......... G04G 13/021 |
| | | 370/465 |
| 2003/0005030 A1 | 1/2003 | Sutton et al. |
| 2003/0009552 A1 | 1/2003 | Benfield et al. |
| 2003/0009553 A1 | 1/2003 | Benfield et al. |
| 2003/0023839 A1 | 1/2003 | Burkhardt et al. |
| 2003/0025599 A1 | 2/2003 | Monroe |

(56) References Cited

U.S. PATENT DOCUMENTS

| | | | |
|---|---|---|---|
| 2003/0030548 A1 | 2/2003 | Kovacs et al. | |
| 2003/0031165 A1 | 2/2003 | O'Brien, Jr. | |
| 2003/0038730 A1 | 2/2003 | Imafuku et al. | |
| 2003/0038849 A1 | 2/2003 | Craven et al. | |
| 2003/0039242 A1 | 2/2003 | Moore | |
| 2003/0041137 A1* | 2/2003 | Horie et al. | 709/223 |
| 2003/0041167 A1 | 2/2003 | French et al. | |
| 2003/0051009 A1* | 3/2003 | Shah et al. | 709/220 |
| 2003/0051026 A1 | 3/2003 | Carter et al. | |
| 2003/0052905 A1 | 3/2003 | Gordon et al. | |
| 2003/0052923 A1 | 3/2003 | Porter | |
| 2003/0056014 A1* | 3/2003 | Verberkt | H04L 12/5695 709/249 |
| 2003/0061344 A1 | 3/2003 | Monroe | |
| 2003/0061615 A1 | 3/2003 | Van Der Meulen | |
| 2003/0061621 A1 | 3/2003 | Petty et al. | |
| 2003/0062997 A1* | 4/2003 | Naidoo et al. | 340/531 |
| 2003/0065407 A1 | 4/2003 | Johnson et al. | |
| 2003/0065757 A1 | 4/2003 | Mentze et al. | |
| 2003/0065791 A1 | 4/2003 | Garg et al. | |
| 2003/0067923 A1 | 4/2003 | Ju et al. | |
| 2003/0071724 A1 | 4/2003 | D'Amico | |
| 2003/0081768 A1 | 5/2003 | Caminschi et al. | |
| 2003/0090473 A1 | 5/2003 | Joshi | |
| 2003/0096590 A1* | 5/2003 | Satoh | G08B 21/02 455/404.1 |
| 2003/0101459 A1 | 5/2003 | Edson | |
| 2003/0103088 A1 | 6/2003 | Dresti et al. | |
| 2003/0112866 A1 | 6/2003 | Yu et al. | |
| 2003/0113100 A1 | 6/2003 | Hecht et al. | |
| 2003/0115345 A1 | 6/2003 | Chien et al. | |
| 2003/0128114 A1 | 7/2003 | Quigley | |
| 2003/0128115 A1 | 7/2003 | Giacopelli et al. | |
| 2003/0132018 A1 | 7/2003 | Okita et al. | |
| 2003/0137426 A1 | 7/2003 | Anthony et al. | |
| 2003/0147534 A1 | 8/2003 | Ablay et al. | |
| 2003/0149671 A1 | 8/2003 | Yamamoto et al. | |
| 2003/0153325 A1 | 8/2003 | Veerepalli et al. | |
| 2003/0155757 A1 | 8/2003 | Larsen et al. | |
| 2003/0158635 A1 | 8/2003 | Pillar et al. | |
| 2003/0159135 A1 | 8/2003 | Hiller et al. | |
| 2003/0174154 A1 | 9/2003 | Yukie et al. | |
| 2003/0174648 A1 | 9/2003 | Wang et al. | |
| 2003/0177236 A1 | 9/2003 | Goto et al. | |
| 2003/0182396 A1 | 9/2003 | Reich et al. | |
| 2003/0182640 A1 | 9/2003 | Alani et al. | |
| 2003/0184436 A1 | 10/2003 | Seales et al. | |
| 2003/0187920 A1 | 10/2003 | Redkar | |
| 2003/0187938 A1 | 10/2003 | Mousseau et al. | |
| 2003/0189509 A1 | 10/2003 | Hayes et al. | |
| 2003/0197847 A1 | 10/2003 | Shinoda | |
| 2003/0200285 A1 | 10/2003 | Hansen et al. | |
| 2003/0200325 A1 | 10/2003 | Krishnaswamy et al. | |
| 2003/0201889 A1 | 10/2003 | Zulkowski | |
| 2003/0210126 A1 | 11/2003 | Kanazawa | |
| 2003/0217136 A1 | 11/2003 | Cho et al. | |
| 2003/0225883 A1 | 12/2003 | Greaves et al. | |
| 2003/0230934 A1 | 12/2003 | Cordelli et al. | |
| 2003/0233155 A1 | 12/2003 | Slemmer et al. | |
| 2003/0233332 A1 | 12/2003 | Keeler et al. | |
| 2003/0234725 A1 | 12/2003 | Lemelson et al. | |
| 2003/0236841 A1 | 12/2003 | Epshteyn | |
| 2004/0003051 A1 | 1/2004 | Krzyzanowski et al. | |
| 2004/0003241 A1 | 1/2004 | Sengodan et al. | |
| 2004/0008724 A1 | 1/2004 | Devine et al. | |
| 2004/0015572 A1 | 1/2004 | Kang | |
| 2004/0024851 A1 | 2/2004 | Naidoo et al. | |
| 2004/0034798 A1 | 2/2004 | Yamada et al. | |
| 2004/0036615 A1 | 2/2004 | Candela | |
| 2004/0037295 A1 | 2/2004 | Tanaka et al. | |
| 2004/0041910 A1 | 3/2004 | Naidoo et al. | |
| 2004/0054789 A1 | 3/2004 | Breh et al. | |
| 2004/0068657 A1 | 4/2004 | Alexander et al. | |
| 2004/0086088 A1 | 5/2004 | Naidoo et al. | |
| 2004/0086090 A1 | 5/2004 | Naidoo et al. | |
| 2004/0086093 A1 | 5/2004 | Schranz | |
| 2004/0093492 A1 | 5/2004 | Daude et al. | |
| 2004/0103308 A1 | 5/2004 | Paller | |
| 2004/0107299 A1* | 6/2004 | Lee | H04L 12/2803 709/249 |
| 2004/0113770 A1 | 6/2004 | Falk et al. | |
| 2004/0113778 A1 | 6/2004 | Script et al. | |
| 2004/0113937 A1 | 6/2004 | Sawdey et al. | |
| 2004/0117330 A1* | 6/2004 | Ehlers et al. | 705/412 |
| 2004/0117462 A1 | 6/2004 | Bodin et al. | |
| 2004/0117465 A1 | 6/2004 | Bodin et al. | |
| 2004/0123149 A1 | 6/2004 | Tyroler | |
| 2004/0125146 A1* | 7/2004 | Gerlach | G05B 19/4184 715/772 |
| 2004/0137915 A1 | 7/2004 | Diener et al. | |
| 2004/0139227 A1 | 7/2004 | Takeda | |
| 2004/0143749 A1 | 7/2004 | Tajalli et al. | |
| 2004/0155757 A1 | 8/2004 | Litwin et al. | |
| 2004/0162902 A1 | 8/2004 | Davis | |
| 2004/0163073 A1 | 8/2004 | Krzyzanowski et al. | |
| 2004/0163118 A1 | 8/2004 | Mottur | |
| 2004/0169288 A1 | 9/2004 | Hsieh et al. | |
| 2004/0170155 A1 | 9/2004 | Omar et al. | |
| 2004/0172396 A1 | 9/2004 | Vanska et al. | |
| 2004/0177163 A1 | 9/2004 | Casey et al. | |
| 2004/0181693 A1 | 9/2004 | Milliot et al. | |
| 2004/0183756 A1 | 9/2004 | Freitas et al. | |
| 2004/0189460 A1 | 9/2004 | Heaton et al. | |
| 2004/0189871 A1 | 9/2004 | Kurosawa et al. | |
| 2004/0196844 A1 | 10/2004 | Hagino | |
| 2004/0198386 A1 | 10/2004 | Dupray | |
| 2004/0199645 A1 | 10/2004 | Rouhi | |
| 2004/0201472 A1 | 10/2004 | McGunn et al. | |
| 2004/0202351 A1 | 10/2004 | Park et al. | |
| 2004/0212497 A1 | 10/2004 | Stilp | |
| 2004/0212503 A1 | 10/2004 | Stilp | |
| 2004/0215694 A1* | 10/2004 | Podolsky | 709/201 |
| 2004/0215700 A1 | 10/2004 | Shenfield et al. | |
| 2004/0215750 A1 | 10/2004 | Stilp | |
| 2004/0223605 A1 | 11/2004 | Donnelly | |
| 2004/0229569 A1 | 11/2004 | Franz | |
| 2004/0243835 A1 | 12/2004 | Terzis et al. | |
| 2004/0243996 A1 | 12/2004 | Sheehy et al. | |
| 2004/0246339 A1 | 12/2004 | Ooshima et al. | |
| 2004/0249613 A1* | 12/2004 | Sprogis | G06F 11/0748 702/188 |
| 2004/0249922 A1 | 12/2004 | Hackman et al. | |
| 2004/0257433 A1 | 12/2004 | Lia et al. | |
| 2004/0260407 A1 | 12/2004 | Wimsatt | |
| 2004/0260427 A1* | 12/2004 | Wimsatt | G05B 15/02 700/275 |
| 2004/0263314 A1 | 12/2004 | Dorai et al. | |
| 2004/0266493 A1 | 12/2004 | Bahl et al. | |
| 2004/0267385 A1 | 12/2004 | Lingemann | |
| 2004/0267937 A1 | 12/2004 | Klemets | |
| 2005/0010866 A1 | 1/2005 | Humpleman et al. | |
| 2005/0015805 A1 | 1/2005 | Iwamura | |
| 2005/0021309 A1 | 1/2005 | Alexander et al. | |
| 2005/0022210 A1 | 1/2005 | Zintel et al. | |
| 2005/0023858 A1 | 2/2005 | Bingle et al. | |
| 2005/0024203 A1 | 2/2005 | Wolfe | |
| 2005/0030928 A1 | 2/2005 | Virtanen et al. | |
| 2005/0033513 A1 | 2/2005 | Gasbarro | |
| 2005/0038325 A1 | 2/2005 | Moll | |
| 2005/0038326 A1 | 2/2005 | Mathur | |
| 2005/0044061 A1 | 2/2005 | Klemow | |
| 2005/0052831 A1 | 3/2005 | Chen | |
| 2005/0055716 A1 | 3/2005 | Louie et al. | |
| 2005/0057361 A1 | 3/2005 | Giraldo et al. | |
| 2005/0060163 A1 | 3/2005 | Barsness et al. | |
| 2005/0060411 A1 | 3/2005 | Coulombe et al. | |
| 2005/0066045 A1 | 3/2005 | Johnson et al. | |
| 2005/0066912 A1 | 3/2005 | Korbitz et al. | |
| 2005/0069098 A1 | 3/2005 | Kalervo et al. | |
| 2005/0079855 A1 | 4/2005 | Jethi et al. | |
| 2005/0081161 A1 | 4/2005 | Macinnes et al. | |
| 2005/0086126 A1 | 4/2005 | Patterson | |
| 2005/0086211 A1 | 4/2005 | Mayer | |
| 2005/0086366 A1 | 4/2005 | Luebke et al. | |

(56) References Cited

U.S. PATENT DOCUMENTS

| | | |
|---|---|---|
| 2005/0088983 A1 | 4/2005 | Wesslen et al. |
| 2005/0089023 A1 | 4/2005 | Barkley et al. |
| 2005/0090915 A1 | 4/2005 | Geiwitz |
| 2005/0091435 A1 | 4/2005 | Han et al. |
| 2005/0091696 A1 | 4/2005 | Wolfe et al. |
| 2005/0096753 A1 | 5/2005 | Arling et al. |
| 2005/0097478 A1 | 5/2005 | Killian et al. |
| 2005/0101314 A1 | 5/2005 | Levi |
| 2005/0102152 A1 | 5/2005 | Hodges |
| 2005/0108091 A1 | 5/2005 | Sotak et al. |
| 2005/0108369 A1 | 5/2005 | Sather et al. |
| 2005/0114900 A1 | 5/2005 | Ladd et al. |
| 2005/0119913 A1 | 6/2005 | Hornreich et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0128093 A1 | 6/2005 | Genova et al. |
| 2005/0144312 A1 | 6/2005 | Kadyk et al. |
| 2005/0148356 A1 | 7/2005 | Ferguson et al. |
| 2005/0149639 A1 | 7/2005 | Vrielink et al. |
| 2005/0149746 A1 | 7/2005 | Lu et al. |
| 2005/0154494 A1 | 7/2005 | Ahmed |
| 2005/0155757 A1 | 7/2005 | Paton |
| 2005/0156568 A1 | 7/2005 | Yueh |
| 2005/0159823 A1 | 7/2005 | Hayes et al. |
| 2005/0159911 A1 | 7/2005 | Funk et al. |
| 2005/0169288 A1 | 8/2005 | Kamiwada et al. |
| 2005/0174229 A1 | 8/2005 | Feldkamp et al. |
| 2005/0184865 A1 | 8/2005 | Han et al. |
| 2005/0188315 A1 | 8/2005 | Campbell et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0207429 A1 | 9/2005 | Akita et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0222820 A1 | 10/2005 | Chung et al. |
| 2005/0222933 A1 | 10/2005 | Wesby |
| 2005/0231349 A1 | 10/2005 | Bhat |
| 2005/0234568 A1 | 10/2005 | Chung et al. |
| 2005/0237182 A1 | 10/2005 | Wang |
| 2005/0249199 A1 | 11/2005 | Albert et al. |
| 2005/0253706 A1* | 11/2005 | Spoltore .............. G08B 25/008 340/539.14 |
| 2005/0256608 A1 | 11/2005 | King et al. |
| 2005/0260973 A1 | 11/2005 | Van De Groenendaal |
| 2005/0262241 A1 | 11/2005 | Gubbi et al. |
| 2005/0267605 A1 | 12/2005 | Lee et al. |
| 2005/0270151 A1 | 12/2005 | Winick |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2005/0285941 A1 | 12/2005 | Haigh et al. |
| 2006/0009863 A1 | 1/2006 | Lingemann |
| 2006/0010078 A1 | 1/2006 | Rezvani et al. |
| 2006/0018328 A1 | 1/2006 | Mody et al. |
| 2006/0022816 A1 | 2/2006 | Yukawa |
| 2006/0023847 A1 | 2/2006 | Tyroler et al. |
| 2006/0025132 A1 | 2/2006 | Karaoguz et al. |
| 2006/0031852 A1 | 2/2006 | Chu et al. |
| 2006/0045074 A1 | 3/2006 | Lee |
| 2006/0050692 A1 | 3/2006 | Petrescu et al. |
| 2006/0050862 A1 | 3/2006 | Shen et al. |
| 2006/0051122 A1 | 3/2006 | Kawazu et al. |
| 2006/0053447 A1 | 3/2006 | Krzyzanowski et al. |
| 2006/0053491 A1 | 3/2006 | Khuti et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067356 A1 | 3/2006 | Kim et al. |
| 2006/0067484 A1 | 3/2006 | Elliot et al. |
| 2006/0075235 A1 | 4/2006 | Renkis |
| 2006/0077254 A1 | 4/2006 | Shu et al. |
| 2006/0078344 A1 | 4/2006 | Kawazu et al. |
| 2006/0080465 A1 | 4/2006 | Conzola et al. |
| 2006/0088092 A1 | 4/2006 | Chen et al. |
| 2006/0092011 A1 | 5/2006 | Simon et al. |
| 2006/0093365 A1 | 5/2006 | Dybsetter et al. |
| 2006/0101062 A1 | 5/2006 | Godman et al. |
| 2006/0103510 A1 | 5/2006 | Chen et al. |
| 2006/0103520 A1 | 5/2006 | Clark |
| 2006/0104312 A1 | 5/2006 | Friar |
| 2006/0105713 A1 | 5/2006 | Zheng et al. |
| 2006/0109113 A1 | 5/2006 | Reyes et al. |
| 2006/0111095 A1 | 5/2006 | Weigand |
| 2006/0129837 A1 | 6/2006 | Im et al. |
| 2006/0132302 A1 | 6/2006 | Stilp |
| 2006/0136558 A1 | 6/2006 | Sheehan et al. |
| 2006/0142880 A1 | 6/2006 | Deen et al. |
| 2006/0142968 A1 | 6/2006 | Han et al. |
| 2006/0143268 A1 | 6/2006 | Chatani |
| 2006/0145842 A1 | 7/2006 | Stilp |
| 2006/0154642 A1 | 7/2006 | Scannell, Jr. |
| 2006/0155851 A1 | 7/2006 | Ma et al. |
| 2006/0159032 A1 | 7/2006 | Ukrainetz et al. |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0168178 A1 | 7/2006 | Hwang et al. |
| 2006/0181406 A1 | 8/2006 | Petite et al. |
| 2006/0182100 A1 | 8/2006 | Li et al. |
| 2006/0183460 A1 | 8/2006 | Srinivasan et al. |
| 2006/0187900 A1 | 8/2006 | Akbar |
| 2006/0190458 A1 | 8/2006 | Mishina et al. |
| 2006/0190529 A1 | 8/2006 | Morozumi et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0208872 A1 | 9/2006 | Yu et al. |
| 2006/0208880 A1 | 9/2006 | Funk et al. |
| 2006/0209857 A1 | 9/2006 | Hicks, III |
| 2006/0215650 A1 | 9/2006 | Wollmershauser et al. |
| 2006/0218593 A1 | 9/2006 | Afshary et al. |
| 2006/0220830 A1 | 10/2006 | Bennett, III |
| 2006/0222153 A1 | 10/2006 | Tarkoff et al. |
| 2006/0229746 A1 | 10/2006 | Ollis et al. |
| 2006/0230270 A1 | 10/2006 | Goffin |
| 2006/0235963 A1 | 10/2006 | Wetherly et al. |
| 2006/0242395 A1 | 10/2006 | Fausak |
| 2006/0245369 A1 | 11/2006 | Schimmelpfeng et al. |
| 2006/0246919 A1 | 11/2006 | Park et al. |
| 2006/0250235 A1 | 11/2006 | Astrin |
| 2006/0258342 A1 | 11/2006 | Fok et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0043478 A1 | 2/2007 | Ehlers et al. |
| 2007/0043954 A1 | 2/2007 | Fox |
| 2007/0047585 A1 | 3/2007 | Gillespie et al. |
| 2007/0052675 A1 | 3/2007 | Chang |
| 2007/0055770 A1 | 3/2007 | Karmakar et al. |
| 2007/0058627 A1 | 3/2007 | Smith et al. |
| 2007/0061018 A1 | 3/2007 | Callaghan et al. |
| 2007/0061266 A1 | 3/2007 | Moore et al. |
| 2007/0061430 A1 | 3/2007 | Kim |
| 2007/0061878 A1 | 3/2007 | Hagiu et al. |
| 2007/0063836 A1 | 3/2007 | Hayden et al. |
| 2007/0063866 A1 | 3/2007 | Webb |
| 2007/0064714 A1 | 3/2007 | Bi et al. |
| 2007/0079151 A1 | 4/2007 | Connor et al. |
| 2007/0079385 A1 | 4/2007 | Williams et al. |

(56) References Cited

U.S. PATENT DOCUMENTS

| | | |
|---|---|---|
| 2007/0090944 A1 | 4/2007 | Du Breuil |
| 2007/0096981 A1 | 5/2007 | Abraham |
| 2007/0101345 A1 | 5/2007 | Takagi |
| 2007/0103433 A1 | 5/2007 | Katz |
| 2007/0106124 A1 | 5/2007 | Kuriyama et al. |
| 2007/0116020 A1 | 5/2007 | Cheever et al. |
| 2007/0117464 A1 | 5/2007 | Freeman |
| 2007/0118609 A1 | 5/2007 | Mullan et al. |
| 2007/0130286 A1 | 6/2007 | Hopmann et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143440 A1 | 6/2007 | Reckamp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0160017 A1 | 7/2007 | Meier et al. |
| 2007/0162228 A1 | 7/2007 | Mitchell |
| 2007/0162680 A1 | 7/2007 | Mitchell et al. |
| 2007/0168860 A1 | 7/2007 | Takayama et al. |
| 2007/0182543 A1 | 8/2007 | Luo |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0198698 A1 | 8/2007 | Boyd et al. |
| 2007/0214262 A1 | 9/2007 | Buchbinder et al. |
| 2007/0216764 A1 | 9/2007 | Kwak |
| 2007/0216783 A1 | 9/2007 | Ortiz et al. |
| 2007/0218895 A1 | 9/2007 | Saito et al. |
| 2007/0223465 A1 | 9/2007 | Wang et al. |
| 2007/0226182 A1 | 9/2007 | Sobotka et al. |
| 2007/0230415 A1 | 10/2007 | Malik |
| 2007/0245223 A1 | 10/2007 | Siedzik et al. |
| 2007/0255856 A1 | 11/2007 | Reckamp et al. |
| 2007/0256105 A1 | 11/2007 | Tabe |
| 2007/0257986 A1 | 11/2007 | Ivanov et al. |
| 2007/0260713 A1 | 11/2007 | Moorer et al. |
| 2007/0263782 A1 | 11/2007 | Stock et al. |
| 2007/0265866 A1 | 11/2007 | Fehling et al. |
| 2007/0271398 A1 | 11/2007 | Manchester et al. |
| 2007/0275703 A1 | 11/2007 | Lim et al. |
| 2007/0282665 A1 | 12/2007 | Buehler et al. |
| 2007/0283001 A1 | 12/2007 | Spiess et al. |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0288858 A1 | 12/2007 | Pereira |
| 2007/0290830 A1 | 12/2007 | Gurley |
| 2007/0296814 A1 | 12/2007 | Cooper et al. |
| 2007/0298772 A1 | 12/2007 | Owens et al. |
| 2008/0001734 A1 | 1/2008 | Stilp et al. |
| 2008/0013957 A1 | 1/2008 | Akers et al. |
| 2008/0027587 A1 | 1/2008 | Nickerson et al. |
| 2008/0042826 A1 | 2/2008 | Hevia et al. |
| 2008/0048861 A1 | 2/2008 | Naidoo et al. |
| 2008/0048975 A1 | 2/2008 | Leibow |
| 2008/0056261 A1 | 3/2008 | Osborn et al. |
| 2008/0059533 A1 | 3/2008 | Krikorian |
| 2008/0059622 A1 | 3/2008 | Hite et al. |
| 2008/0065681 A1 | 3/2008 | Fontijn et al. |
| 2008/0072244 A1 | 3/2008 | Eker et al. |
| 2008/0074258 A1 | 3/2008 | Bennett et al. |
| 2008/0082186 A1 | 4/2008 | Hood et al. |
| 2008/0084294 A1 | 4/2008 | Zhiying et al. |
| 2008/0084296 A1 | 4/2008 | Kutzik et al. |
| 2008/0086564 A1 | 4/2008 | Putman et al. |
| 2008/0091793 A1 | 4/2008 | Diroo et al. |
| 2008/0102845 A1 | 5/2008 | Zhao |
| 2008/0103608 A1 | 5/2008 | Gough et al. |
| 2008/0104215 A1 | 5/2008 | Excoffier et al. |
| 2008/0104516 A1 | 5/2008 | Lee |
| 2008/0109302 A1 | 5/2008 | Salokannel et al. |
| 2008/0109650 A1 | 5/2008 | Shim et al. |
| 2008/0112340 A1 | 5/2008 | Luebke |
| 2008/0112405 A1 | 5/2008 | Cholas et al. |
| 2008/0117029 A1 | 5/2008 | Dohrmann et al. |
| 2008/0117201 A1 | 5/2008 | Martinez et al. |
| 2008/0126535 A1 | 5/2008 | Zhu et al. |
| 2008/0129821 A1 | 6/2008 | Howarter et al. |
| 2008/0130949 A1 | 6/2008 | Ivanov et al. |
| 2008/0133725 A1 | 6/2008 | Shaouy |
| 2008/0134343 A1 | 6/2008 | Pennington et al. |
| 2008/0141303 A1 | 6/2008 | Walker et al. |
| 2008/0141341 A1 | 6/2008 | Vinogradov et al. |
| 2008/0144884 A1 | 6/2008 | Habibi |
| 2008/0147834 A1 | 6/2008 | Quinn et al. |
| 2008/0155470 A1 | 6/2008 | Khedouri et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0181239 A1 | 7/2008 | Wood et al. |
| 2008/0183483 A1 | 7/2008 | Hart |
| 2008/0183842 A1 | 7/2008 | Raji et al. |
| 2008/0189609 A1 | 8/2008 | Larson et al. |
| 2008/0204190 A1 | 8/2008 | Cohn et al. |
| 2008/0204219 A1 | 8/2008 | Cohn et al. |
| 2008/0209505 A1 | 8/2008 | Ghai et al. |
| 2008/0209506 A1 | 8/2008 | Ghai et al. |
| 2008/0215450 A1 | 9/2008 | Gates et al. |
| 2008/0219239 A1 | 9/2008 | Bell et al. |
| 2008/0221715 A1 | 9/2008 | Krzyzanowski et al. |
| 2008/0235326 A1 | 9/2008 | Parsi et al. |
| 2008/0235600 A1 | 9/2008 | Harper et al. |
| 2008/0239075 A1 | 10/2008 | Mehrotra et al. |
| 2008/0240372 A1 | 10/2008 | Frenette |
| 2008/0240696 A1 | 10/2008 | Kucharyson |
| 2008/0253391 A1 | 10/2008 | Krits et al. |
| 2008/0261540 A1 | 10/2008 | Rohani et al. |
| 2008/0266080 A1 | 10/2008 | Leung et al. |
| 2008/0266257 A1 | 10/2008 | Chiang |
| 2008/0271150 A1 | 10/2008 | Boerger et al. |
| 2008/0284587 A1 | 11/2008 | Saigh et al. |
| 2008/0297599 A1 | 12/2008 | Donovan et al. |
| 2008/0313316 A1 | 12/2008 | Hite et al. |
| 2008/0316024 A1 | 12/2008 | Chantelou et al. |
| 2009/0007596 A1 | 1/2009 | Goldstein et al. |
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |
| 2009/0049488 A1 | 2/2009 | Stransky |
| 2009/0055760 A1 | 2/2009 | Whatcott et al. |
| 2009/0063582 A1 | 3/2009 | Anna et al. |
| 2009/0066534 A1 | 3/2009 | Sivakkolundhu |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0074184 A1 | 3/2009 | Baum et al. |
| 2009/0076211 A1 | 3/2009 | Yang et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0079547 A1 | 3/2009 | Oksanen et al. |
| 2009/0086660 A1 | 4/2009 | Sood et al. |
| 2009/0100329 A1 | 4/2009 | Espinoza |
| 2009/0100492 A1 | 4/2009 | Hicks, III et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |

(56) References Cited

U.S. PATENT DOCUMENTS

| | | |
|---|---|---|
| 2009/0146846 A1 | 6/2009 | Grossman |
| 2009/0158189 A1 | 6/2009 | Itani |
| 2009/0158292 A1 | 6/2009 | Rattner et al. |
| 2009/0161609 A1 | 6/2009 | Bergstrom |
| 2009/0165114 A1 | 6/2009 | Baum et al. |
| 2009/0172443 A1 | 7/2009 | Rothman et al. |
| 2009/0177906 A1 | 7/2009 | Paniagua, Jr. et al. |
| 2009/0187297 A1 | 7/2009 | Kish et al. |
| 2009/0193373 A1 | 7/2009 | Abbaspour et al. |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260430 A1 | 10/2009 | Zamfes |
| 2009/0265042 A1 | 10/2009 | Mollenkopf et al. |
| 2009/0265193 A1 | 10/2009 | Collins et al. |
| 2009/0289787 A1 | 11/2009 | Dawson et al. |
| 2009/0303100 A1 | 12/2009 | Zemany |
| 2009/0307255 A1 | 12/2009 | Park |
| 2009/0313693 A1 | 12/2009 | Rogers |
| 2009/0322510 A1 | 12/2009 | Berger et al. |
| 2009/0324010 A1 | 12/2009 | Hou |
| 2010/0000791 A1 | 1/2010 | Alberty |
| 2010/0001812 A1 | 1/2010 | Kausch |
| 2010/0008274 A1 | 1/2010 | Kneckt et al. |
| 2010/0023865 A1 | 1/2010 | Fulker et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0052612 A1 | 3/2010 | Raji et al. |
| 2010/0066530 A1 | 3/2010 | Cohn et al. |
| 2010/0067371 A1 | 3/2010 | Gogic et al. |
| 2010/0074112 A1 | 3/2010 | Derr et al. |
| 2010/0077111 A1 | 3/2010 | Holmes et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0100269 A1 | 4/2010 | Ekhaguere et al. |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0145485 A1 | 6/2010 | Duchene et al. |
| 2010/0153853 A1 | 6/2010 | Dawes et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0197219 A1 | 8/2010 | Issa et al. |
| 2010/0204839 A1 | 8/2010 | Behm et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0238286 A1 | 9/2010 | Boghossian et al. |
| 2010/0241711 A1 | 9/2010 | Ansari et al. |
| 2010/0245107 A1 | 9/2010 | Fulker et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0277300 A1 | 11/2010 | Cohn et al. |
| 2010/0277302 A1 | 11/2010 | Cohn et al. |
| 2010/0277315 A1 | 11/2010 | Cohn et al. |
| 2010/0280635 A1 | 11/2010 | Cohn et al. |
| 2010/0280637 A1 | 11/2010 | Cohn et al. |
| 2010/0281135 A1 | 11/2010 | Cohn et al. |
| 2010/0281161 A1 | 11/2010 | Cohn et al. |
| 2010/0281312 A1 | 11/2010 | Cohn et al. |
| 2010/0298024 A1 | 11/2010 | Choi |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0029875 A1 | 2/2011 | Milch |
| 2011/0030056 A1 | 2/2011 | Tokunaga |
| 2011/0040415 A1 | 2/2011 | Nickerson et al. |
| 2011/0040877 A1 | 2/2011 | Foisy |
| 2011/0051638 A1 | 3/2011 | Jeon et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0125333 A1 | 5/2011 | Gray |
| 2011/0125846 A1 | 5/2011 | Ham et al. |
| 2011/0128378 A1 | 6/2011 | Raji |
| 2011/0156914 A1 | 6/2011 | Sheharri et al. |
| 2011/0197327 A1 | 8/2011 | McElroy et al. |
| 2011/0200052 A1 | 8/2011 | Mungo et al. |
| 2011/0230160 A1 | 9/2011 | Felgate |
| 2011/0234392 A1 | 9/2011 | Cohn et al. |
| 2011/0257953 A1 | 10/2011 | Li et al. |
| 2011/0283006 A1 | 11/2011 | Ramamurthy |
| 2011/0286437 A1 | 11/2011 | Austin et al. |
| 2011/0302497 A1 | 12/2011 | Garrett et al. |
| 2011/0309929 A1 | 12/2011 | Myers |
| 2012/0016607 A1 | 1/2012 | Zolkiewski et al. |
| 2012/0023151 A1 | 1/2012 | Bennett, III et al. |
| 2012/0062026 A1 | 3/2012 | Dawes |
| 2012/0062370 A1 | 3/2012 | Feldstein et al. |
| 2012/0066608 A1 | 3/2012 | Fulker |
| 2012/0066632 A1 | 3/2012 | Fulker |
| 2012/0081842 A1 | 4/2012 | Ewing et al. |
| 2012/0154126 A1 | 6/2012 | Kitchen |
| 2012/0154138 A1 | 6/2012 | Cohn et al. |
| 2012/0182245 A1 | 7/2012 | Hutton |
| 2012/0209951 A1 | 8/2012 | Enns et al. |
| 2012/0214502 A1 | 8/2012 | Qiang |
| 2012/0232788 A1 | 9/2012 | Diao |
| 2012/0242788 A1 | 9/2012 | Chuang et al. |
| 2012/0257061 A1 | 10/2012 | Edwards et al. |
| 2012/0260184 A1 | 10/2012 | Dawes et al. |
| 2012/0265892 A1 | 10/2012 | Ma et al. |
| 2012/0278877 A1 | 11/2012 | Baum et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0315848 A1 | 12/2012 | Smith et al. |
| 2012/0324566 A1 | 12/2012 | Wood |
| 2012/0327242 A1 | 12/2012 | Barley et al. |
| 2012/0331109 A1 | 12/2012 | Wood |
| 2013/0007871 A1 | 1/2013 | Meenan et al. |
| 2013/0038800 A1 | 2/2013 | Yoo |
| 2013/0062951 A1 | 3/2013 | Dawes |
| 2013/0073746 A1 | 3/2013 | Singh et al. |
| 2013/0082835 A1 | 4/2013 | Shapiro et al. |
| 2013/0115972 A1 | 5/2013 | Ziskind et al. |
| 2013/0120134 A1 | 5/2013 | Hicks, III |
| 2013/0136102 A1 | 5/2013 | MacWan et al. |
| 2013/0154822 A1 | 6/2013 | Kumar et al. |
| 2013/0163491 A1 | 6/2013 | Singh et al. |
| 2013/0174239 A1 | 7/2013 | Kim et al. |
| 2013/0183924 A1 | 7/2013 | Saigh |
| 2013/0191755 A1 | 7/2013 | Balog et al. |
| 2013/0218959 A1 | 8/2013 | Kodama |
| 2013/0222133 A1 | 8/2013 | Schultz et al. |
| 2013/0223279 A1 | 8/2013 | Tinnakornsrisuphap et al. |
| 2013/0261821 A1 | 10/2013 | Lu et al. |
| 2013/0266193 A1 | 10/2013 | Tiwari et al. |
| 2013/0314542 A1 | 11/2013 | Jackson |
| 2013/0318231 A1 | 11/2013 | Gutt |
| 2013/0318443 A1 | 11/2013 | Bachman et al. |
| 2013/0331109 A1 | 12/2013 | Dhillon et al. |
| 2013/0344875 A1 | 12/2013 | Chowdhury |
| 2014/0032034 A1 | 1/2014 | Raptopoulos et al. |
| 2014/0035726 A1 | 2/2014 | Schoner et al. |

(56) References Cited

U.S. PATENT DOCUMENTS

| | | |
|---|---|---|
| 2014/0075464 A1 | 3/2014 | McCrea |
| 2014/0098247 A1 | 4/2014 | Rao et al. |
| 2014/0112405 A1 | 4/2014 | Jafarian et al. |
| 2014/0126425 A1 | 5/2014 | Dawes |
| 2014/0136936 A1 | 5/2014 | Patel et al. |
| 2014/0140575 A1 | 5/2014 | Wolf |
| 2014/0143695 A1 | 5/2014 | Fulker |
| 2014/0143851 A1 | 5/2014 | Dawes |
| 2014/0143854 A1 | 5/2014 | Lopez et al. |
| 2014/0146171 A1 | 5/2014 | Brady et al. |
| 2014/0153695 A1 | 6/2014 | Yanagisawa et al. |
| 2014/0167928 A1 | 6/2014 | Burd |
| 2014/0172957 A1 | 6/2014 | Dawes |
| 2014/0176797 A1 | 6/2014 | Silva et al. |
| 2014/0180968 A1 | 6/2014 | Song et al. |
| 2014/0201291 A1 | 7/2014 | Long |
| 2014/0218517 A1 | 8/2014 | Kim et al. |
| 2014/0278281 A1 | 9/2014 | Vaynriber et al. |
| 2014/0282934 A1 | 9/2014 | Miasnik et al. |
| 2014/0289384 A1 | 9/2014 | Kao et al. |
| 2014/0293046 A1 | 10/2014 | Ni |
| 2014/0316616 A1 | 10/2014 | Kugelmass |
| 2014/0340216 A1 | 11/2014 | Puskarich |
| 2014/0355588 A1 | 12/2014 | Cho et al. |
| 2014/0359101 A1 | 12/2014 | Wales |
| 2014/0359524 A1 | 12/2014 | Sasaki et al. |
| 2014/0368331 A1 | 12/2014 | Quain |
| 2014/0369584 A1 | 12/2014 | Fan et al. |
| 2014/0372599 A1 | 12/2014 | Gutt |
| 2014/0372811 A1 | 12/2014 | Cohn et al. |
| 2015/0009325 A1 | 1/2015 | Kardashov |
| 2015/0054947 A1 | 2/2015 | Dawes |
| 2015/0074206 A1 | 3/2015 | Baldwin |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097949 A1 | 4/2015 | Ure et al. |
| 2015/0097961 A1 | 4/2015 | Ure et al. |
| 2015/0106721 A1 | 4/2015 | Cha et al. |
| 2015/0116108 A1 | 4/2015 | Fadell et al. |
| 2015/0142991 A1 | 5/2015 | Zaloom |
| 2015/0161875 A1 | 6/2015 | Cohn et al. |
| 2015/0205465 A1 | 7/2015 | Robison et al. |
| 2015/0222517 A1 | 8/2015 | McLaughlin et al. |
| 2015/0261427 A1 | 9/2015 | Sasaki |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0365217 A1 | 12/2015 | Scholten et al. |
| 2015/0373149 A1 | 12/2015 | Lyons |
| 2016/0012715 A1 | 1/2016 | Hazbun |
| 2016/0019763 A1 | 1/2016 | Hazbun |
| 2016/0019778 A1 | 1/2016 | Raji et al. |
| 2016/0023475 A1 | 1/2016 | Bevier et al. |
| 2016/0027295 A1 | 1/2016 | Raji et al. |
| 2016/0036944 A1 | 2/2016 | Kitchen |
| 2016/0042637 A1 | 2/2016 | Cahill |
| 2016/0062624 A1 | 3/2016 | Sundermeyer et al. |
| 2016/0065413 A1 | 3/2016 | Sundermeyer et al. |
| 2016/0065414 A1 | 3/2016 | Sundermeyer et al. |
| 2016/0100348 A1 | 4/2016 | Cohn et al. |
| 2016/0107749 A1 | 4/2016 | Mucci |
| 2016/0116914 A1 | 4/2016 | Mucci |
| 2016/0127641 A1 | 5/2016 | Gove |
| 2016/0164923 A1 | 6/2016 | Dawes |
| 2016/0171853 A1 | 6/2016 | Naidoo et al. |
| 2016/0180719 A1 | 6/2016 | Wouhaybi et al. |
| 2016/0183073 A1 | 6/2016 | Saito et al. |
| 2016/0189509 A1 | 6/2016 | Malhotra et al. |
| 2016/0189527 A1 | 6/2016 | Peterson et al. |
| 2016/0189549 A1 | 6/2016 | Marcus |
| 2016/0191265 A1 | 6/2016 | Cohn et al. |
| 2016/0191621 A1 | 6/2016 | Oh et al. |
| 2016/0226732 A1 | 8/2016 | Kim et al. |
| 2016/0231916 A1 | 8/2016 | Dawes |
| 2016/0232780 A1 | 8/2016 | Cohn et al. |
| 2016/0234075 A1 | 8/2016 | Sirpal et al. |
| 2016/0260135 A1 | 9/2016 | Zomet et al. |
| 2016/0261932 A1 | 9/2016 | Fadell et al. |
| 2016/0266579 A1 | 9/2016 | Chen et al. |
| 2016/0267751 A1 | 9/2016 | Fulker et al. |
| 2016/0269191 A1 | 9/2016 | Cronin |
| 2016/0274759 A1 | 9/2016 | Dawes |
| 2016/0364089 A1 | 12/2016 | Blackman et al. |
| 2016/0373453 A1 | 12/2016 | Ruffner et al. |
| 2017/0004714 A1 | 1/2017 | Rhee |
| 2017/0005818 A1 | 1/2017 | Gould |
| 2017/0006107 A1 | 1/2017 | Dawes et al. |
| 2017/0019644 A1 | 1/2017 | K et al. |
| 2017/0039413 A1 | 2/2017 | Nadler |
| 2017/0052513 A1 | 2/2017 | Raji |
| 2017/0054571 A1 | 2/2017 | Kitchen et al. |
| 2017/0054594 A1 | 2/2017 | Dawes |
| 2017/0063967 A1 | 3/2017 | Kitchen et al. |
| 2017/0063968 A1 | 3/2017 | Kitchen et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0078298 A1 | 3/2017 | Vlaminck et al. |
| 2017/0103646 A1 | 4/2017 | Naidoo et al. |
| 2017/0109999 A1 | 4/2017 | Cohn et al. |
| 2017/0118037 A1 | 4/2017 | Kitchen et al. |
| 2017/0154507 A1 | 6/2017 | Dawes et al. |
| 2017/0155545 A1 | 6/2017 | Baum et al. |
| 2017/0180198 A1 | 6/2017 | Dawes et al. |
| 2017/0180306 A1 | 6/2017 | Gutt |
| 2017/0185277 A1 | 6/2017 | Sundermeyer et al. |
| 2017/0185278 A1 | 6/2017 | Sundermeyer et al. |
| 2017/0192402 A1 | 7/2017 | Karp et al. |
| 2017/0227965 A1 | 8/2017 | Decenzo et al. |
| 2017/0244573 A1 | 8/2017 | Baum et al. |
| 2017/0255452 A1 | 9/2017 | Barnes et al. |
| 2017/0257257 A1 | 9/2017 | Dawes |
| 2017/0279629 A1 | 9/2017 | Raji |
| 2017/0289360 A1 | 10/2017 | Baum et al. |
| 2017/0301216 A1 | 10/2017 | Cohn et al. |
| 2017/0302469 A1 | 10/2017 | Cohn et al. |
| 2017/0310500 A1 | 10/2017 | Dawes |
| 2017/0331781 A1 | 11/2017 | Gutt |
| 2017/0337806 A1 | 11/2017 | Cohn et al. |
| 2017/0353324 A1 | 12/2017 | Baum et al. |
| 2018/0004377 A1 | 1/2018 | Kitchen et al. |
| 2018/0019890 A1 | 1/2018 | Dawes |
| 2018/0054774 A1 | 2/2018 | Cohn et al. |
| 2018/0063248 A1 | 3/2018 | Dawes et al. |
| 2018/0083831 A1 | 3/2018 | Baum et al. |
| 2018/0096568 A1 | 4/2018 | Cohn et al. |

FOREIGN PATENT DOCUMENTS

| | | |
|---|---|---|
| AU | 2005223267 | 3/2011 |
| AU | 2011250886 | 5/2011 |
| AU | 2011305163 | 9/2011 |
| AU | 2010297957 A1 | 5/2012 |
| AU | 2011250886 A1 | 1/2013 |
| AU | 2011250886 A1 | 1/2013 |
| AU | 2011305163 A1 | 5/2013 |
| AU | 2013284428 A1 | 2/2015 |
| AU | 2010297957 B2 | 10/2016 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |
| CA | 2559842 | 3/2005 |
| CA | 2878117 A1 | 1/2014 |
| CA | 2559842 C | 5/2014 |
| CA | 2559842 C | 5/2014 |
| CA | 2992429 A1 | 12/2016 |

(56) References Cited

FOREIGN PATENT DOCUMENTS

| | | |
|---|---|---|
| CA | 2976682 A1 | 2/2018 |
| CA | 2976802 A1 | 2/2018 |
| CN | 201080053845.7 | 9/2010 |
| CN | 201180034090.0 | 5/2011 |
| CN | 102834818 A | 12/2012 |
| CN | 102985915 A | 3/2013 |
| EP | 0295146 A2 | 12/1988 |
| EP | 0308046 A2 | 3/1989 |
| EP | 0591585 A1 | 4/1994 |
| EP | 1117214 A2 | 7/2001 |
| EP | 1119837 A1 | 8/2001 |
| EP | 0978111 B1 | 11/2001 |
| EP | 05725743.8 | 3/2005 |
| EP | 1738540 A2 | 1/2007 |
| EP | 08797646 | 8/2008 |
| EP | 08828613.3 | 8/2008 |
| EP | 09807196.2 | 8/2009 |
| EP | 2112784 A1 | 10/2009 |
| EP | 10819658.5 | 9/2010 |
| EP | 11781184.4 | 5/2011 |
| EP | 11827671.6 | 9/2011 |
| EP | 2868039 A2 | 5/2015 |
| EP | 3031206 A2 | 6/2016 |
| EP | 3285238 A2 | 2/2018 |
| EP | 3308222 A1 | 4/2018 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2286423 A | 8/1995 |
| GB | 2291554 A | 1/1996 |
| GB | 2319373 A | 5/1998 |
| GB | 2320644 A | 6/1998 |
| GB | 2324630 A | 10/1998 |
| GB | 2325548 A | 11/1998 |
| GB | 2335523 A | 9/1999 |
| GB | 2349293 A | 10/2000 |
| GB | 2370400 A | 6/2002 |
| GB | 2442628 A | 4/2008 |
| GB | 2442633 A | 4/2008 |
| GB | 2442640 A | 4/2008 |
| GB | 2428821 | 5/2008 |
| GB | 2428821 B | 6/2008 |
| GB | 2442640 | 7/2008 |
| GB | 2442628 | 8/2008 |
| GB | 2442633 | 8/2008 |
| IN | 3687/DELNP/2012 | 9/2010 |
| IN | 10698/DELNP/2012 | 5/2011 |
| IN | 45/2015 | 11/2015 |
| IN | 04/2016 | 1/2016 |
| JP | 63-033088 A | 2/1988 |
| JP | 05-167712 A | 7/1993 |
| JP | 06-339183 A | 12/1993 |
| JP | 8227491 A | 9/1996 |
| JP | 10-004451 A | 1/1998 |
| JP | 2000-006343 A | 1/2000 |
| JP | 2000-023146 A | 1/2000 |
| JP | 2000-278671 A | 10/2000 |
| JP | 2001-006088 A | 1/2001 |
| JP | 2001-006343 A | 1/2001 |
| JP | 2001-069209 A | 3/2001 |
| JP | 2002055895 A | 2/2002 |
| JP | 2002-185629 | 6/2002 |
| JP | 2003085258 A | 3/2003 |
| JP | 2003141659 A | 5/2003 |
| JP | 2004192659 A | 7/2004 |
| JP | 2007-529826 A | 10/2007 |
| KR | 10-2006-0021605 A | 3/2006 |
| KR | 20060021605 A | 3/2006 |
| TW | 340934 B | 9/1998 |
| TW | I239176 B | 9/2005 |
| TW | 99113848 | 4/2010 |
| TW | 99113853 | 4/2010 |
| TW | 99113855 | 4/2010 |
| TW | 99113856 | 4/2010 |
| TW | I480839 B | 4/2015 |
| TW | I480840 B | 4/2015 |
| TW | I509579 B | 11/2015 |
| TW | I517106 B | 1/2016 |
| WO | WO-8907855 A1 | 8/1989 |
| WO | 89/11187 A1 | 11/1989 |
| WO | WO-9403881 A1 | 2/1994 |
| WO | 95/13944 A1 | 5/1995 |
| WO | WO-9636301 A1 | 11/1996 |
| WO | 97/13230 A2 | 4/1997 |
| WO | 98/25243 A1 | 6/1998 |
| WO | 98/52343 A1 | 11/1998 |
| WO | WO-9849663 A1 | 11/1998 |
| WO | 98/59256 A2 | 12/1998 |
| WO | WO-9934339 A2 | 7/1999 |
| WO | 00/21053 A1 | 4/2000 |
| WO | 00/36812 | 6/2000 |
| WO | 00/72598 A1 | 11/2000 |
| WO | 01/11586 A1 | 2/2001 |
| WO | WO-0152478 A2 | 7/2001 |
| WO | 01/71489 A1 | 9/2001 |
| WO | WO-0199078 A2 | 12/2001 |
| WO | 02/11444 A1 | 2/2002 |
| WO | WO-0221300 A1 | 3/2002 |
| WO | 2002/100083 | 12/2002 |
| WO | WO-02097584 A2 | 12/2002 |
| WO | 2003/026305 A1 | 3/2003 |
| WO | WO-03040839 A1 | 5/2003 |
| WO | WO-2004004222 A1 | 1/2004 |
| WO | WO-2004098127 A1 | 11/2004 |
| WO | WO-2004107710 A1 | 12/2004 |
| WO | WO-2005091218 A2 | 9/2005 |
| WO | WO-2005091218 A3 | 7/2006 |
| WO | WO-2007038872 A1 | 4/2007 |
| WO | WO-2007124453 A2 | 11/2007 |
| WO | 2008/056320 A1 | 5/2008 |
| WO | WO-2009006670 A1 | 1/2009 |
| WO | 2009/023647 A1 | 2/2009 |
| WO | 2009/029590 A1 | 3/2009 |
| WO | 2009/029597 A1 | 3/2009 |
| WO | 2009/064795 A1 | 5/2009 |
| WO | WO-2009145747 A1 | 12/2009 |
| WO | 2010/019624 A1 | 2/2010 |
| WO | 2010/025468 A1 | 3/2010 |
| WO | 2010/127009 A1 | 11/2010 |
| WO | 2010/127194 A2 | 11/2010 |
| WO | 2010/127200 A1 | 11/2010 |
| WO | 2010/127203 A1 | 11/2010 |
| WO | 2011/038409 A1 | 3/2011 |
| WO | 2011/063354 A1 | 5/2011 |
| WO | 2011/143273 A1 | 11/2011 |
| WO | 2012/040653 A1 | 3/2012 |
| WO | PCT/US2013/048324 | 6/2013 |
| WO | 2014/004911 A2 | 1/2014 |
| WO | 2015/021469 A2 | 2/2015 |
| WO | 2015/134520 A1 | 9/2015 |
| WO | 2016/201033 A1 | 12/2016 |
| ZA | 2013/02668 | 9/2011 |
| ZA | 201302668 | 6/2014 |

OTHER PUBLICATIONS

Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Control Panel Standard—Features for False Alarm Reduction, The Security Industry Association, SIA 2009, pp. 1-48.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.

(56) References Cited

OTHER PUBLICATIONS

Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets Video Home Security as Next Broadband Market," The Register, Nov. 2, 2006, 2 pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jul. 12, 2010 for U.S. Appl. No. 12/019,554, filed Jan. 24, 2008.
Final Office Action dated Jan. 13, 2011 for U.S. Appl. No. 12/189,780, filed Aug. 11, 2008.
Final Office Action dated Sep. 14, 2011 for U.S. Appl. No. 12/197,931, filed Aug. 25, 2008.
Final Office Action dated Feb. 16, 2011 for U.S. Appl. No. 12/019,568, filed Jan. 24, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Form PCT/ISA/210, "PCT International Search Report for the Application No. PCT/US05/08766," dated May 23, 2006, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US09/53485," dated Oct. 22, 2009, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/53136," dated Jan. 5, 2012, 2 pages.
Form PCT/ISA/210, "PCT International Search Report of the Application No. PCT/US08/83254," dated Jan. 14, 2009, 2 pages.
Form PCT/ISA/220, "PCT Notification of Transmittal of The International Search Report and the Written Opinion of the International Searching Authority, or the Declaration," 1 pg.
Form PCT/ISA/220, "PCT Notification of Transmittal of the International Search Report and the Written Opinion of the International Searching Authority, or the Declaration for the Application No. PCT/US05/08766," dated May 23, 2006, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration of the Application No. PCT/US08/83254," dated Jan. 14, 2009, 1 page.
Form PCT/ISA/237, "PCT Written Opinion of the International Searching Authority for the Application No. PCT/US05/08766," dated May 23, 2006, 5 pages.
Form PCT/ISA/237, "PCT Written Opinion of the International Searching Authority," 6 pgs.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/74260," dated Nov. 13, 2008, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US11/34858," dated Oct. 3, 2011, 8 pages.

(56) References Cited

OTHER PUBLICATIONS

Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/53136," dated Jan. 5, 2012.
Form PCT/ISA/237, "PCT Written Opinion ofthe International Searching Authority of the Application No. PCT/US08/83254," dated Jan. 14, 2009, 7 pages.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
International Search Report for Application No. PCT/US13/48324, dated Jan. 14, 2014, 2 pages.
International Search Report for Application No. PCT/US2014/050548, dated Mar. 18, 2015, 4 pages.
Lagotek Wireless Home Automation System, May 2006 [retrieved on Aug. 22, 2012].
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated Jan. 5, 2010 for U.S. Appl. No. 12/019,554, filed Jan. 24, 2008.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Apr. 13, 2010 for U.S. Appl. No. 11/761,745, filed Jun. 12, 2007.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Feb. 21, 2013 for U.S. Appl. No. 12/771,372, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
Security for the Future, Introducing 5804BD—Advanced two-way wireless remote technology, Advertisement, ADEMCO Group, Syosset, NY, circa 1997.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Supplementary Partial European Search Report for Application No. EP09807196, dated Nov. 17, 2014, 5 pages.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Valtchev, D., and I. Frankov. "Service gateway architecture for a smart home." Communications Magazine, IEEE 40.4 (2002): 126-132.
Network Working Group, Request for Comments H.Schulzrinne Apr. 1998.
Gong, Li, A Software architecture for open service gateways, Internet Computing, IEEE 5.1, Jan.-Feb. 2001, 64-70.
EP examination report issued in EP08797646.0, dated May 17, 2017, 11 pages.
Diaz, Redondo R P et al., Enhancing Residential Gateways: OSGI Service Composition, IEEE Transactions on Consumer Electronics, IEEE Service Center, New.
CorAccess Systems, Companion 6 User Guide, Jun. 17, 2002.
Condry M et al., Open Service Gateway architecture overview, Industrial Electronics Society, 1999, IECON '99 Proceedings, The 25th Annual Conference of.

(56) References Cited

OTHER PUBLICATIONS

Co-pending U.S. Appl. No. 13/486,276, filed Jun. 1, 2012.
6270 Touch Screen Keypad Notes, Honeywell, Sep. 2006.
"Modular programming", The Authoritative Dictionary of IEEE Standard Terms. 7th ed. 2000.
"Application" The Authoritative Dictionary of IEEE Standard Terms. 7th ed. 2000.
J. David Eisenberg, SVG Essentials: Producing Scalable Vector Graphics with XML O'Reilly & Associates, Inc., Sebastopol, CA 2002.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Visitalk, Communication with Vision, http://www.visitalk.jimbo.com; website accessed Jan. 10, 2018.
GrayElectronics, http://www.grayelectronics.com; webpage accessed on Jan. 10, 2018.
Genex Technologies, Genex OmniEye, www.av-iq.com/avcat/images/documents/pdfs/omnieye%20nightwatch_brochure.pdf; webpage accessed Jan. 10, 2018.
Foreign communication from a related counterpart application—International Search Report, App No. PCT/US02/14450, dated Dec. 17, 2002, 6 pgs.
Foreign communication from a related counterpart application—International Preliminary Examination Report, App No. PCT/US02/14450, dated Mar. 2, 2004, 4 pgs.
Yanni Zhai et al., Design of Smart Home Remote Monitoring System Based on Embedded System, 2011 IEEE 2nd International Conference on Computing, Control and Industrial Engineering, vol. 2, pp. 41-44.
visitalk.com—communication with vision, http://www.visitalk.com, submitted Apr. 19, 2018.
U.S. Appl No. 15/828,030, filed Nov. 30, 2017, entitled "Controller and Interface for Home Security, Monitoring and Automation Having Customizable Audio Alerts for SMA Events".
U.S. Appl No. 15/824,503, filed Nov. 28, 2017, entitled "Forming a Security Network Including Integrated Security System Components".
U.S. Appl No. 15/796,421, filed Oct. 27, 2017, entitled "Security System With Networked Touchscreen".
U.S. Appl. No. 15/783,858, filed Oct. 13, 2017, entitled "Notification of Event Subsequent to Communication Failure With Security System".
U.S. Appl. No. 15/232,135, filed Aug. 9, 2016, entitled "Controller and Interface for Home Security, Monitoring and Automation Having Customizable Audio Alerts for SMA Events".
U.S. Appl. No. 15/231,273, filed Aug. 8, 2016, entitled "Security, Monitoring and Automation Controller Access and Use of Legacy Security Control Panel Information".
U.S. Appl. No. 15/222,416, filed Jul. 28, 2016, entitled "Method and System for Automatically Providing Alternate Network Access for Telecommunications".
U.S. Appl. No. 14/202,579, filed Mar. 10, 2014, entitled "Communication Protocols Over Internet Protocol (IP) Networks".
U.S. Appl. No. 14/202,505, filed Mar. 10, 2014, entitled "Communication Protocols Over Internet Protocol (IP) Networks".
U.S. Appl. No. 14/203,219, filed Mar. 10, 2014, entitled "Communication Protocols in Integrated Systems".
U.S. Appl. No. 14/203,141, filed Mar. 10, 2014, entitled "Communication Protocols in Integrated Systems".
U.S. Appl. No. 14/203,128, filed Mar. 10, 2014, entitled "Communication Protocols in Integrated Systems".
U.S. Appl. No. 14/203,084, filed Mar. 10, 2014, entitled "Communication Protocols in Integrated Systems".
U.S. Appl. No. 14/203,077, filed Mar. 10, 2014, entitled "Communication Protocols in Integrated Systems".
U.S. Appl. No. 14/202,685, filed Mar. 10, 2014, entitled "Communication Protocols in Integrated Systems".
U.S. Appl. No. 14/202,627, filed Mar. 10, 2014, entitled "Communication Protocols in Integrated Systems".
U.S. Appl. No. 14/202,592, filed Mar. 10, 2014, entitled "Communication Protocols in Integrated Systems".
U.S. Appl. No. 14/202,573, filed Mar. 10, 2014, entitled "Communication Protocols in Integrated Systems".
U.S. Appl. No. 14/201,133, filed Mar. 7, 2014, entitled "Security System Integrated With Social Media Platform".
U.S. Appl. No. 14/201,189, filed Mar. 7, 2014, entitled "Integrated Security and Control System With Geofencing".
U.S. Appl. No. 14/201,227, filed Mar. 7, 2014, entitled "Device Integration Framework".
U.S. Appl. No. 14/200,921, filed Mar. 7, 2014, entitled "Communication Protocols in Integrated Systems".
U.S. Appl. No. 14/201,162, filed Mar. 7, 2014, entitled "Activation of Gateway Device".
U.S. Appl. No. 15/447,982, filed Mar. 2, 2017, entitled "Generating Risk Profile Using Data of Home Monitoring and Security System".
Shang, Wei-lai, Study on Application of Embedded Intelligent Area System, Journal of Anyang Institute of Technology, vol. 9, No. 6, pp. 56-57 and 65.
PCT Application filed on Nov. 17, 2016, entitled "Mobile Premises Automation Platform", PCT/US2016/062519.
PCT Application filed on Oct. 13, 2016, entitled "Coordinated Control of Connected Devices in a Premise", PCT/US2016/056842.
PCT Application filed on Aug. 17, 2016, entitled "Automation System User Interface", PCT/US2016/047262.
PCT Application filed on Aug. 16, 2016, entitled "Automation System User Interface", PCT/US2016/047172.
PCT Application filed on Jul. 7, 2016, entitled "Automation System User Interface with Three-Dimensional Display", PCT/US2016/041353.
PCT Application filed on Jun. 30, 2016, entitled "Integrated Cloud System with Lightweight Gateway for Premises Automation", PCT/US2016/040451.
PCT Application filed on Jun. 29, 2016, entitled "Integrated Cloud System for Premises Automation", PCT/US2016/040046.
PCT Application filed on Jun. 9, 2016, entitled "Virtual Device Systems and Methods", PCT/US2016/036674.
Indian Patent App. No. 3687/DELNP/2012, corresponds to WO2011/038409 filed on Sep. 28, 2010.
Indian Patent App. No. 10698/DELNP/2012, corresponds to WO2011/143273 filed on May 10, 2011.
GTI Genex Technologies, Inc. OmniEye.(Trademark). Product Brochure, Sep. 14, 1999 (5 pages).
GrayElectronics, http://www.grayelectronics.com/default.htm, submitted Apr. 19, 2018.
GrayElectronics, "Digitizing TV cameras on TCP/IP Computer Networks," http://www.grayelectronics.com/default.htm, printed on Oct. 12, 1999 (2 pages).
Genex OmniEye, http://www.genextech.com/prod01.htm, submitted Apr. 19, 2018.
EP application filed on Aug. 16, 2017, entitled, "Automation System User Interface", 17186497.8.
EP application filed on Jun. 9, 2016, entitled, "Data Model for Home Automation", 16808247.7.
Elwahab et al.; Device, System and . . . Customer Premises Gateways; Sep. 27, 2001; WO 01/71489.
CA application filed on Aug. 16, 2017, entitled "Automation System User Interface", 2976802.
CA application filed on Aug. 15, 2017, entitled "Automation System User Interface", 2976682.
AU application filed on Mar. 8, 2017, entitled "Integrated Security Network with Security Alarm Signaling System", 2017201585.
AU application filed on Feb. 28, 2017, entitled "Control System User Interface", 2017201365.
U.S. Patent Application filed May 23, 2018, entitled "Networked Touchscreen With Integrated Interfaces", U.S. Appl. No. 15/987,638.
U.S. patent application filed May 2, 2018, entitled "Automation System With Mobile Interface", U.S. Appl. No. 15/969,514.
U.S. Appl. No. 12/189,780, filed Aug. 11, 2008.

(56) References Cited

OTHER PUBLICATIONS

U.S. Appl. No. 12/189,785, filed Aug. 11, 2008.
U.S. Appl. No. 12/198,039, filed Aug. 25, 2008.
U.S. Appl. No. 12/198,051, filed Aug. 25, 2008.
U.S. Appl. No. 12/198,060, filed Aug. 25, 2008.
U.S. Appl. No. 12/198,066, filed Aug. 25, 2008.
U.S. Appl. No. 13/531,757, filed Jun. 25, 2012.
U.S. Appl. No. 12/718,385, filed Mar. 5, 2010.
U.S. Appl. No. 13/311,365, filed Dec. 5, 2011.
U.S. Appl. No. 12/197,931, filed Aug. 25, 2008.
U.S. Appl. No. 12/197,946, filed Aug. 25, 2008.
U.S. Appl. No. 12/197,958, filed Aug. 25, 2008.
U.S. Appl. No. 12/269,735, filed Nov. 12, 2008.
U.S. Appl. No. 13/334,998, filed Dec. 22, 2011.
U.S. Appl. No. 13/335,279, filed Dec. 22, 2011.
U.S. Appl. No. 13/400,477, filed Feb. 20, 2012.
U.S. Appl. No. 12/539,537, filed Aug. 11, 2009.
U.S. Appl. No. 13/406,264, filed Feb. 27, 2012.
U.S. Appl. No. 12/750,470, filed Mar. 30, 2010.
U.S. Appl. No. 12/892,801, filed Sep. 28, 2010.
U.S. Appl. No. 12/952,080, filed Nov. 22, 2010.
U.S. Appl. No. 13/104,932, filed May 10, 2011.
U.S. Appl. No. 13/104,936, filed May 10, 2011.
U.S. Appl. No. 13/099,293, filed May 2, 2011.
U.S. Appl. No. 13/244,008, filed Sep. 23, 2011.
U.S. Appl. No. 13/718,851, filed Dec. 18, 2012.
U.S. Appl. No. 11/761,745, filed Jun. 12, 2007.
U.S. Appl. No. 13/486,276, filed Jun. 1, 2012.
U.S. Appl. No. 12/019,568, filed Jan. 24, 2008.
U.S. Appl. No. 12/630,092, filed Dec. 3, 2009.
U.S. Appl. No. 13/153,807, filed Jun. 6, 2011.
U.S. Appl. No. 13/725,607, filed Dec. 21, 2012.
U.S. Appl. No. 12/568,718, filed Sep. 9, 2009.
U.S. Appl. No. 12/691,992, filed Jan. 22, 2010.
U.S. Appl. No. 12/732,879, filed Mar. 26, 2010.
U.S. Appl. No. 12/771,071, filed Apr. 30, 2010.
U.S. Appl. No. 12/771,372, filed Apr. 30, 2010.
U.S. Appl. No. 12/770,253, filed Apr. 29, 2010.
U.S. Appl. No. 12/771,471, filed Apr. 30, 2010.
U.S. Appl. No. 12/770,365, filed Apr. 29, 2010.
U.S. Appl. No. 12/771,624, filed Apr. 30, 2010.
U.S. Appl. No. 12/892,303, filed Sep. 28, 2010.
U.S. Appl. No. 12/970,313, filed Dec. 16, 2010.
U.S. Appl. No. 12/971,282, filed Dec. 17, 2010.
U.S. Appl. No. 12/972,740, filed Dec. 20, 2010.
U.S. Appl. No. 29/420,377, filed May 8, 2012.
U.S. Appl. No. 29/419,628, filed Apr. 30, 2012.
U.S. Appl. No. 13/925,181, filed Jun. 24, 2013.
U.S. Appl. No. 13/932,816, filed Jul. 1, 2013.
U.S. Appl. No. 13/929,568, filed Jun. 27, 2013.
U.S. Appl. No. 13/932,837, filed Jul. 1, 2013.
U.S. Patent Application filed Jun. 27, 2018, entitled "Activation of Gateway Device", U.S. Appl. No. 16/020,499.
U.S. Patent Application filed Jul. 20, 2018, entitled "Cross-Client Sensor User Interface in an Integrated Security Network", U.S. Appl. No. 16/041,291.
U.S. Patent Application filed Jul. 12, 2018, entitled "Integrated Security System with Parallel Processing Architecture", U.S. Appl. No. 16/034,132.
U.S. Patent Application filed Jul. 3, 2018, entitled "WIFI-To-Serial Encapsulation in Systems", U.S. Appl. No. 16/026,703.
U.S. Patent Application filed Aug. 21, 2018, entitled "Premises System Management Using Status Signal", U.S. Appl. No. 16/107,568.
U.S. Patent Application filed Aug. 9, 2018, entitled "Method and System for Processing Security Event Data", U.S. Appl. No. 16/059,833.
U.S. Patent Application filed Sep. 6, 2018, entitled "Takeover of Security Network ", U.S. Appl. No. 16/123,695.

* cited by examiner

| Name | Last Update | Device |
|---|---|---|
| Gateway | Today at 4:01 PM | iControl Networks: Beta Gateway |
| Back door (large) | Today at 3:13 PM | GE Security: 60-670-95R Door/Window Switch |
| Freeze sensor | Today at 3:30 PM | GE Security: 60-742-95R Freeze Sensor |
| Conf room camera | Today at 3:51 PM | Axis Communications: 205 |
| Floor camera | Today at 3:55 PM | Axis Communications: 205 |
| Hall motion sensor | Today at 3:11 PM | GE Security: 60-639-95R Passive Infared Motoin Detector |
| Thermostst | Today at 4:00 PM | GE Security: 60-909-95 Thermostat |
| Front door (recessed) | Today at 3:47 PM | GE Security: 60-741-95 Recessed Door/Window Switch |
| Keychain remote | 3/2 5:14 PM | GE Security: 4 Button Remote 60-659-95R |
| Mail Box door | Today at 3:33 PM | GE Security: 60-688-95 Micro Door/Window Switch |
| Floor lamp | Today at 4:01 PM | Axsyp Automation: Lamp Module |
| Wireless camera | Today at 3:51 PM | Axis Communications: 205 |
| Garage door (large) | Today at 3:06 PM | GE Security: 60-670-95R Door/Window Switch |

System
Add Device

Figure 7 - System Architecture

Figure 8 - Gateway Data Handling

Figure 9 - Data Conversion

Figure 10 - Binding Data Flow

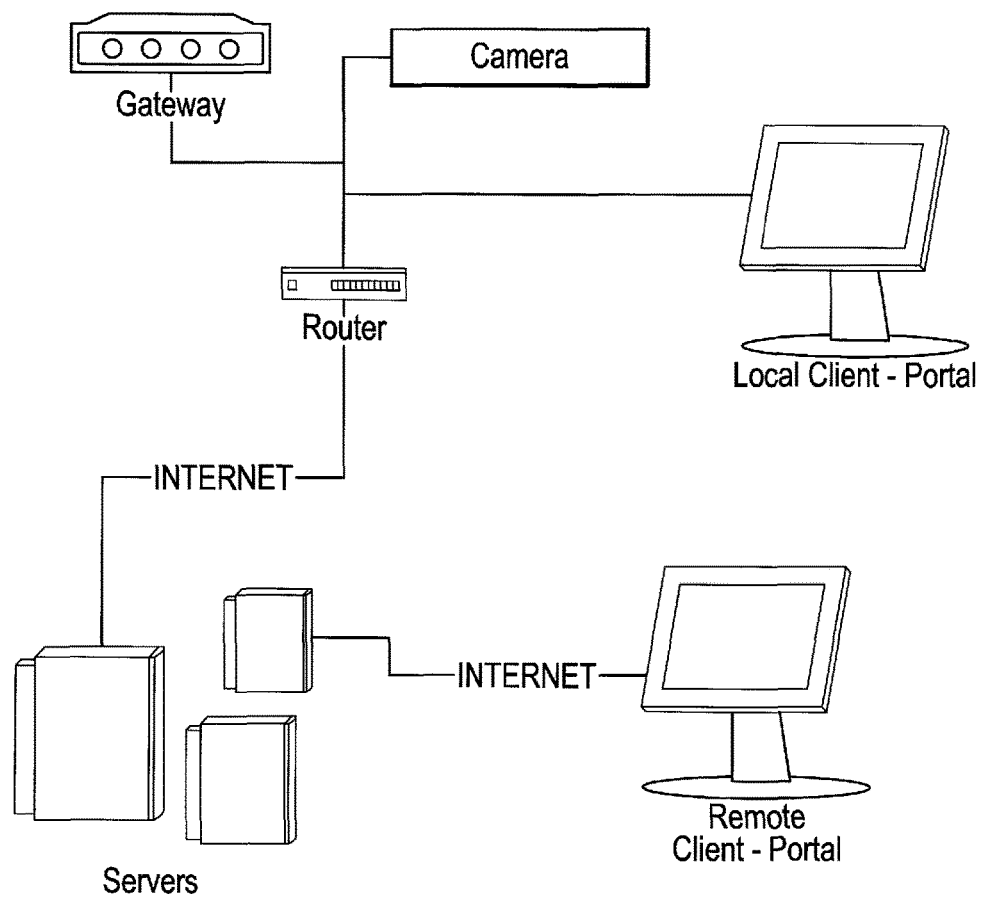
Figure 12 - Camera Image/Video Architecture

AUTOMATION SYSTEM WITH MOBILE INTERFACE

CROSS-REFERENCE

This application is related to and claims the benefit of U.S. (US) patent application Ser. No. 11/084,232, filed Mar. 16, 2005, now U.S. Pat. No. 8,335,842, which claims the benefit of the following United States patent applications:

U.S. provisional application No. 60/553,934 for Business Method for Premises Management, invented by Reza Raji and Chris Stevens, filed Mar. 16, 2004;

U.S. provisional application No. 60/553,932 for Premises Management Networking, invented by Gerry Gutt and Reza Raji, filed Mar. 16, 2004; and U.S. provisional application No. 60/652,475 for Control Network, invented by Gerry Gutt and Reza Raji, filed Feb. 11, 2005.

Each of the foregoing applications is incorporated herein by reference in its entirety.

This application is also related to U.S. nonprovisional application entitled Business Method for Premises Management, invented by Reza Raji and Chris Stevens, being filed concurrently herewith, and which is incorporated herein by reference in its entirety.

BACKGROUND OF THE INVENTION

Vendors such as premises vendors, communication service vendors, and Internet portal vendors need a solution for extending their relationship with vendees beyond the immediate transaction. Additionally, vendees desire additional premises management services beyond the immediate transaction for premises, communication services, or Internet portals. There is a need for advanced premises management services.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 3G shows an automation tab screen according to an embodiment of the invention.

FIG. 3H shows a system tab screen according to an embodiment of the invention.

FIG. 12 is a diagram showing a camera environment.

DETAILED DESCRIPTION OF THE INVENTION

Figure 1:
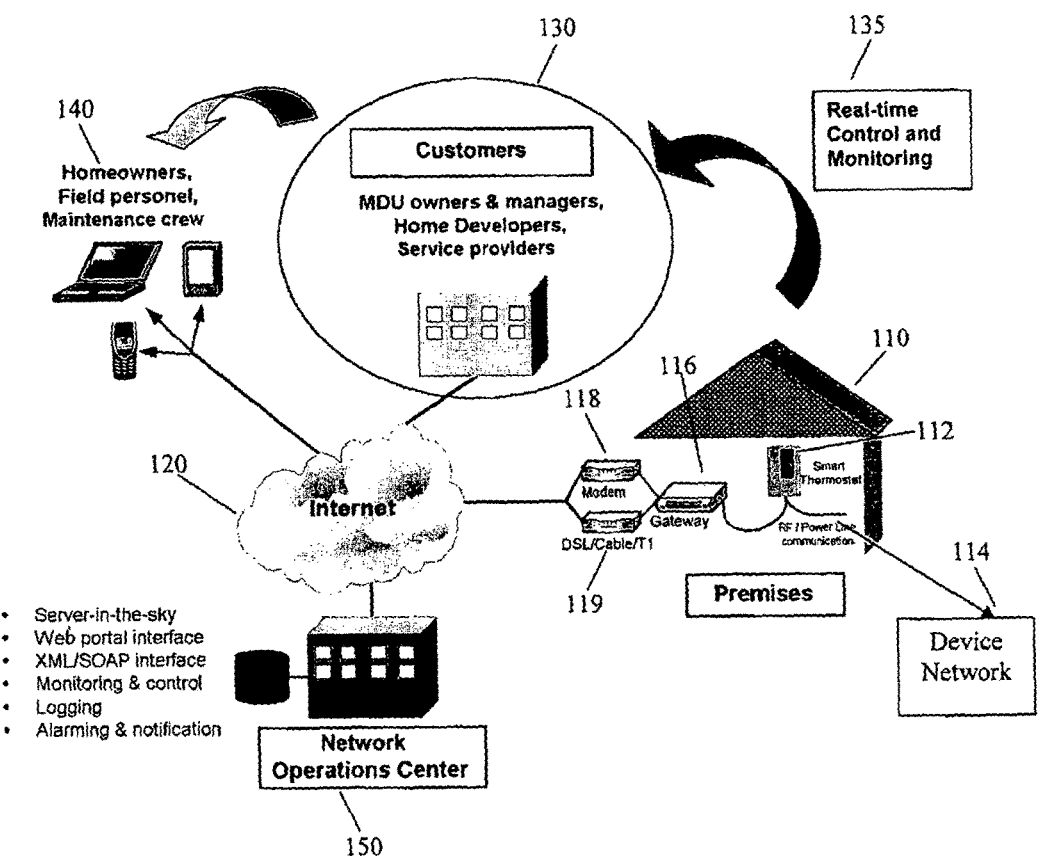
FIG. 1 shows an example of an overall network for premises management.

FIG. 1 shows an example of an overall network for premises management. A premises 110 has premises management devices such as a smart thermostat 112. The premises management devices are connected to a premises network 114 which can be, for example, an RF and/or power line network. The premises network 114 is connected to a gateway 116 which in turn is connected to a broadband device 119 such as a DSL, cable, or T1 line. The gateway 116 can alternatively or also be connected to a dial up modem 118. The premises 110 is connected to the Internet 120. The Internet 120 is connected to system managers at the network operations center 150. The Internet 120 is also connected to customers of the system manager, for example vendors such as premises vendors, communication service vendors, or Internet portal vendors. The Internet 120 is also connected to vendees 140, such as premises vendees, communication service vendees, or Internet portal vendees.

Figure 2:
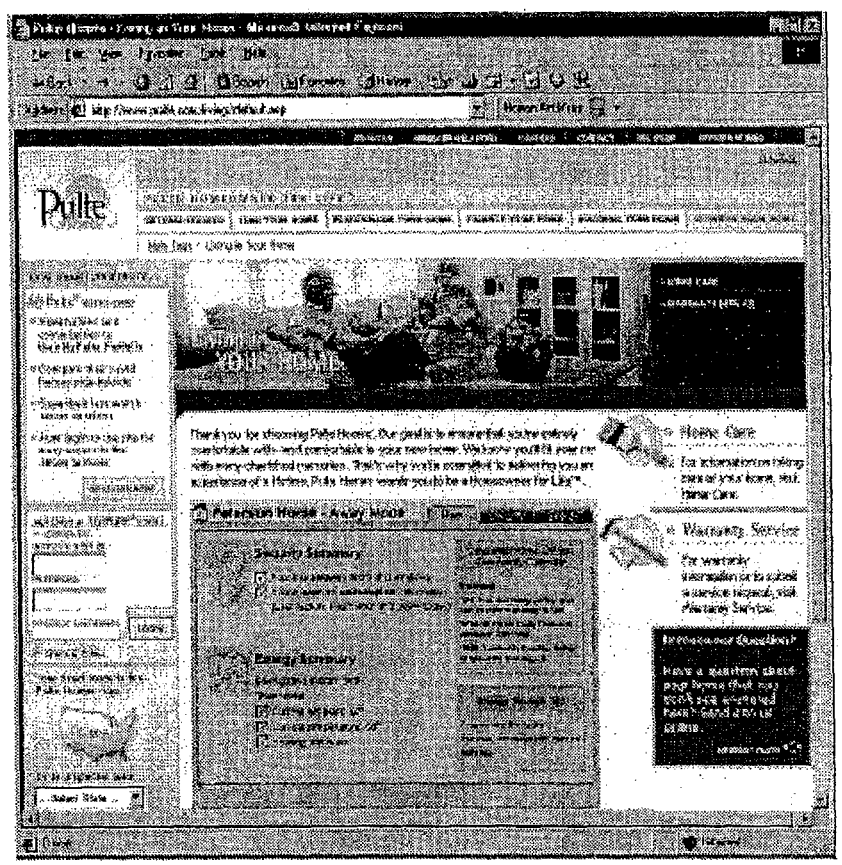
FIG. 2 shows an example of a homebuilder-branded Internet portal for premises management.

FIG. 2 shows an example of a homebuilder-branded Internet portal for premises management.

Figure 3A:
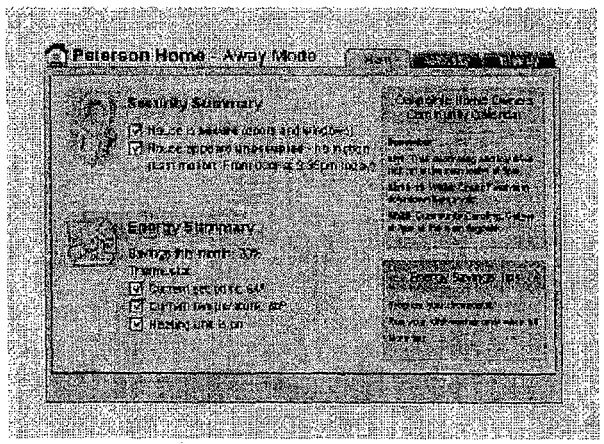
FIGS. 3A-3C show examples of detailed screens of the portal interface for premises management.
Figure 3B:
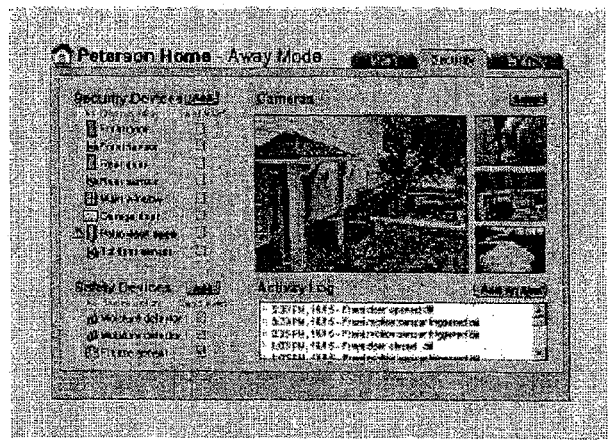
Figure 3C:
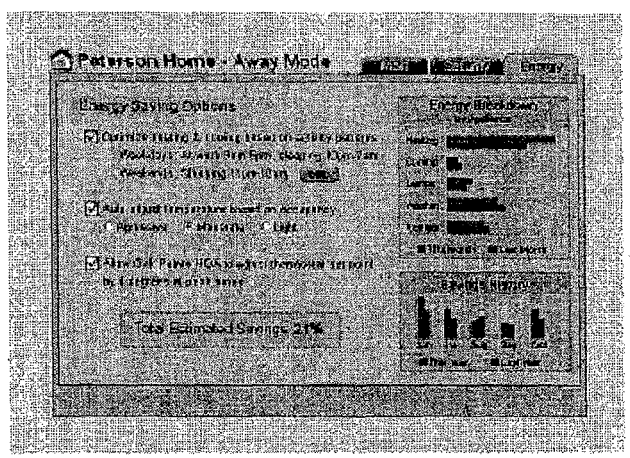

FIGS. 3A-3H show examples of detailed screens of the portal interface for premises management. FIG. 3A shows a main screen summarizing premises management services. FIG. 3B shows a screen summarizing security management services and safety management services. FIG. 3C shows a screen summarizing energy management services.

Figure 3D:
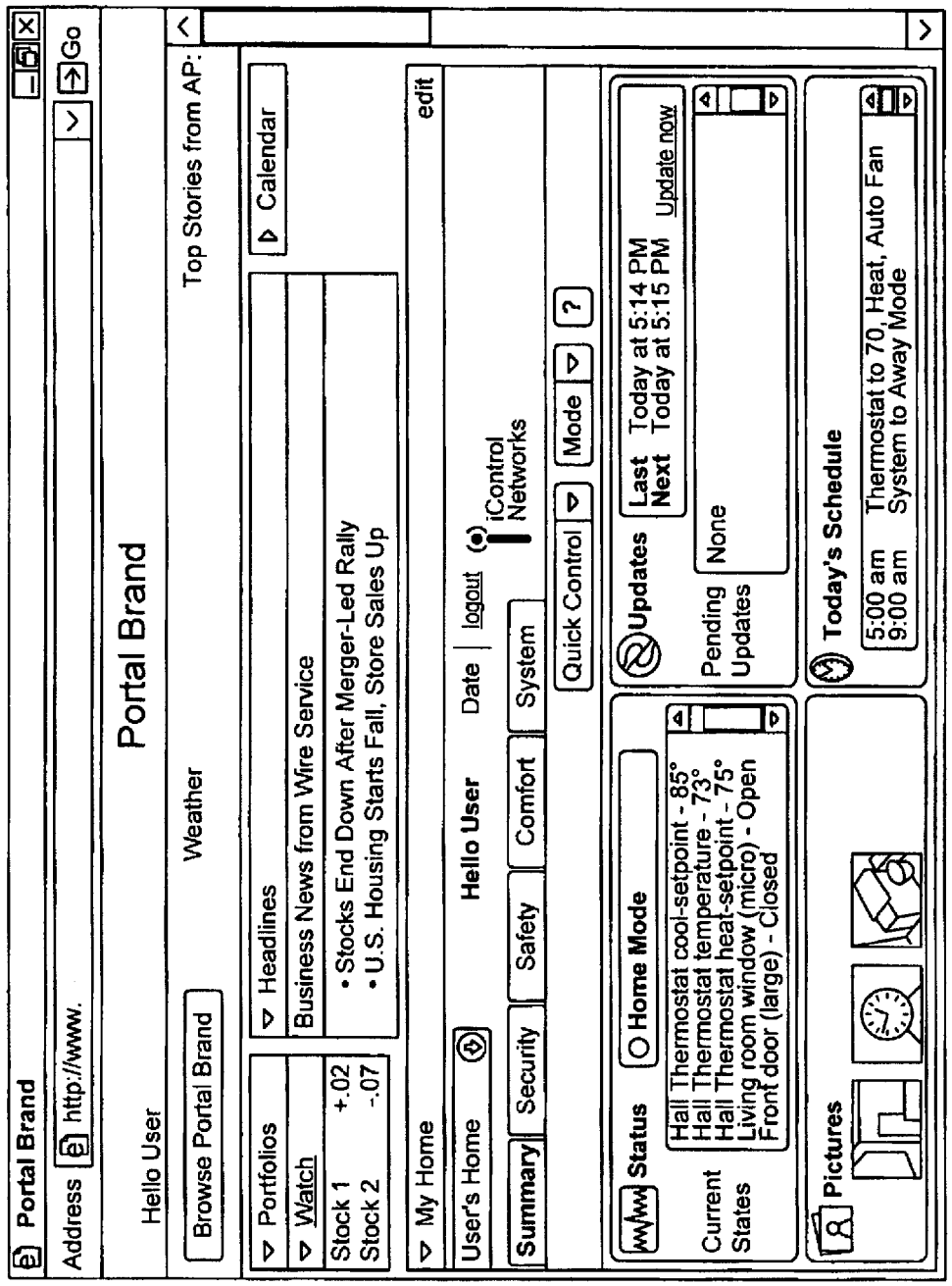
FIG. 3D shows a screen shot of a Internet Portal-branded portal for premises management according to an embodiment of the invention.

FIG. 3D is another example, illustrating how services offered by the system can be branded and incorporated into a third part web portal, for example, in a personal portal such as one provided by Yahoo. The screen includes the usual Yahoo portal content such as the stock pane on the left, the news pane on the top and the calendar pane on the right. The system-specific pane is included on the bottom where the user can access monitoring and control information on the home or business. The look and feel of the system pane can be tailored by the service provider.

Figure 3E:
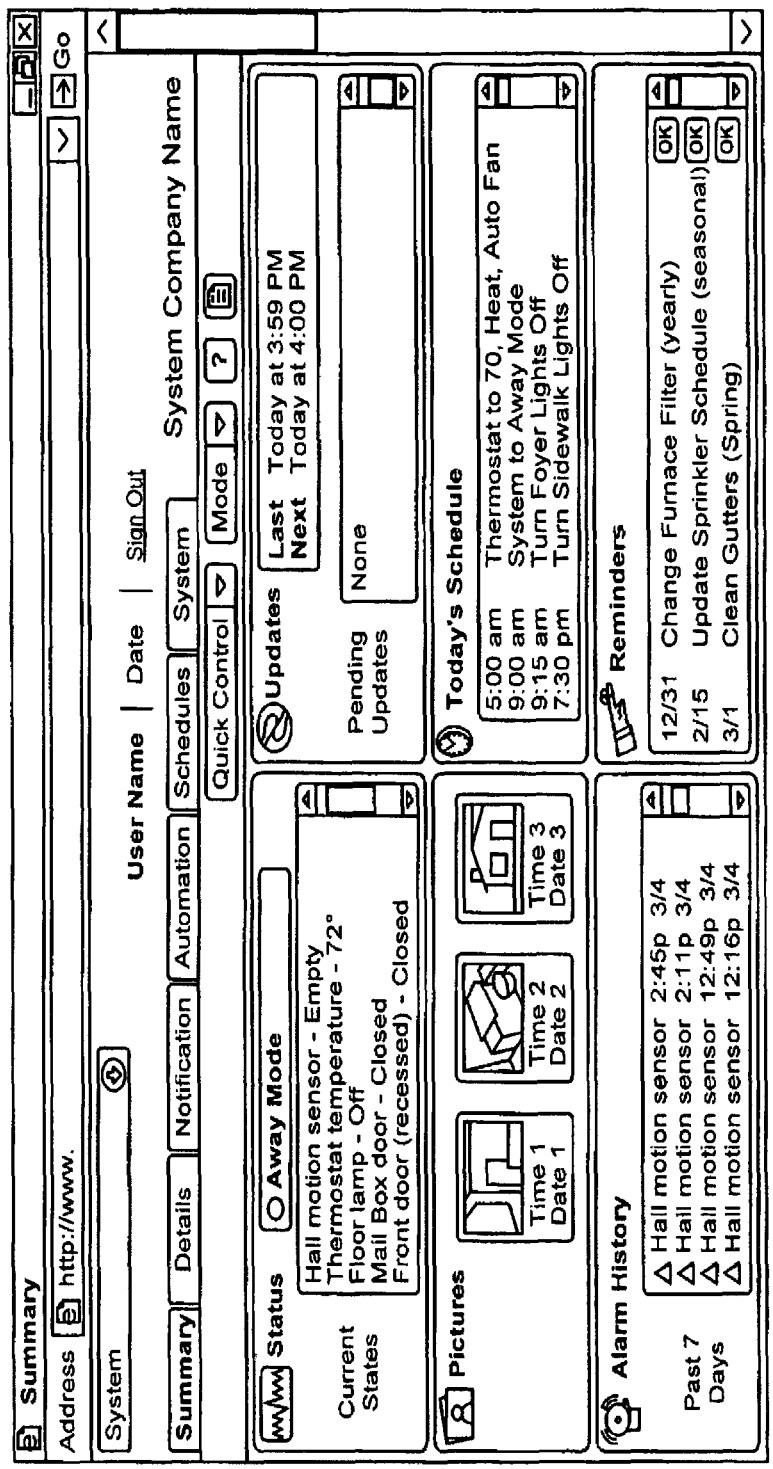
FIG. 3E shows a screen shot of a main portal summary page according to an embodiment of the invention.

The system portal summary page in FIG. 3E shows a snap-shot of the state of the various devices in the user premises. At the top left is a drop-down box that displays the name of the premises being shown on the screen. The user can change premises by clicking on this box and selecting a different premises. A series of tabs allow the user to switch to Details, Notifications, Automation, Schedules and Systems screens for performing other system functions. The various panes on this page highlight different features.

The status pane lists the different devices in the user premises along with their actual states. The pending updates pane shows the time of the last communication between the premises and the server as well as any pending updates waiting to be sent downlink to the premises. The pictures pane shows the last several (e.g. last four) pictures taken by the camera in the user premises. The user can click on a thumbnail picture to look at a larger version of the photo as well as access archived images for that camera, look at live video, take new pictures or delete photos. The schedule pane shows the schedules activities for the premises. The alarm history shows an archive of the most recent event and activity in the user premises. The reminders pane provides a means for the system to remind the user to perform certain activities or functions related to their home or business. The mode drop down button on the blue navigation bar allows the user to switch between the systems modes. The Quik-Control drop down allows the user to control any device that is controllable (e.g. camera, thermostat, lamps, etc.).

Figure 3F:
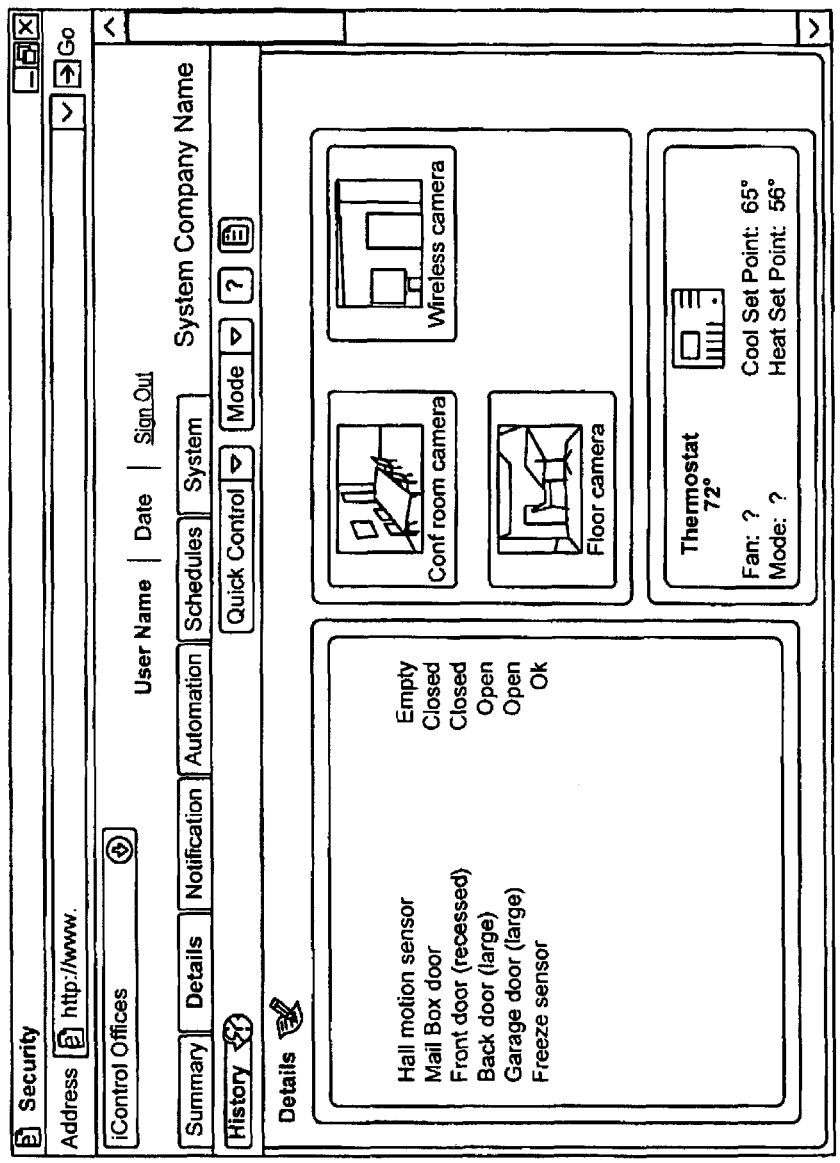
FIG. 3F shows a screen shot of a portal showing details device information according to an embodiment of the invention.

FIG. 3F shows a details screen of the portal showing details device information. The details screen allows the user to show more detailed device data. The list on the left displays the system devices and their actual states/values. The pictures pane on the top right display the camera thumbnails (beyond the 4 displayed on the summary page). The thermostat pane on the bottom right shows the details of the thermostat data including the current temperature, cooling and heating set points as well as the thermostat mode.

Figure 3G:
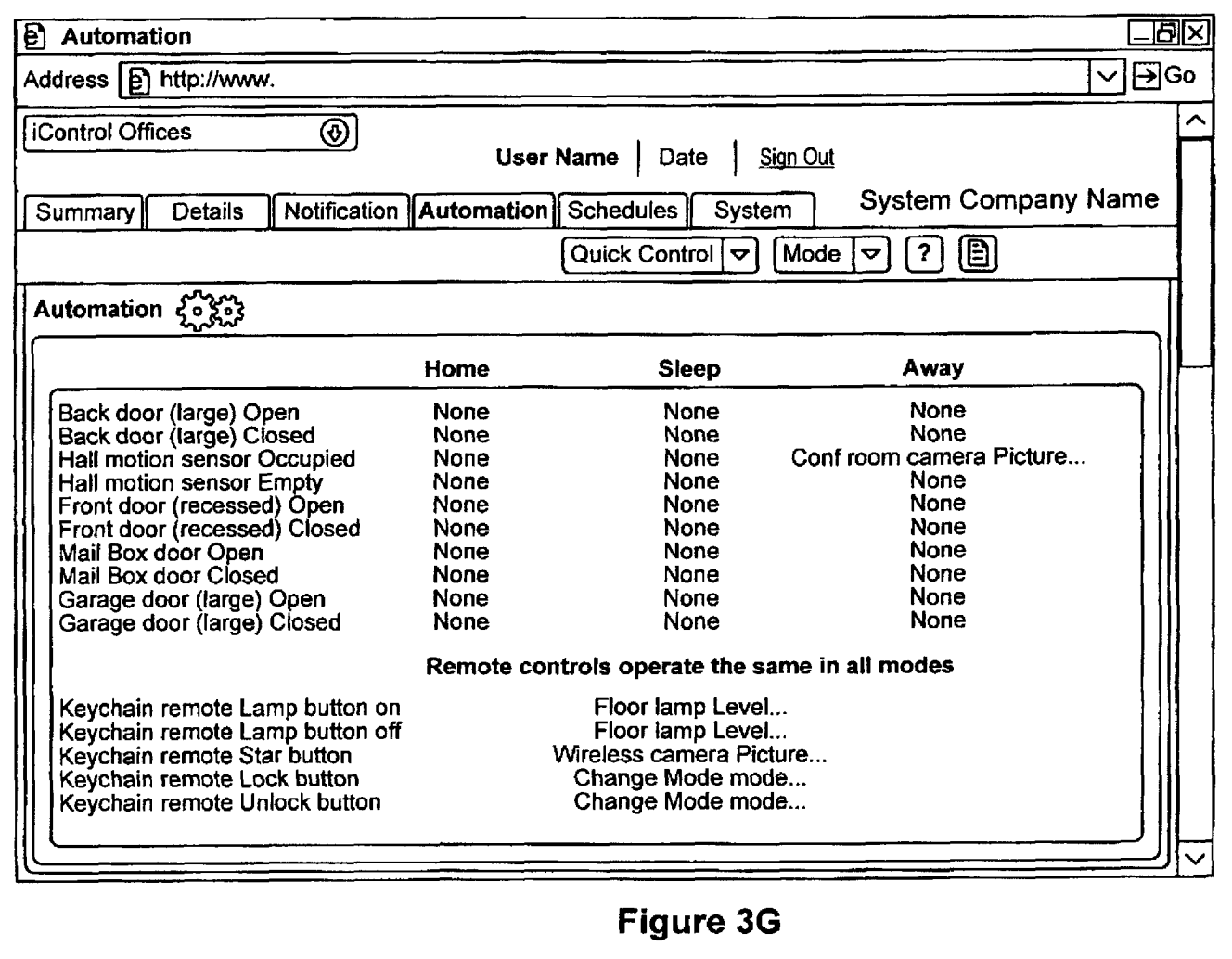

FIG. 3G shows an automation tab screen. This screen shows how the user may assign automation rules to devices such that an event caused by a device can trigger one or more actions by other devices. The left column shows all possible events that can occur based on the devices that belong to this premises network. The three columns, one per mode, identify the action for each event for that mode. For example, the figure shows that when hall motion sensor occupied event occurs in the away mode, the conference room camera takes a picture. The bottom portion of the screen shows that the wireless keychain remote control's buttons can also be programmed by the user to perform any action desired.

FIG. 3H shows a system tab screen showing status of devices. The System screen shows a list of all the devices in the premises' network, including the gateway. Each device in the system is on a separate line. The first column shows the name of the device along with a status indicator which show different colors based on the status of the device (green for ok, yellow for offline, red for not found or problematic). There is also a "last update" column that displays the date and time of the last signal received from that device. The third column (device) describes the type and model number for that device. The user can get more detailed information about a device by clicking on the line corresponding to the respective device.

Figure 4:
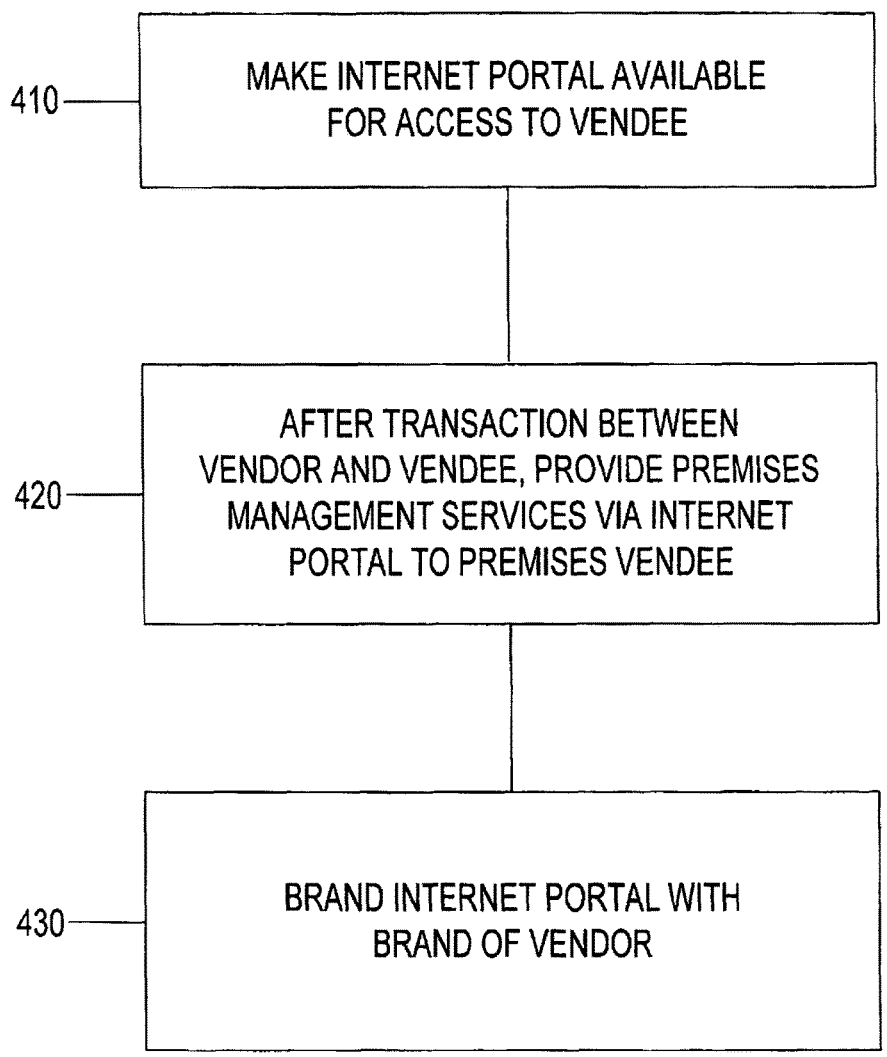
FIG. 4 is a diagram of a business method for premises management.

FIG. 4 is a diagram of a business method for premises management. In 410, an Internet portal is available for access to a vendee, such as a premises vendee, communication service vendee, and/or an Internet portal vendee. In 420, at least after a transaction between the vendor and the vendee, such as a premises transaction, a communication services transaction, and/or Internet portal services transaction, premises management services are provided via the Internet portal to the vendee. In 430, the Internet portal is branded with the brand of the vendor. The shown steps can be added to, removed, rearranged, and/or modified.

Figure 5:
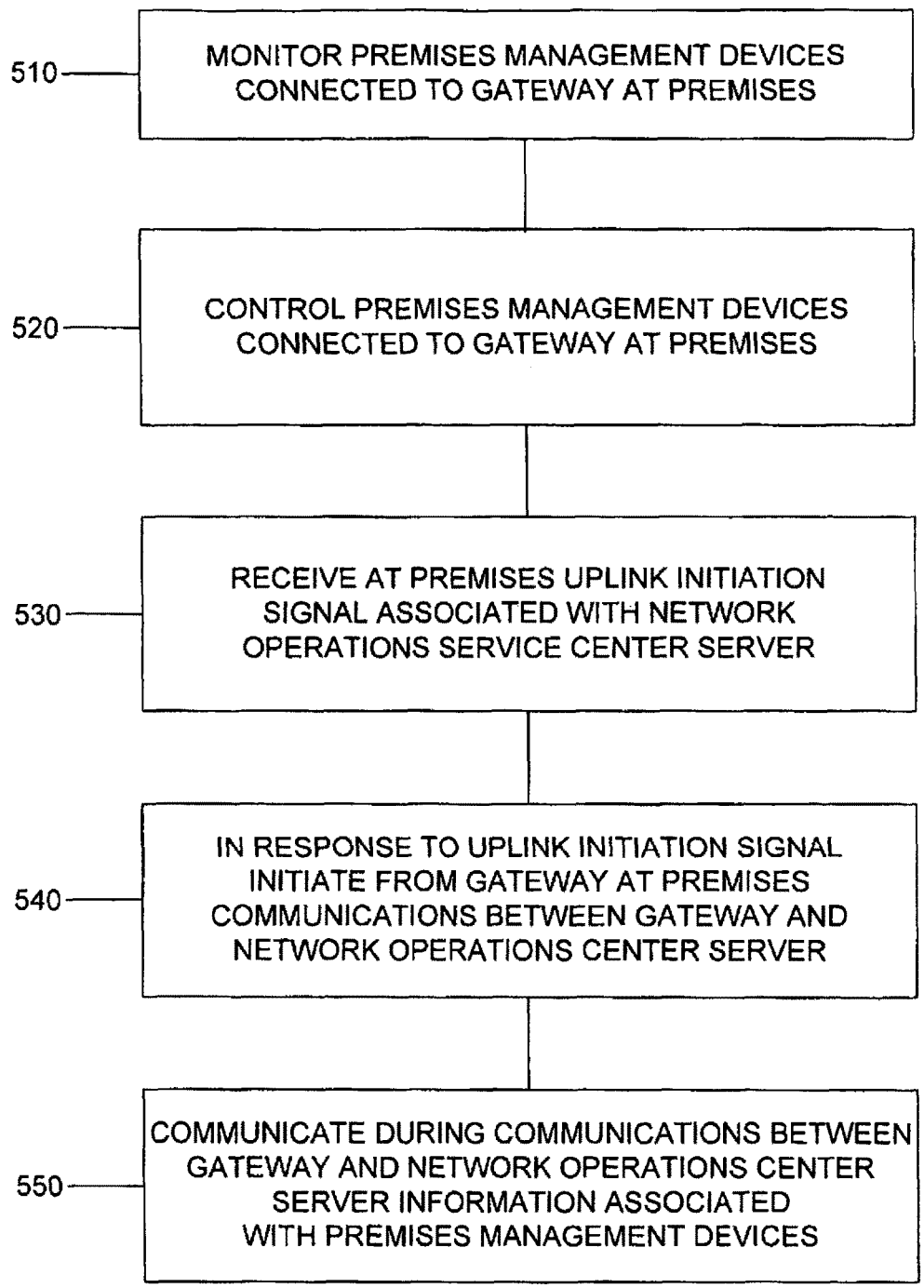
FIG. 5 is a diagram of a method for premises management networking.

FIG. 5 shows a diagram of a method for premises management networking. In 510, premises management devices connected to a gateway at a premises are monitored. In 520, premises management devices connected to the gateway at the premises are controlled. In 530, an uplink-initiation signal associated with a network operations center server is received at the premises. In 540, in response to the uplink-initiation signal, communications between the gateway and the network operations center server are initiated from the gateway at the premises. In 550, during the communications between the gateway and the network operations center server, information associated with the premises management devices is communicated.

Property developers and service providers can:
  1. Differentiate their offering from their competitors'
  2. Generate new recurring revenue through new, value-added services
  3. Reduce their operating costs
  4. Increase the value of their offering
  5. Increase the effectiveness and reach of their brand
  6. Make smarter, knowledge-based business decisions
  7. Increase customer retention and satisfaction Additional content leverages the broadband infrastructure, thereby increasing the effective value of the broadband pipe.

Property developers/managers and service providers are facing ever increasing competition and lack the expertise, time and resources to offer control and telemetry services to their customers. Connecting people to devices is the next evolutionary step for the Internet.

Some of the architectural/design goals for the system are low cost, ease of use, and scalability.

The architecture and products/service offering is flexible enough to cater to the needs of the homeowner while being scalable and intuitive enough to allow for easy installation and minimal support.

Three types of customers are envisioned for the system. Although the ultimate end user is the property owner, customers can be: home developers and commercial property, e.g. multiple tenant unit (MTU) owners and managers; service providers (telcos, cable companies, ISPs, etc.); and homeowners or commercial building tenants.

The actual user of the services resides in the premises where, for example, the gateway and devices are installed. The system can be intuitive enough that the "average" end user can perform the installation and configuration steps.

The installer can be the person or entity that installs the gateway and the devices in the home, configures the gateway, connects the gateway to the Internet and/or telephone line and/or performs any troubleshooting necessary. Depending on the actual customer, the installer can be 1) the installation crew of the service provider or property developer, 2) an outsourced installation outfit hired by the service provider or property developer, 3) an outsourced installation outfit hired by the end user, or 4) the end user.

The premises gateway can be a low-cost and stand-alone unit that connects the in-premises devices to the server. The connectivity to the Internet can be accomplished via a broadband connection (T1, DSL or cable) and/or via the telephone line. Though broadband connectivity is preferred due to its persistence and throughput, telephone connectivity is recommended to be present as a back-up option in case the broadband connection is lost. For premises without a broadband connection (e.g., vacation homes) a telephone-only connection can be used.

The service portal provides an intuitive end user interface to the premises network as well as access to system and network configuration screens and user account information and settings.

Some embodiments of the overall system can be put in use through the following steps:
  1. Customer need for telemetry services is established
  2. Customer (via web or phone) orders a system
  3. Customer acquires system (via service provider, builder, etc.)

4. A service account is established (by the service provider/builder or by the homeowner or system manager)
5. Gateway is registered (by the service provider/builder or by the homeowner)
6. Gateway sends network/device information to the server
7. Homeowner configures own home (alarms, notifications, binding, etc.)
8. Future devices are added to system either via pre-configuration by system manager or via the end user through configuration screens on portal Each of these steps is described below:

Customer Need is Established

This can done through the property developer, the service provider sales channel or direct advertising by the system manager.

Customer Orders a System from System Manager

The customer specifies what kinds of devices are needed and where each one will reside in the premises (e.g., living room thermostat, lobby motion sensor, etc.). The user account is then appended by system manager to include this information as well as the actual unique ID for each device shipped to the customer.

Customer Acquires System

The gateway and devices can be acquired by the customer in several ways:

1. Pre-installed by the property builder/developer/manager or service provider
2. Directly purchased by the end user The choice of devices can depend on the particular services and functionality desired by the customer.

Once the customer acquires the gateway and devices, the devices are physically installed in the premises. This task can be performed with the help of an installer, or for smaller premises, performed by the end user.

A Service Account is Established

This is generally done by the end user as the process uses personal information (name, payment option, etc.). The account registration involves the user logging on to the system manager web site and establishing a new account by entering name, address, phone number, payment details and/or the gateway serial number printed on the gateway in the end user's possession.

In some cases the system manager service account may already be pre-established with the gateway serial number and the end user simply has to update the account with personal and payment information. This scenario eliminates the need for the end user to deal with any cumbersome serial numbers or keys and is really more of a personalization step.

Multiple gateways can also be handled per user account.

Gateway is Registered

This step involves the association of the user account on the system manager server (established in the previous step) with an actual gateway in the user's home. The gateway is connected to a broadband network or the telephone line in the home.

For this step, the installer, for example, presses a SYNCH button on the gateway, and initiates an uplink communication from the gateway to the system manager server using a default (first-time) IP address or, in the case of a dial-up-only connection, a toll free number dial by the gateway.

Upon establishing a connection with the server and locating its corresponding user account (e.g., established in a prior step), the gateway acquires a system manager server IP address (to be used from that point on for all gateway to server communication), and changes its state from unregistered to registered.

In the case where the gateway is pre-installed by the developer or service provider, this step may have already been performed.

The gateway may not be able to perform any functions until it has gone through this registration process (as indicated by the state of the gateway).

Gateway Sends Network/Device Information to the Server

This is done on a regular basis and can always be initiated by the gateway. The server dictates the interval for uplink communication initiation between the gateway and server.

Homeowner Configures Home (Alarms, Notifications, Binding, Etc.)

This is the normal use of the system manager portal whereby the user selects the various monitoring, logging and notification options.

Future Devices are Added to System

The end user obtains additional devices from the system manager, in which case they are added to the end user system by the system manager before being shipped to the customer.

Alternatively, the end user could purchase a device from a third party source in which case they could use the system manager portal interface to add (or replace) the device manually.

In addition, the system manager gateway can have a provision for "discovering" devices by listening for RF messages (e.g., GE Interlogix) or service pin messages (e.g., LonWorks devices).

Overview

Parts of the system as a whole are described, including the gateway, the server and the web portal interface.

System Overview

At the highest level, the system provides its users with a hosted and managed service for premises device monitoring and control for a fee, such as a monthly subscription fee. The premises markets include residential homes, commercial MTUs as well as small businesses.

The traditional complexity and expense of installing and maintaining such a system is delegated to the system manager platform. As a revenue-grade Application Service Provider (ASP) business, the system provides reliability, scalability, security, cost-effectiveness, ease-of-use, and flexibility.

The term "system" can denote the portal, server, gateway and end devices.

Reliability

The system can provide a high degree of reliability. This includes 24-7 operation of the Network Operations Center (NOC) and the server software it contains, and the reliability and fault-tolerance of the gateway and the control devices.

Scalability

The system, specifically the NOC, can scale to accommodate large numbers (in one embodiment, millions) of gateways and devices (in one embodiment, tens of millions). Though this may not be used at the onset, necessary architectural provisions can be built into the system to allow for such expandability.

Security

As a revenue-grade service offering, the system provides security against intentional and unintentional interference with the normal operation of the system. The system can be reasonably immune to external unauthorized access (either over the Internet or device network media). The system can provide reasonable protection against spoofing (of NOC server, gateway or device).

Cost-Effectiveness

Similar systems in the past have suffered from a high cost of in-premises devices and gateway as well as high and/or unpredictable installation costs. The system installation process is simple in order to minimize, if not eliminate, the installation costs.

Ease-of-Use

The gateway and device installation process as well as the various user configuration and normal use menus/screens presented by the portal are, according to an embodiment, intuitive and easy to use. This eases the adoption and continued use of the system by its users.

Flexibility

The system is flexible enough to easily handle different device networking protocols/technologies should the need arise in the future. In addition, the system, including the web interface, can be adapted to different markets and applications.

Variable Logging

The system can log any device variable specified by the user for up to, for example, 30 days. The user defines a logging interval for each variable at the time of configuration. The logging feature can be handled by the gateway on the local device side and the data can be transferred to the server at regular intervals. The overall variable log for all variables can be kept on the server side.

Logging of data for more than, for example, 30 days (but no more than, for example, 180 days) can be provided to the user, for example for a nominal fee.

The system can allow for the logging of at least, for example, 10 variables per gateway. The minimum logging interval for any variable can be, for example, 5 minutes. Logging intervals provided can be, for example, 5, 15, 30, 60, 180 minutes as well as 6, 12, 24 hours and weekly.

Activity Logging and Tracking

The system must be able to provide at least, for example, a 14-day history log of all user, system and device actions. An action includes a change to a device variable, system or network settings brought on by either the system or the user (e.g., variable changed, logging enabled, device added, user notified, etc.). The user can trace back system activities to their cause and to the date and time they occurred. Past activities can be searched by variable, device, category or date.

System Modes

The system can support user-defined modes, such as "home", "away", "sleep", "vacation", etc. The mode the user network is in plays a factor in the determination of the actions taken (reporting, alarming, eventing, notification, etc.) by the system when variable changes occur.

System mode can be changed by the user via methods such as:

1. Via the portal interface
2. Through a schedule set by the user
3. Via a binding (a variable change tied to the mode change—e.g., RF remote control)

The system can provide a set of default modes based on the user profile (homeowner, business, vacation home, etc.). These default modes are a starting point that can be changed or added to by the user at any time.

Alarming

The user can specify alarm conditions for variables with discrete states (e.g., binary ON/OFF). These alarms can be reported in real-time (i.e., immediate uplink) by the gateway to the server. The server then in turn looks at the data and determines, based on user alarm settings, whether to notify the user or not.

Alarm conditions can be determined based on the value or state of a variable as well as the system mode.

Eventing

For non-critical events, the system can notify the user in non-real-time fashion regarding the state of any variable specified by the user. The variables chosen for user eventing can be of any kind (discrete or continuous). The gateway updates the server with the change of variable state/value at a regularly scheduled upload. The server continuously looks at variable data and determines, based on user eventing settings, whether to notify the user or not.

Eventing conditions can be determined based on the value or state of a variable as well as the system mode.

User Notification

The system can support user alarming and eventing via the following methods: email, text messaging, pager, and/or voice telephone call (voice synthesis).

Device Data Monitoring and Control

The user can specify any device variable for monitoring and control via the server portal. For example, up to 255 devices can be supported by a single gateway. For example, up to 512 variables can be supported by a single gateway.

The user can schedule specific variable updates (e.g., turn off thermostat at 8 am every Tuesday). Scheduled events can be canceled (gateway-server protocol can support this). A scheduled variable update is allowed, per time stamp and variable ID. If time stamp and variable ID match an existing scheduled variable change, then the value for that pending variable change is re-written with the new value. A given variable can have multiple scheduled values as long as each scheduled update has a different time stamp.

Any pending downlink variable change commands can be canceled that have not been relayed to the gateway at any time through the portal interface.

Device Network Support

The system can support an open architecture where most, if not all device networking protocols can be supported. Examples of specific device protocols supported by the system include RF and powerline protocols, such as GE Interlogix RF and Echelon LonWorks power line (PL & FT), simplifying the installation burden by requiring no new wires to be installed in a premises.

The LonWorks free topology twisted pair medium (FT-10) can be supported as an option to better support commercial applications (e.g., office buildings).

All devices, regardless of the technology, can possess these attributes:

1. Unique ID (global)
2. Non-volatility. Must not lose any pertinent data or state.
3. Low-battery indication over the network (if battery-operated)
4. Tamper detection (if security-sensitive)

RF

This system includes a low-level, simple unidirectional protocol for multiple sensors to talk to a receiver head end. The protocol needs and footprint are relatively small and as such the RF devices are comparatively low-cost and small. They also can function for several years without the need for a battery change for simplified installation and maintenance of the system by the user.

A bi-directional RF transceiver can be supported by the system. This allows for control as well as monitoring of remote devices (e.g., thermostat) by the user.

The following RF devices can be supported by the system:

1. Door and windows sensor
2. Motion sensor

3. Smoke alarm
4. Water sensor
5. Freeze sensor
6. Contact closure sensor (e.g., ITI DWS with external connector pins)
7. CO alarm
8. Heat sensor
9. Thermostat
10. RF remote control

PL

The power line solution offers a robust and reliable mechanism for communicating over existing residential power line wiring.

The following PL devices can be supported by the system:
1. Thermostat (e.g., RCS)
2. Load controller (e.g., Halen Smart)
3. Relay actuator (e.g., Comap)
4. Photo camera, e.g., black & white, low-resolution (with motion sensor)

FT

The Free Topology solution offers a cost-effective medium for commercial applications. Many third party LonWorks devices use this medium for communications.

Other Devices

The following is a non-exhaustive list of a few other devices supported by the system.
1. Small data/message display—for text messages, news, weather, stock, photos, etc.
2. Door latch control
3. Pool/spa controller
4. Weather station
5. Lighting control
6. Elderly or disabled monitoring
7. Irrigation controller (Bibija)
8. VCR programming Cameras The system can support cameras. For example, standard off-the-shelf IP cameras (also referred to as web cameras) may be used, such as those available from vendors such as Axis, Panasonic, Veo, D-Link, and Linksys, or other cameras manufactured for remote surveillance and monitoring.

Surveillance cameras may contain a standalone web server and a unique IP address may be assigned to the camera. The user of such a camera would typically retrieve the camera image by accessing the camera's web page through a standard web browser, using the camera's IP address. In some cases the IP camera acquires a local IP address by using a DHCP client to negotiate an address from the local DHCP server (usually residing in the user's router/firewall).

According to an embodiment, the gateway treats camera images as it does other sensor or device data. User commands to "snap" a picture are sent from the system's portal/server to the local premises gateway during scheduled communications between the gateway and server (initiated by the gateway). Alternatively, a picture "snap" command for a local or remote camera can be initiated by a sensor (e.g., motion detector, remote control, etc.) on the local device network. The gateway then in turn talks to the camera over the IP network (wired or wireless) to retrieve the image and pass that image up to the system's backend server, effectively acting as a pass-through agent for the camera.

Since the data from the gateway (including the camera image) is pushed up from the gateway to the server using standard HTTP protocol (used by web browsers), additional configuration of the user network may be avoided. Also, adjusting of the user's firewall (port forwarding, DMZ, etc.) may be avoided (i.e., simpler installation and enhanced security).

Also, the push mechanism eliminates all the issues related to accessing the camera from the Internet, namely firewall and dynamic IP issues mentioned above, since the user gets the images from the system servers and not from the premises directly.

The system's user portal interface acts as a unified user interface for the user by displaying multiple images from different cameras in the same user interface page (e.g., web page).

The system's IP cameras can be physically located anywhere as long as they are connected to the Internet (if remote) or to the local IP network (if local).

Due to the fact that the images are served from the system's server (as opposed to the local camera or network) potential security exposure of accessing the home network directly from the outside may be avoided. Also, additional security measures can be put in place (e.g., SSL) to block an unauthorized user from accessing the images on the server.

Device Low-Battery Notification

The system can notify the user via the web portal of any low-battery conditions for the devices that operate on battery (e.g., GE Interlogix devices).

Server-Side Binding

The system can send variable control information downlink based on variable information collected through the uplink connection. This rule-based exchange can take place within the same atomic uplink-downlink (request-response) exchange between the gateway and server. The user specifies the actual "rules" for such bindings (e.g., turn off the thermostat when there is no motion in the premises for 2 hours).

This implementation may impact scalability because of the atomic communication factor.

Local Binding

Local binding can permit a more real-time interaction between devices. This functionality can take place without the server's involvement (other than the initial configuration of the local rules). The local binding, given the different technologies used at the device level, needs to be routed through the gateway.

Gateway Shoulder Tap

The server can "call" a gateway if the user requests that a variable change be propagated to a device in real-time (rather than waiting for the next gateway uplink connection).

Device Sharing Between Different Users

The system can provide a means for a single device to be managed by multiple users. For example, a security gate or a pool temperature sensor in a property common area should be accessible by all residents in the complex.

Gateway

The gateway is the central link between the premises device network and the backend server. It can be a thin, low-cost client of the server and use the least amount of hardware and software without compromising the basic functionality and objectives of the overall system.

Internet Connectivity

The gateway can provide both a connection to a broadband network (Ethernet DSL or cable modem) and telephone network. The telephone network connection provides a second, redundant route for accessing the server in case the broadband network access is down and there is a need for the gateway to report critical alarm information uplink to the server. The telephone connection also provides a means for the system to support premises that have no broadband connection available (e.g., as in many second or vacation homes).

The gateway can terminate any data call in process if a user picks up a telephone and provide a dial tone immediately. In addition, the gateway may not initiate a data call if the phone is in use by the user (off hook).

They gateway can dial out in the absence of external power to the gateway.

Communication with Server

The gateway can initiate all communications with the server. Gateway communication can either initiate based on a predetermined schedule (e.g., every 30 minutes) or due to a local premises alarm (selected by the user).

Gateways can contact a common server for their first uplink connection in order to obtain their assigned gateway server address, which they can use for all subsequent uplink connections (unless changed later by the system). In the event that the gateway cannot connect to its designated gateway server, it can fall back to contacting the default initial gateway in order to refresh its gateway server address.

The predetermined call initiation schedule can be programmable by the server and can provide different intervals for broadband and telephone intervals (e.g., every 30 minutes for broadband and every 90 minutes for telephone).

By assigning the gateway-server communication initiation to the gateway the system can enjoy the following benefits:

1. Most if not all issues generally attributed to routers, firewalls and NAT are eliminated, as the gateway is now simply an HTTP client (much like a web browser).

2. Security against outside hackers is greatly increased as access into the gateway can be disallowed. The gateway knows whom it can talk to (server) and it does so when it needs to.

A possible disadvantage of a push-only scheme can be an inability of the server to provide "real-time" device control. This can be a relatively minor disadvantage minimized through the shoulder-tap mechanism.

Gateway Shoulder Tap

The gateway can have the provision of initiating an uplink communication based on a telephone ring signal detected on the phone line. This shoulder tap from the server allows the server to pass down a variable change to the gateway without having to wait for the next gateway uplink connection.

A drawback of a telephone line shoulder tap is the occasional ringing on the telephone line. It is difficult to detect an incoming ring reliably without the phone actually ringing. This is fairly benign when considering:

1. Most user variable change requests (control) may not have to be done in real-time and can occur at the next scheduled gateway uplink synch.

2. Most often the premises (e.g., home) being controlled in real-time is unoccupied.

3. The shoulder tap can at most ring the phone only once so the user can wait for the second ring before picking up the phone 4. The user can opt to provide a second phone line dedicated to the gateway.

Implementing shoulder tap over IP is another embodiment with a more complicated installation process (e.g., router/firewall configuration, opening ports, etc.). Keeping an IP connection alive between the gateway and server can be unreliable and could heavily burden the server.

Configuration

The gateway can be installed without any special skills. The NOC server can handle the complexity of configuration.

Once plugged into a power outlet as well as a broadband and/or telephone network, the gateway can:

1. Determine if there is a broadband connection available
2. If so, obtain an address from the local DHCP server
3. Make sure the telephone connection is operational
4. Contact the server for the first time and check to see if there is a user account associated with it (this can be a secured inquiry to eliminate hacking)
5. If there is no associated user account found, notify the user (e.g., blinking
LED on front panel)

Device Discovery

The gateway can be put into a device discovery mode via, for example, a front panel push button. Devices can normally be introduced to the system and assigned to the user:

1. By system manager before shipping out to the user
2. By the user/installer via the portal device registration screens The discovery mode is a third way of registering devices. The discovery mode allows the gateway to listen for and discover new devices added to the network—should there ever be a need for such functionality. Upon discovery of a new device the information is passed to the server for further processing and registration. The user can then finalize the device registration process through the system's portal (e.g., assigning names, alarming, etc.).

If the user can specify the adding of a device, it can be configured by the user immediately on the portal. Auto-configuration comes with set defaults. Another similar device to copy can be specified.

Auto Recovery

The gateway can be self-sustaining and autonomous.

In the event of communication failure between the gateway and the server for an extended period of time the gateway can continue to do its tasks (e.g., variable monitoring, logging, etc.).

In the event of an extended power loss or a system reset, the gateway can resume normal operation after the appropriate "boot-up" period (i.e., no more than 2-3 minutes). A hardware buffer can receive, e.g., RF signals during bootup.

Any pending scheduled events that did not occur because of the power loss can be performed once the gateway has resumed normal operation and can occur in the original order defined by the user.

In the event that the gateway software "hangs," the gateway can recover itself through a built-in watchdog-monitoring feature.

Rule-Based "Binding"

Gateway Power Interruption

The gateway can operate for at least, e.g., 5 minutes after a power failure in order to report its latest status (including the power status) to the server (either via broadband or telephone). The gateway may not use a rechargeable battery in order to eliminate the need for gateway servicing when the battery reaches the need of its life (e.g., typically 2-3 years).

The gateway can withstand power interruptions without losing any pertinent data (e.g., device data, log data, date & time).

For applications where the gateway and devices are to operate in the absence of power, the user can obtain and use an uninterruptible power supply (UPS).

Remote Firmware Upgrade

The gateway can receive firmware upgrades over its WAN connection (Internet or PSTN). The gateway can have provision for recovery in case there is an interruption during a firmware download (e.g., network connection loss).

The gateway firmware upgrade is an automated process initiated by the gateway based on a schedule downloaded from the server during a gateway-server exchange. The upgrade process may not involve any user interaction or involvement and may take place when the user is least likely to be using the system (e.g., at night).

Variable Logging

The gateway can provide enough storage for logging one day worth of data for, e.g., 10 variables logged every, e.g., 15 minutes. In the event that the local gateway log is filled up before the gateway has had a chance to upload the data to the gateway, the gateway can stop logging additional data and report a "log full" error to the server at the next uplink connection.

Security

Appropriate security measures can be provided by the gateway to ensure protection against:

1. Inadvertent communication with neighboring networks and devices not related to a gateway/user.
2. Intentional external hacking into the system from the WAN side (Internet and PSTN).
3. Intentional external hacking in to the device network side (PL or RF).

Power Consumption

The gateway can use minimal operating power in order to reduce the cost associated with the power supply as well as the circuitry to keep the gateway alive immediately after a power failure.

Form Factor

The gateway can be encased in a visually attractive enclosure that is generic enough for multiple markets including consumer applications and commercial building applications (schools, etc.).

Ease of Use

The gateway can use the simplest possible installation procedure. The gateway can "figure out" how to communicate with the NOC (broadband and/or PSTN) once the power has been connected to it. No user involvement may be necessary for this to take place.

User Interface

The gateway's user interfaces include the following LEDs and switches:

POWER LED

COMM LED: communication happening between gateway and server

DEVICE LED: Device communication (PL or RF) happening. This LED can also be used for the device discovery feature.

ERROR LED: Displays different errors using different blink rates (log error, synch error, comm. error)

SYNCH switch: Initiates a gateway-server uplink communication

Gateway Local Reset

The gateway can provide a way for it to be reset locally by the user. Upon the execution of this gateway reset function, the gateway can be in the factory default state with no device, variable, user or configuration variables residing in it.

The reset operation for the gateway can be performed by, e.g., holding down the SYNCH switch for 20 seconds.

Agency Certifications

The gateway can be designed to comply with both FCC Part 15 (Level B) and

Part 68 certifications.

If an external Tamura power supply is not used, then gateway design can meet the standards for the appropriate regional safety agency certification (i.e., UL, CSA, CE, and TUV).

Error Reporting

The system can report error to the user and/or administrator when the following conditions occur:

1. Downlink variable update failed
2. Gateway synch delayed or missed
3. Missing variable poll value
4. Variable log full
5. Broadband or phone line connection down Server The server provides a hosted, reliable and secure "server-in-the-sky" for the premises gateways to communicate to and for the users (customers) to access for accessing and controlling the various devices in one or more premises.

Reliability

The NOC facility can be run by a managed hosting service and as such provisions for power failure and security (theft) can be in place via the vendor providing the hosting service. However, the NOC server software architecture can support certain backup features.

All user, system, network, gateway and device data contained by the NOC server can be backed up on a regular schedule (e.g., once a day).

When NOC server hardware malfunctions, that hardware can be quickly and easily replaced with minimum user downtime.

Security

The server can communicate to the gateway in a secure fashion.

The data can be encrypted when transferring between the gateway and server, as well as ID/password for authentication.

Scalability

The server software can be scalable such that it can support a large number of gateways over time. The scalability sold also enables the server to have a small foot print at the beginning when the number of gateways may be relatively small.

Platform

The interfaces between the servers and modules can be in XML in order to provide maximum flexibility and scalability. No requirements may be imposed for the operating system or programming language platforms used.

Server API

The server can provide an API (via XML and SOAP) that permits third party applications to get full access to the functionality of the server.

Portal

The portal can support web, WAP and PDA access points. An important attribute of the portal is ease-of-use.

Customization

The portal can present an automatically-customized UI to the user based on the application (e.g., residential, commercial, etc.) and the devices used (e.g., security, energy, safety, etc.).

As a secondary feature the portal can also allow the user to easily customize their portal for their particular needs.

Lastly, system manager personnel or authorized agents can further customize a portal for a specific customer (e.g., a telecom) or class of customers (e.g., homeowners of a home builder). This process can put a specific "skin" on a customer portal.

User Account Screens

These screens allow the end user to open an account and register the end user's gateway(s). Screens can be included for obtaining billing/payment info and other user information (e.g., address, primary contact information, phone number, etc.).

In addition, this can be where the user enters their gateway ID(s) (on the gateways) so the system can make an association between the logical user account and the physical user network(s)/gateway(s).

User notification options (email, phone, page, text messaging, etc.), as well as time zone, uplink interval can also be selected here.

The option to customize the WAP portal interface can be provided so the user can select the variables and the functionalities that are presented on a WAP device accessing the service.

Device Registration Screen

The user can register devices obtained from other sources—assuming they were not pre-registered already by the system manager. The user can enter the unique device ID and the device name, etc.

The ability to delete a device from the local user network can be provided. History related to the device being deleted (log data, action tracking, etc.) can be removed from the system, e.g., 30 days after the device deletion.

The gateway can know if something succeeds or not and report it back to the server. Similarly, each "command" the server performs on the gateway can be tracked back when the results of what the gateway did with it come back (e.g., success, fail, etc.).

The gateway can report the downlink changes like it reports uplink changes. The state change of the variable in question (e.g., Change thermostat setpoint) can appear in the log like any other variable, along with its time stamp.

The portal can set the change, then after the change occurs it can verify it is reported in the log. For example, if the portal is asked to turn the light on, it can be ensured that it happened "once and only once" and if it failed, that can be known.

The ability to replace a device in the local user network can also be provided. Old log data for the replaced device can be kept without a break in the device's data (i.e., the log can start getting values from the new device. Also, since the downlink values are set on the new device, those initial settings can also appear in the log.

Network Configuration Screens

This is where the user configures the device network and sets preferences and options (e.g., which variables to monitor, logging options, etc.).

Provisions for creating variable groupings are also provided here (i.e., defining a single variable that represents the collection of all similar type variables selected by the user—either ANY or ALL function (OR or AND)—e.g., all door/windows sensor states).

The user selection of which variables are monitored for eventing and alarming is performed here as well.

Normal Usage Screens

These represent the main screens used most often by the user on a day-to-day basis. Typical functionality provided includes: network summary, variable monitoring; variable control, variable logging, system activity log, system status, alarms, etc.

WAP Interface

The portal can also provide a simplified interface for supporting WAP devices. The functionality can be a limited subset of monitoring and control services offered by the web portal.

The customization of the WAP portal interface can be done through the normal Web interface screens PDA Interface The portal can also provide a simplified interface for supporting browsers running on PDAs. The functionality can be a limited subset of monitoring and control services offered by the web portal.

The customization of the PDA portal interface can be done through the normal Web interface screens (see above).

Permission Levels

The portal, in association with the server, can provide configurable user access and permission levels for both inter-account (e.g., different premises) and intra-account (e.g., mom, dad & kid) isolation.

Other Features

1. A desktop application in the icon tray that reports alarms and events in the background.

2. Support for larger premises (single user with multiple gateways)

3. Support for multiple users/locations per gateway

4. Rule-based local binding

5. IPSec (e.g., via HiFn chips)

6. Support for LonWorks free topology (FT-10) devices by the gateway

Control Network

An embodiment of a control network may comprise a collection of sensor and actuator devices that are networked together.

Sensor devices are devices that sense something about their surroundings and report what they sense on the network. Examples of sensor devices are door/window sensors, motion detectors, smoke detectors and remote controls.

Actuator devices are devices that receive commands over the network and then perform some physical action. Actuator devices may include light dimmers, appliance controllers, burglar alarm sirens and cameras. Some actuator devices also act as sensors, in that after they respond to a command, the result of that command is sent back over the network. For example, a light dimmer may return the value that it was set to. A camera returns an image after has been commanded to snap a picture.

The core of an embodiment of a control network is an architecture where sensor devices are coupled to actuator devices. A light switch, for example, may turn on a lamp through a light dimmer actuator. A door/window sensor or smoke detector triggers an alarm. Other devices may also be controlled in various ways.

Figure 6:
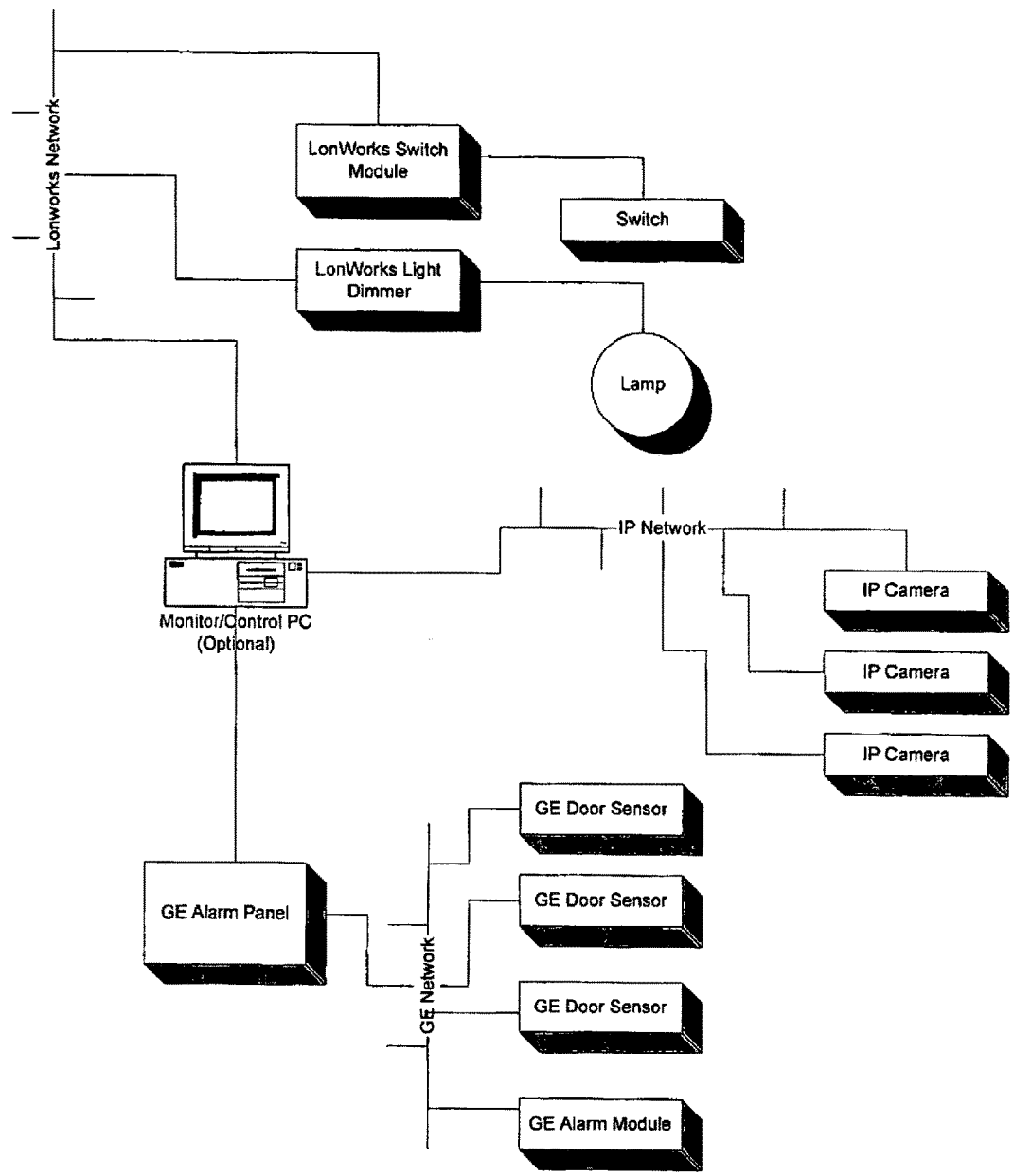
FIG. 6 illustrates an example of a control network environment.

FIG. 6 illustrates an example of a control network environment. Here three different networks with devices are depicted (GE security, LonWorks, IP). The LonWorks network includes a light switch and lamp, the GE network has some door sensors and an alarm controller, and the IP network has some IP cameras attached.

Note that the computer in the middle of the network may be used to bridge the various networks, essentially providing interoperability, but with available existing technologies that calls for a custom solution requiring expensive custom software. Otherwise, the three control networks are independent.

Figure 7:
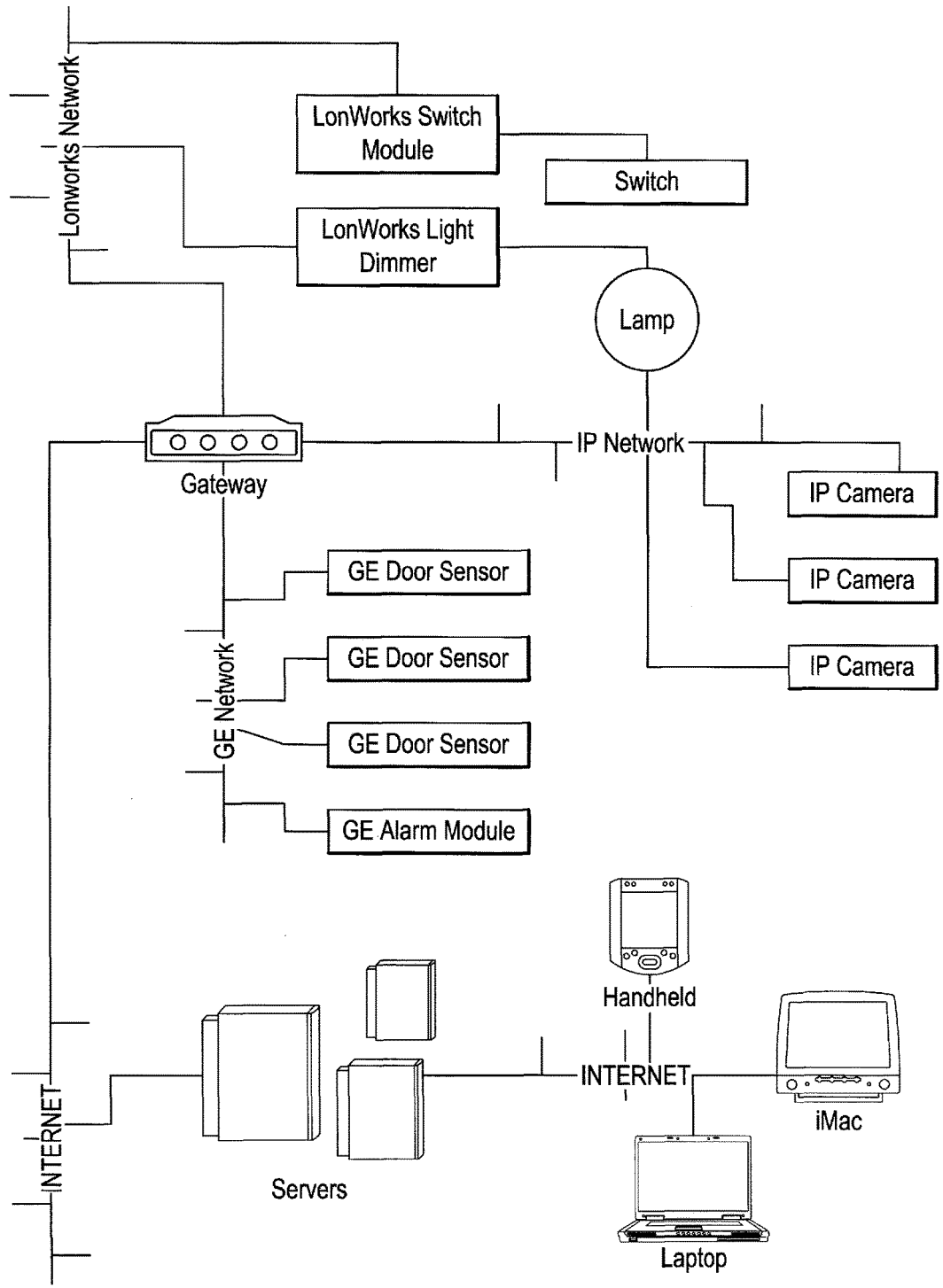
FIG. 7 is a block diagram of a control network with a gateway.

FIG. 7 depicts one embodiment of an architecture that uses these described concepts.

Here we see the same three local networks on the premises (IP, LonWorks, GE Security). However, now they are all connected together by the system gateway. Furthermore, the system gateway is attached to the interne, through which it regularly contacts the system servers in order to send up new data and get back control and configuration information. Clients can monitor and control their premises using ordinary browsers on a wide variety of devices by accessing the system servers.

Note that, at the premises, use of a PC or custom programming to achieve interoperability between different device technologies, or to provide remote monitoring and control may be avoided. Instead, in an embodiment both functions are performed by the system gateway, which according to an embodiment is designed to interface to a variety of device technologies and provide an abstraction layer that helps the rest of the system (servers and clients) to be technology-neutral.

Sensor/Actuator Device Abstraction

Sensor and actuator devices are abstracted at the gateway hardware level so that different devices from different manufacturers can be handled seamlessly. Embodiments may support devices from several different manufacturers (for example, GE Security, Axis Communications, Axsys Systems) using three different communications technologies (unlicensed-band RF for GE devices, Internet Protocol for IP cameras, and powerline for LonWorks modules).

Gateway Device

The gateway device performs the hardware abstraction function according to an embodiment of the invention. The gateway includes the hardware and software required to communicate with all supported device technologies. Software on the gateway converts the raw data received from the device to an indexed data point. Periodically the gateway sends the data to the server, with each datum tagged with its data point index and time stamp.

In an embodiment, the server performs substantial operations for data storage and user interface.

Gateway—Server Data Interface

Between the server and the gateway, an embodiment of the system uses a device-property-value model. Each device supports some number of properties that expose its capabilities. For example, an embodiment of a door sensor has a state property (open or close) and a battery-level property (low or ok). Both the devices and their properties are given indexes when the gateway is configured, and all subsequent data exchange uses the indexes to identify the property involved. This indexed property ID may also be referred to as an "indexed data point."

Figure 8:
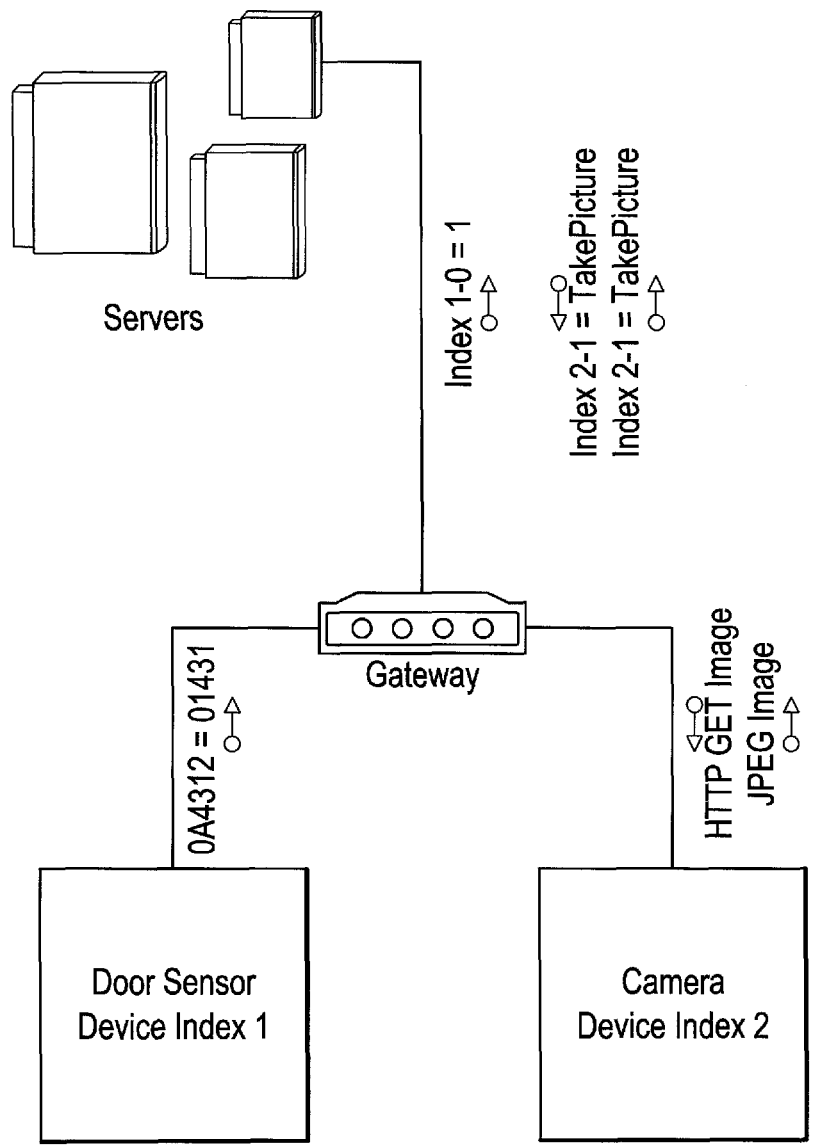
FIG. 8 is a flow diagram showing data being transformed, physically and logically, by a gateway.

FIG. 8 illustrates how data is transformed, physically and logically, by the gateway.

The door sensor has detected an open door, and sends the gateway a message with its hardware ID and raw value. The gateway interprets the data, converts it to an indexed data point value, and sends it to the server as device #1, property #0, set to 1 (true). Note that the device ID is converted to the configured device index (1), and the changed property is identified by its property index (0).

In the second case, the client wants to take a picture, so the server sends down the value (in this case, the desired picture name) indexed by the camera's device index (2) and the camera's picture property's index (1). In this case, the gateway initiates a web service to the camera to access (and upload) the image, then sends back the result of that operation to the server, again as an indexed data point.

According to an embodiment, the camera and a door sensor are both handled identically by the server and in the server-gateway protocol, using the device+property model.

Common Device Definition Format

In the server infrastructure, the device data is handled as indexed data point values. When the data is presented to the user, it is reinterpreted. The device definition file is the mechanism that permits the server software to handle this reinterpretation with a single, common code module, independent of device types or technologies.

Physical devices are defined using a common device definition file format which provides the information necessary to convert the device- and technology-specific view of a device to an abstracted, generalized view.

Function Types and Properties Abstraction

In order to allow client inspection and manipulation of sensor/actuator devices in a device- and technology-independent manner, device capabilities are mapped to standard function types, each of which defines one or more standard properties. This permits client software to, for example, query the system for temperature measurements, without necessarily knowing what physical device type provided it or what networking technology it used.

Raw Data Types

Each property in a device definition is tagged with its raw data type. This is the format of the raw data as received from the device and passed up by the gateway. Note that this is usually not the same format as the raw data that is passed from the device to the gateway.

For Boolean (digital) properties, this raw value is either the string "1" or the string "0." For analog properties, the format of the value can vary widely depending on the type of device. The gateway does not have to be responsible for handling the wide variety of formats possible, since the raw format type is stored in the device type definition, and is used by the server to make the conversion when necessary.

Standard Data Types

Each property in the device definition file is further tagged with a standard data type. This is the type that is stored in the server database and, by default, reported to the client. (Note that the actual database field type is a string: the "standard type", as used here, refers to how that string is formatted, not to the database data type).

Formatter Conversion Classes

The server has a set of formatter classes that convert between the raw and standard formats. These are selected and instantiated dynamically, as needed, based on the raw and standard data type strings from the device definition. This way the server code that manages data is identical for all data types, and supporting a new data type includes creation of a new formatter conversion class. Similarly, there are a set of formatter classes that convert between different standard formats.

Data Conversion Data Flow

Figure 9:
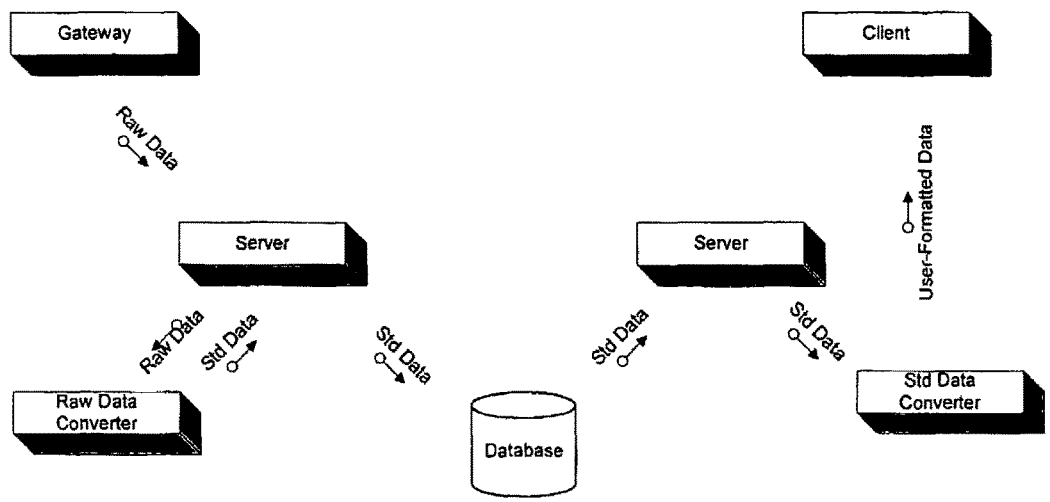
FIG. 9 is a flow diagram showing the data conversion.

FIG. 9 illustrates how the data conversion is handled. Raw data is sent up by the gateway. The server uses the device definition to determine which raw data converter to invoke, calls the converter, and stores the standard data in the database. Later, when the data is read, the server accesses the standard data from the database, optionally reformats it to the client's specifications, then returns the formatted value to the client.

Associative Binding

Binding is the process of "connecting" the output of one device (a sensor) to another device (actuator). An example is a switch that triggers a light to go on.

Gateway Binding

First, whether the devices in question use the same technology or not, associative binding uses the gateway itself as the "connection" mechanism. The gateway receives the signals from the sensor, interprets them, and relays the appropriate message to the actuator.

Gateway binding can be implemented without associative binding. That may, however, involve the gateway containing code to do the data conversion from the source device's data format to the destination device's data format. For example, if a switch is bound to a lamp controller, switching the switch to on causes the lamp to turn on.

Associative Binding

The gateway implements a form of associative binding, where a binding (connection) is triggered by the value of a source device property. Bindings are kept in a table that maps source device properties+values to destination device properties+values. For example, consider a remote control that sends out a numeric value (for example, 1 to 10). Binding entries can map the individual values to different target devices, so that each value can turn on a different lamp. Furthermore, the binding entries contain the specific values that need to be sent to the target device property.

Each associative binding defined on the gateway may include:

Index of the source device property
Index of the target device property
Source property value
Destination property value When a sensor's bound data point reports a change, the gateway checks whether there are any bindings that match that data value. If there are, it sends the appropriate destination data to the destination device property, hence to the destination device hardware.

Figure 10:
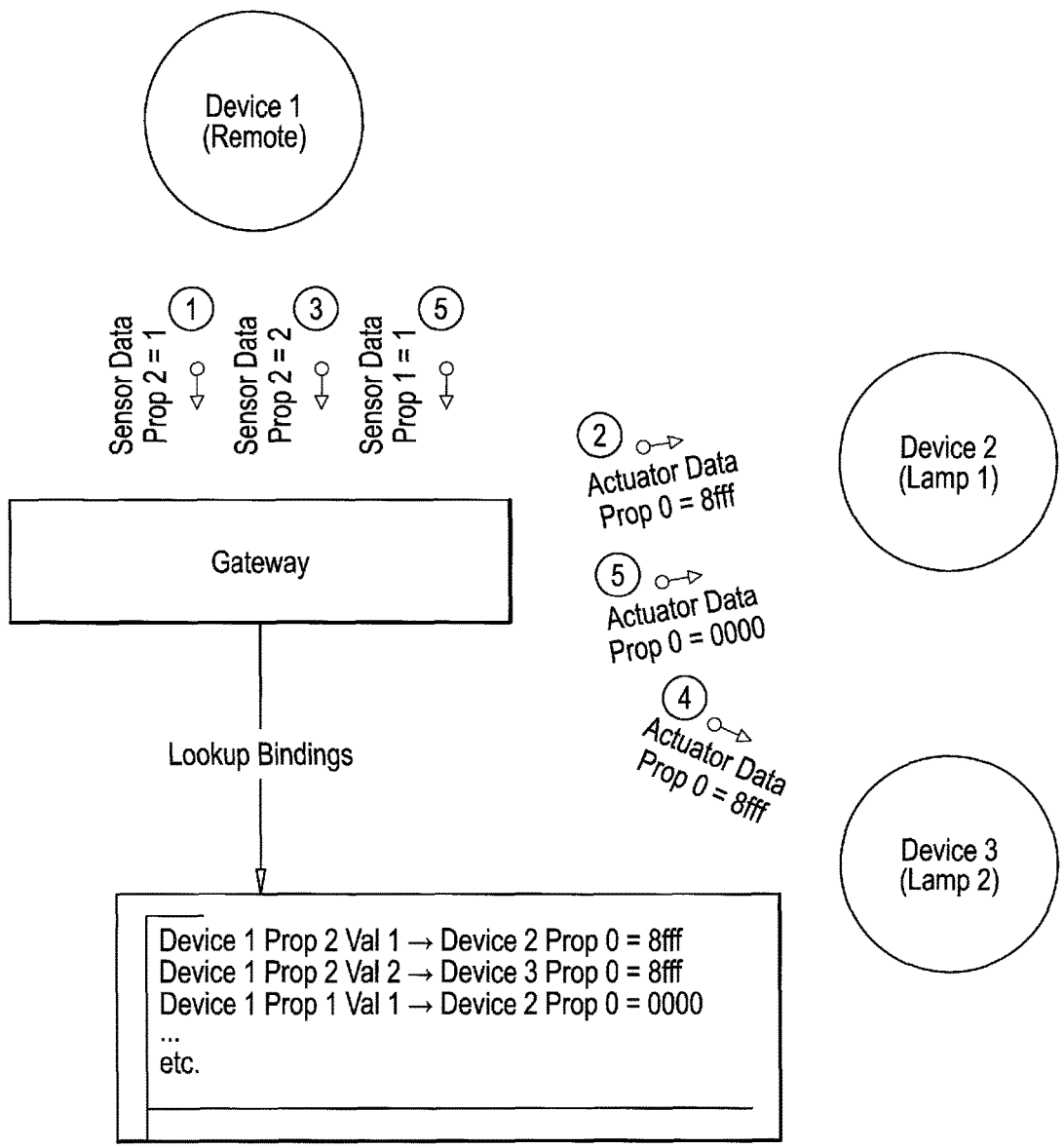
FIG. 10 is a diagram showing a gateway binding mechanism.

FIG. 10 illustrates a gateway binding mechanism. The steps illustrated in the diagram are:

1. User presses on-1 button, remote sends "prop 2=1"
2. Gateway finds "prop2=1" in table, sends "prop 0=8fff" to Device 2 prop 0
3. User presses on-2 button, remote sends "prop 2=2"
4. Gateway finds "prop2=2" in table, sends "prop 0=8fff" to Device 3 prop 0
5. User presses off-1 button, remote sends "prop 1=1"
6. Gateway finds "prop1=1" in table, sends "prop 0=0000" to Device 2 prop 0

Gateway Data Abstraction

The source and destination data are specified in the table as untyped strings, so the gateway can do a string comparison, which may not involve knowledge of the data semantics. The gateway passes the destination string back to the destination device, again without necessarily using semantic knowledge.

User Data Abstraction

In an embodiment of the system, the user knows the semantics of the data, but may not know the raw data formats. So the user knows that "when I press the lamp on button on my remote, I want the lamp to go to full brightness." Because the data from both the sensor and the actuator involved in a binding is normalized to standard data units, the user can specify their desired bindings using those standard data formats, and the system receives these selections. (In the above case, Remote "lamp" button="On" causes the Lamp to be set to "100%").

Server Data Abstraction

As in cases where the server handles sensor/actuator data, it does so in the case of bindings using the format conversion classes, driven by the device definition files. The server does not necessarily use semantic knowledge of the values being bound.

Gateway Device Abstraction

For a given user premises, in addition to the sensor and actuator data, there is system-level data that is managed. Some examples are error logs, usage logs, gateway error alerts, tracking changes to the system, etc. The gateway may be treated as a pseudo device.

In this design, system data are reported as properties belonging to the gateway pseudo device. Because the system properties are exposed this way, they can be transparently handled by the server infrastructure (logging, reporting, etc.) rather than requiring a separate logging/reporting mechanism. This enhances the resiliency of the server design, since new system properties can be added without changing the server code (simply adding the new system variables to the gateway device model suffices).

Camera Snapshot: Abstracting Images Through Properties

The data from cameras (i.e., "camera" function types) is a relatively large binary file. An embodiment of this does not fit the simple property-value model, and in an embodiment the image is not represented by a string. An embodiment handles the cameras and camera properties like other devices where it is appropriate, yet still offers the camera features (still images and video) to the user. An embodiment does that by creating special properties for the camera.

Cameras contain a property named "snapshot" that is linked to the camera's images. This property performs: 1) writing to this property causes the camera to take a snapshot and upload it to the server, and 2) the property is logged when the property changes. The value of the property is the name of the snapshot image. That is used by the server to fetch an image given a name.

Taking a Snapshot

Figure 11:
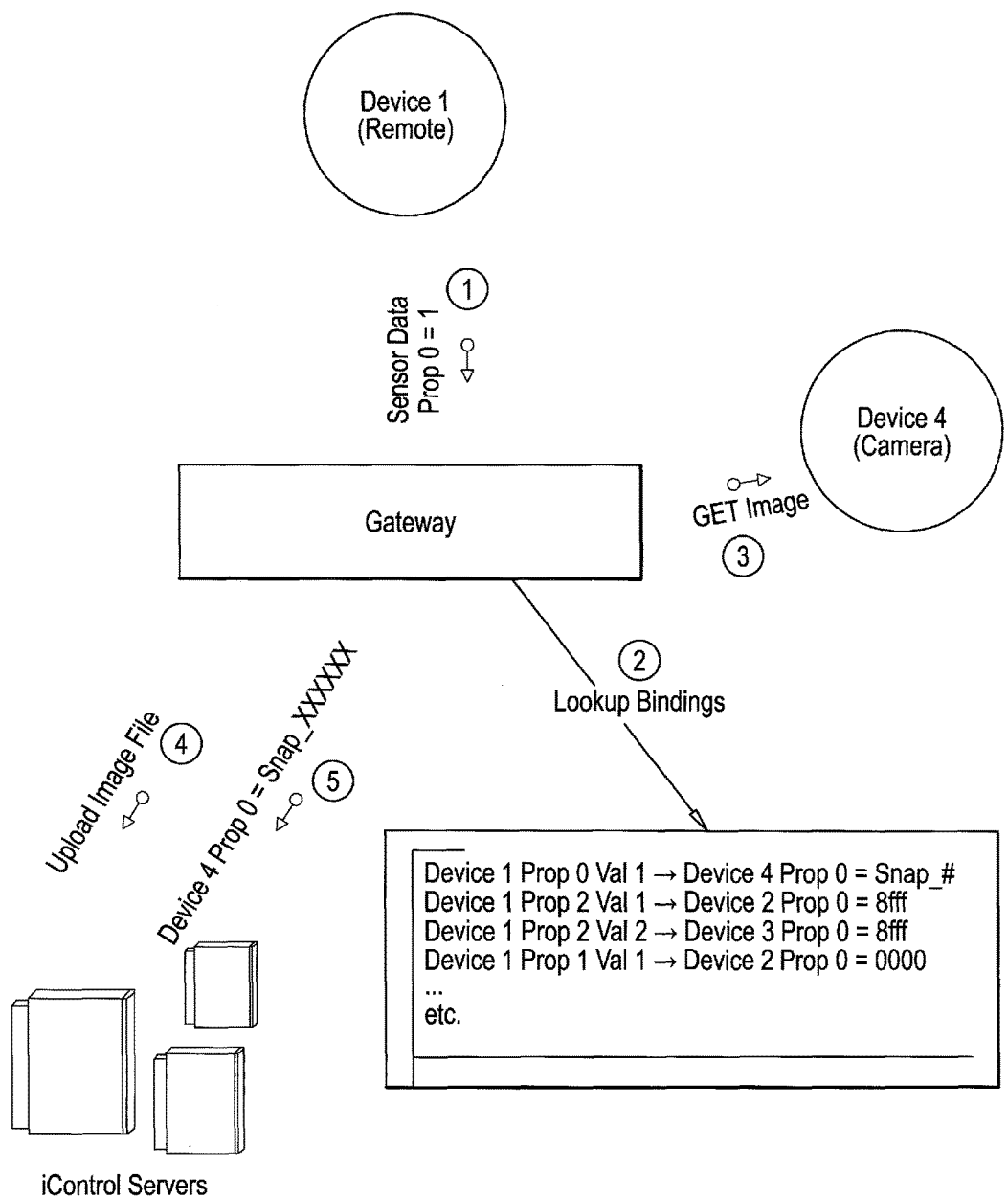
FIG. 11 is a diagram showing a camera snapshot scenario.

Clients write a string value to the snapshot property that gets sent down to the gateway. That causes the camera code in the gateway to get the snapshot from the camera and upload it to the server. Finally, it reports (to the server) that the property was successfully updated. While the gateway does require special code to handle the camera interface, the device property data is handled exactly like any other device property. FIG. 11 illustrates a camera snapshot scenario.

Logging Images

By using a regular property to represent an image snapshot, the times, names, etc. of the snapshots can be logged using the ordinary property logging mechanisms used for other properties. The client software uses this history log to display thumbnails of the saved images. As in the case of the server, the client software does not need special code to get the list of images (although it does use special code to display the thumbnails and images according to an embodiment).

Binding Snapshots

Because a snapshot is triggered by a property assignment, that assignment can also occur due to a binding. Thus combining this snapshot property functionality with the associative binding capability leads to a way to take snapshots based on reported sensor data.

FIG. 11 illustrates a camera snapshot binding mechanism. The steps depicted are:

1. User presses "take picture" button on remote, remote sends "Device 1 Prop 0=1"
2. Gateway finds the binding in the table (Dev 4 Prop 0=Snap_#)

3. The # at the end tells the camera code to append a random number

4. Gateway camera code gets the data update, initiates an HTTP GET to the camera 5. Gateway camera code sends the image to the server 6. Gateway reports updated data like any other data update.

Camera Integration

Embodiments of the server and gateway incorporate a number of features that simplify the installation and use of still and video cameras.

Camera Type Abstraction

As is the case for attached devices, cameras are abstracted on the gateway so that neither the client nor the server infrastructure necessarily has specific knowledge of the camera type, thus they may handle all cameras identically according to an embodiment. (Note: the client application—in our case the portal—may use some specific camera knowledge in order to present the video and stills transparently to the user).

Integrated Stills and Video

The camera stills and video are integrated into the user interface so that the user never sees any camera-specific web pages. FIG. 12 illustrates a camera environment.

Firewall-Proof Still Images

According to an embodiment, the images from the IP-attached cameras supported are not viewed from beyond the user's own local network unless the user's router opens a port and forwards the camera requests to the camera. However, since the gateway is behind the same firewall as the camera, it gets the image from the camera and transfers it to the server via HTTP port 80 (which is always open). The images thus become available to the user on the Internet (protected by username/password).

Integrated Video Dynamic DNS Replacement

Viewing video from the camera involves the client changing router settings to forward TCP requests to their camera. Then, the portal allows the client to access the video without the client necessarily knowing the Internet address of the client's system. The gateway is in regular communication with the server, and upon update the server saves the gateway's current WAN address. When the client wants to see video from the client's camera, the server inserts the gateway's WAN address into the video image link (href). If the user's IP address changes frequently, the user can access their camera's video from anywhere.

Installation

Network cameras on the market come with a variety of installation methods. An embodiment of the gateway eliminates the need for client involvement by automatically configuring the camera hardware.

During the camera configuration, the gateway creates private administrator password, then a view-only user with a random password that is subsequently used to get camera images (still or video). The gateway searches for the camera on the local network to obtain its IP address (as assigned by the user's router). Since the gateway itself is automatically configured via DHCP, it knows the subnet and approximate address range that the router is using for the DHCP-assigned addresses.

Configuration

According to an embodiment, the camera configuration capability is exposed via camera configuration properties. Should the user want to change the camera's address or client user name/password, the user can do so in one place, on the system portal. The changes are passed down to the gateway (as camera configuration property updates) where it causes the gateway to reconfigure the camera hardware. Differences between different camera types are handled by the gateway software. These properties are handled and logged as other properties.

Router Port Forwarding Assistance

Setting a router's port forwarding table to support remote video viewing may involve:

1. Determine that port forwarding is called for

2. Find the router's configuration web page

3. Figure out what to enter as the server address

4. Figure out what to enter as the server port

5. Know what to put where

6. Know if it is working correctly

An embodiment of the system addresses these items. Note that the user is logged on from the user's own network (the "Local Client" example in FIG. 12) to configure the user's router.

Determining Port Forwarding is Desired

When the user accesses a camera from the system portal, the system server performs a test to check whether the camera is accessible from the Internet. If it is, the camera page includes a link to a page that will display the video. If the camera is not accessible, the video link instead opens a camera assistance page that guides the user through steps to configure their router's port forwarding.

Finding the Router's Web Page

Since the gateway is on the same internal network as the camera, it knows what the router's address is (it is the default gateway passed back in the DHCP assignment). The portal generates a link on the camera assistance page that takes the user right to the user's router's configuration web page.

Address, Port and where to Put them

Since the camera's address and port are available via properties, the portal reads these properties and includes these properties in descriptive text on the camera assistance page. That page also contains a link to a router help page, where the user can select the user's router and get specific help on what to do to configure it.

Device Test

The camera assistance page has a button to test whether the port forwarding is a success or not. It uses the server's test-camera-access API to make the determination, and displays either a pass or fail message to let the user know.

Various Embodiments

In addition to the foregoing, the following are various examples of embodiments of the invention.

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

The uplink-initiation signal can be received via telephone and/or broadband connection. The gateway can initiate communications between the gateway and the network operations center server with at least an HTTP message and/or at least an XML message. The premises management devices can manage energy of the premises, security of the premises, and/or safety of the premises. Many embodiments provide a hosted solution for property developers, owners and managers as well as service providers (ISPs, telcos, utilities, etc.) such as communication service providers and Internet portal providers. Some embodiments offer a complete, turnkey, reliable, and/or cost-effective solution for the delivery of telemetry services (e.g., energy management, security, safety, access, health monitoring, messaging, etc.) to customers.

An embodiment of the invention is directed to a business method for premises management. Some embodiments of a business method for premises management include making an Internet portal available for access to a vendee, such as a premises vendee, communication service vendee, and/or an Internet portal vendee; and at least after a transaction between the vendor and the vendee, such as a premises transaction, a communication services transaction, and/or Internet portal services transaction, providing premises management services via the Internet portal to the vendee.

The Internet portal can be branded with a brand of the vendor according to an embodiment. Examples of a premises vendor include a home builder, premises builder, and premises manager. Examples of a premises vendee include a home buyer, premises buyer, and premises tenant. Examples of a communication service vendor include an Internet service provider, a telephone company, a satellite television company, and a cable television company. Examples of a communication service vendee include a customer of the Internet service provider, a customer of the telephone company, a customer of the satellite television company, and a customer of the cable television company. Premises management services can manage energy of the premises, security of the premises, and/or safety of the premises.

An embodiment of the invention is directed to a system. The system includes a network of premises management devices, a gateway coupled to the network and premises management devices, a server coupled to the gateway by a communication medium and a portal coupled to the communications medium. The portal provides communication with the premises management devices.

According to various embodiments in the invention alone or in various combinations: the communications medium may comprise the Internet; the portal may comprise an internet portal; and/or the portal may be branded with the name of a vendor of a product associated with the premises. The product may comprise a building, and/or the vendor may comprise a party that leases the premises. The vendor may also or alternatively comprise a property management organization. The server may be included within a network operations center. The logic may comprise, according to various embodiments of the invention, software, hardware, or a combination of software and hardware.

Another embodiment to the invention is directed to a gateway. The gateway includes an interface coupled to a network of premises management devices, logic that receives data from different premises management devices, and an interface coupled to a communications medium that is coupled to a server. The server is coupled to a portal coupled to the communications medium. The portal provides communications with the premises management devices.

According to various embodiments of the invention alone or in various combinations: the communications medium may comprise the Internet; the portal may comprise an internet to portal; and/or the portal may be branded with the name of a vendor of a product associated with the premises. The product may comprise a building, the vendor may comprise a party that leases the premises; the vendor may comprise a property management organization; and/or the server may be included within a network operations center.

Another embodiment of the invention is directed to premises management system. The premises management system includes a network of premises management devices and a gateway coupled to the network of premises management devices. The gateway includes logic that receives data from different premises management devices and an interface coupled to a communications medium that is coupled to a server. The server is coupled to a portal coupled to the communications medium, and the portal provides communication with the premises management devices. The logic may comprise, according to various embodiments of the invention, software, hardware, or a combination of software and hardware.

Another embodiment of the invention is directed to a system that includes: a network of premises management devices; a gateway coupled to the network of premises management devices; a server coupled to the gateway by a communications medium and a portal coupled to the communications medium, the portal providing communication with the premises management devices.

According to various embodiments in the invention, alone, or in various combinations: the common format includes a set of properties for each type of device; the format includes an index for each device and an index for each property of each device; the network comprises a network operations center; the network of premises management devices includes at least a camera; the system includes logic that reinterprets abstracted data in the common format from the different premises management devices; the server includes a device definition file for reinterpreting the abstracted data; the system includes a set of standard function types that define standard properties; the standard properties include temperature; the system includes client software that queries measurements corresponding to the respective property without specifying the type of device from which the measurement is to be received; the server includes a set of formatter classes that convert between the format of data in which data is passed from the gateway to the server in a type in which the data is stored in the server; the formatter classes are instantiated dynamically; the system includes device definitions for respective premises management devices; and/or the server is included within a network operations center.

An embodiment of the invention is directed to a gateway that includes: an interface coupled to a network of premises management devices; logic that abstracts data from different premises management devices using a common format; and an interface coupled to a communications medium that is coupled to a server. The server is coupled to a portal coupled to the communications medium, and the portal provides communication with the premises management devices. The gateway may include logic to interact with various aspects of the various systems described herein.

Another embodiment in the invention is directed to a gateway that includes: an interface coupled to a network of premises management devices, the network including at least a first device comprising a source of data and at least a second device comprising a recipient of the data; logic that abstracts data from different premises management devices using a common format; logic that maps data from a first device least comprising the source of data to data on a second device comprising the recipient of the data; and an interface coupled to a communications medium that is coupled to a server, wherein the server is coupled to a portal coupled to the communications medium, the portal providing communication with the premises management devices.

According to various embodiments of the invention, in various combinations or alternatively: the mapping is based on a property of the first device and a corresponding property of the second device; the mapping is stored in a table in the server; the mapping is based on a correspondence between an index of a property of the first device with an index of a property of the second device; gateway includes logic that checks whether there are any corresponding properties on a corresponding device that comprises a recipient of data if corresponding data from a device that comprises a source of the corresponding data changes; and/or the logic comprises hardware, software, or a combination of hardware and software.

Another embodiment of the invention is directed to a system that includes: a set of one or more premises management devices, the set of one or more premises management devices including at least a camera; a gateway coupled to the set of one or more network of premises management devices, the gateway including logic that abstracts data from a premises management device using a common format, general to different devices; a server coupled to the gateway by a communications medium; and a portal coupled to the communications medium, the portal providing communication with at least a device in the set of one or more premises management devices.

According to various embodiments of the invention, alternatively, or in various combinations: the system includes logic that transmits data from the gateway to the server using HTTP protocol; the data from the gateway includes an image from the camera; the gateway includes logic that pushes data to the server from the set of one or more premises management devices; the system includes logic that causes an image from the camera served from the server to be displayed; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages energy of the premises; at least a device in the set of one or more network of premises management devices manages security of the premises; at least a device in the set of one or more network of premises management devices manages safety of the premises; the camera includes at least a property specific to a camera and at least a property common with at least another type of device; the property specific to a camera causes the camera to take a picture; the property specific to a camera causes a picture taken by the camera to be uploaded to the server; the system includes logic that causes a picture to be taken based on the state of another device in the set of one or more premises management devices; another device in the set comprises a motion sensor; the system includes the plurality of different types of cameras and wherein the gateway includes logic that abstracts data from the different types of cameras into a common format for delivery to the server; the system includes a router that couples the gateway to the communications medium; the camera comprises an internet protocol (IP) camera; and images from the camera are provided over the communications medium only if the gateway initiates a transfer of the image to the server.

Another embodiment of the invention is directed to a system that includes: a set of one or more premises management devices, the set of one or more premises management devices including at least a camera; a gateway coupled to the set of one or more network of premises management devices; a server coupled to the gateway by a communications medium, and a portal coupled to the communications medium, the portal providing communication with at least a device in the set of one or more premises management devices. The gateway includes logic that pushes data from the set of one or more premises management devices to the server.

According to various embodiments of the invention, alternatively, or in various combinations: the gateway does not allow direct access to the set of one or more premises management devices from the communications medium; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages security of the premises; the camera includes at least a property specific to a camera and at least a property common with at least another type of device; the property specific to a camera causes the camera to take a picture; the system includes logic that causes a picture to be taken based on the state of another device in the set of one or more premises management devices; the system includes a plurality of different types of cameras and the gateway includes logic that abstracts data from the different types of cameras into a common format for delivery to the server; and/or the camera comprises an internet protocol (IP) camera.

Another embodiment of the invention is directed to a gateway that includes: an interface coupled to a set of one or more premises management devices, the set of one or more premises management devices including at least a camera; and an interface coupled to a communications medium that is coupled to a server, wherein the server is coupled to a portal coupled to the communications medium, the portal providing communication with the premises management devices; and logic that pushes data from one or more premises management devices to the server.

Components of the gateway, server, system and/or other aspects described above include any collection of computing components and devices operating together. Components of these items can also be components of subsystems or within a larger computer system or network. The components can also be coupled among any number of components (not shown), for example other buses, controllers, memory devices and data input/output (IO) devices in any number of combinations. Further common components of these items can be distributed among various numbers or combinations of other processor-based components according to various embodiments of the invention.

Aspects of the gateway, server, system and other items described here and may be implemented as functionality programmed into any variety of circuitry, including programmable logic devices, (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects these items include: microcontrollers with memory (such as electronically erasable programmable read only memory (EEPROM)), embedded microprocessors, firmware, software, etc. Furthermore, aspects of the gateway, server and other elements may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the ICS may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the system is not intended to be exhaustive or to limit the system to the precise form disclosed. While specific embodiments of, and examples for, the system are described herein for illustrative purposes, various equivalent modifications are possible within the scope of the system, as those skilled in the relevant art will recognize. The teachings of the system provided herein can be applied to other processing systems and methods, not only for the systems and methods described above.

The elements and acts of the various embodiments described above can be combined to provide further embodiments. These and other changes can be made to the system in light of the above detailed description.

In general, in the following claims, the terms used should not be construed to limit the system to the specific embodiments disclosed in the specification and the claims, but should be construed to include all processing systems that operate under the claims. Accordingly, the system is not limited by the disclosure, but instead the scope of the system is to be determined entirely by the claims.

While certain aspects of the system are presented below in certain claim forms, the inventors contemplate the various aspects of the system in any number of claim forms. For example, while only one aspect of the system is recited as embodied in machine-readable medium, other aspects may likewise be embodied in machine-readable medium. Accordingly, the inventors reserve the right to add additional claims after filing the application to pursue such additional claim forms for other aspects of the system.

What is claimed is:

1. A system, comprising:
a gateway device located at a premises, wherein the gateway device comprises a first interface in communication, via a first protocol, with a first network and a second interface in communication, via a second protocol, with a second network, wherein the second network is different from the first network and the second protocol is different from the first protocol;
a plurality of devices located at the premises, wherein the plurality of devices comprises a security device in communication with the first network and an automation device in communication with the second network, wherein the gateway device is configured to monitor and control, via the first interface and using the first protocol, the security device and monitor and control, via the second interface and using the second protocol, the automation device; and
a remote server in communication with the gateway device, wherein the remote server is configured to send, to a user device, data associated with a user interface, wherein the data associated with the user interface comprises a state parameter having a value based on a state of the security device and a state of the automation device.

2. The system of claim 1, wherein the plurality of devices comprise sensors.

3. The system of claim 2, wherein the sensors comprise at least one of a door sensor, a window sensor, an enclosure sensor, a motion sensor, a temperature sensor, a heat sensor, a smoke sensor, a carbon monoxide sensor, a water sensor, a freeze sensor, or a weather sensor.

4. The system of claim 1, wherein the automation device comprise actuators that perform a physical action in response to a control signal.

5. The system of claim 1, wherein the plurality of devices comprise a device comprising a sensor coupled to an actuator.

6. The system of claim 1, wherein the plurality of devices comprise a device configured as an actuator and a sensor.

7. The system of claim 1, wherein the plurality of devices comprise at least one display.

8. The system of claim 1, wherein the plurality of devices comprise a camera, wherein the camera comprises at least one of a still camera and a video camera.

9. The system of claim 1, wherein the plurality of devices comprise one or more of Internet Protocol (IP) devices and radio frequency (RF) devices.

10. A system, comprising:
a security device located at a premises and in communication, via a first protocol, with a first network;
an automation device located at the premises and in communication, via a second protocol, with a second network using a second protocol, wherein the second network is different from the first network and the second protocol is different from the first protocol;

a gateway device located at the premises, wherein the gateway device comprises a first interface in communication, via the first protocol, with the first network and a second interface in communication, via the second protocol, with the second network, wherein the gateway device is configured to monitor and control, via the first interface and using the first protocol, the security device and monitor and control, via the second interface and using the second protocol, the automation device; and a remote server in communication with the gateway device, wherein the remote server is configured to send, to a user device, data associated with a user interface, wherein the data associated with the user interface comprises a state parameter having a value based on a state of the security device and a state of the automation device.

11. The system of claim 10, wherein the gateway device is configured to register with the remote server by causing the remote server to associate the gateway device with an account of the premises.

12. The system of claim 10, wherein the gateway device is configured to receive device information associated with one or more of the security device or the automation device, wherein the remote server is configured to receive from the gateway device at least a portion of the device information.

13. The system of claim 10, wherein the gateway device is configured to receive network information of the first network and the second network, wherein the remote server is configured to receive from the gateway device at least a portion of the network information.

14. The system of claim 10, wherein the gateway device is configured to receive data in a first format from one or more of the security device or the automation device.

15. The system of claim 14, wherein the gateway device is configured to interpret the data in the first format and convert the interpreted data to a second format.

16. The system of claim 15, wherein the remote server is configured to receive data in the second format from the gateway device.

17. The system of claim 16, wherein the remote server is configured to convert data between the second format and a third format.

18. A method comprising:

receiving, by a gateway device from a security device via a first protocol and via a first network, security data, wherein the gateway device and the security device are located at a premises;

receiving, by the gateway device from an automation device via a second protocol and via a second network, automation data, wherein the automation device is located at the premises, and wherein second network is different from the first network and the second protocol is different from the first protocol;

determining, based on at least a portion of the security data and at least a portion of the automation data, a state parameter having a value based on a state of the security device and a state of the automation device;

sending the state parameter to a remote server configured to communicate the state parameter to a user device; and controlling, by the gateway device and via one or more of the first network or the second network, one or more of the security device or the automation device.

19. The method of claim 18, wherein controlling one or more of the security device or the automation device comprises receiving, via the remote server, an instruction from the user device and controlling the one or more of the security device or the automation device based on the instruction from the user device.

20. The method of claim 19, wherein the instruction from the user device is based on user input, at the user device, defining a control operation for at least one of the security device or the automation device.

21. The method of claim 18, wherein the automation device comprises actuators that perform a physical action in response to a control signal.

22. The method of claim 18, wherein the security device comprises sensors.

23. The method of claim 18, wherein the state parameter is defined based on user input indicating the security device and the automation device.

* * * * *